United States Patent
Tsuji et al.

(10) Patent No.: US 6,397,258 B1
(45) Date of Patent: May 28, 2002

(54) FILE SYSTEM

(75) Inventors: Atsuhiro Tsuji, Toyonaka; Shinzo Doi, Hirakata; Yukiko Ito, Moriguchi; Tsutomu Tanaka, Nishinomiya, all of (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/395,171

(22) Filed: Sep. 14, 1999

(30) Foreign Application Priority Data

| Sep. 14, 1998 | (JP) | 10-259896 |
| Jun. 11, 1999 | (JP) | 11-164887 |
| Jun. 11, 1999 | (JP) | 11-164888 |

(51) Int. Cl.[7] .................................. G06F 13/00
(52) U.S. Cl. ..................... 709/233; 709/231; 707/10; 707/1
(58) Field of Search ............... 709/230, 231, 709/232, 233; 707/1, 10

(56) References Cited

U.S. PATENT DOCUMENTS

| 5,907,683 A | * | 5/1999 | Engelsiepen et al. | 709/231 |
| 5,953,506 A | * | 9/1999 | Kalra et al. | 709/231 |
| 6,279,040 B1 | * | 8/2001 | Ma et al. | 709/231 |

FOREIGN PATENT DOCUMENTS

| JP | 7-13844 | 1/1995 |
| JP | 9-284343 | 10/1997 |
| JP | 10-111761 | 4/1998 |

OTHER PUBLICATIONS

Zhimei Jiang et al.; Web Prefetching in a Mobile Environment; IEEE Personal Communications; vol. 5, Issue 5; pp. 25–34; Oct. 1998.*

Reza Rejaie et al.; Multimedia Proxy Caching Mechanism for Quality Adaptive Streaming Applications in the Internet; Proceedings of the Nineteenth Annual joint Conference of Computer and Communications Societies; vol. 2; pp. 980–989; Mar. 26–30, 2000.*

* cited by examiner

Primary Examiner—Kenneth R. Coulter
(74) Attorney, Agent, or Firm—Wenderoth, Lind & Ponack, L.L.P.

(57) ABSTRACT

A file system capable of performing bandwidth setting is realized. Further, a bandwidth assuring function and a prefetching function are added thereto, and are organically coupled to a bandwidth setting function, thereby realizing a real-time remote file system. For these purposes, a bandwidth setting request issued by an application 302 is fed to a bandwidth setting part 305 through an extended API 313. The bandwidth setting part 305 sets bandwidths, respectively, for transmission bandwidth control parts 311 and 314 and a prefetching amount control part 310. The transmission bandwidth control parts 311 and 314 and the prefetching amount control part 310 respectively control a transmission bandwidth and control the amount of prefetching on the basis of the bandwidths respectively set.

34 Claims, 34 Drawing Sheets

Fig. 5

| FILE HANDLE | STANDARD BANDWIDTH | TYPE OF BANDWIDTH ASSURANCE |
|---|---|---|
| 1 | 120Mbps | MAXIMUM BANDWIDTH ASSURANCE |
| 2 | 60Mbps | MINIMUM BANDWIDTH ASSURANCE |
| 3 | 30Mbps | MINIMUM BANDWIDTH ASSURANCE |
| 4 | | BANDWIDTH UNASSURANCE |
| ⋮ | ⋮ | ⋮ |

*Fig. 6A*

| FILE HANDLE | STANDARD BANDWIDTH | TYPE OF BANDWIDTH ASSURANCE |
|---|---|---|
| 1 | 60Mbps | MAXIMUM BANDWIDTH ASSURANCE |
| 2 | 60Mbps | MAXIMUM BANDWIDTH ASSURANCE |
| 3 | 30Mbps | MAXIMUM BANDWIDTH ASSURANCE |
| 4 | | BANDWIDTH UNASSURANCE |
| ⋮ | ⋮ | ⋮ |

*Fig. 6B*

| FILE HANDLE | STANDARD BANDWIDTH | TYPE OF BANDWIDTH ASSURANCE |
|---|---|---|
| 1 | 60Mbps | MINIMUM BANDWIDTH ASSURANCE |
| 2 | 60Mbps | MINIMUM BANDWIDTH ASSURANCE |
| 3 | 30Mbps | MINIMUM BANDWIDTH ASSURANCE |
| 4 | | BANDWIDTH UNASSURANCE |
| ⋮ | ⋮ | ⋮ |

FILE SYSTEM

BACKGROUND OF THE INVENTION

1. Field of the Invention

The present invention relates to a file system, and more particularly, to a real-time remote file system, used in an environment in which a server storing a file and a plurality of clients performing file manipulation are connected to one another through a network, for each of the clients accessing the server through the network and performing file manipulation in real time.

2. Description of the Background Art

A file system is software for performing file manipulation such as file creation and file reading/writing with respect to a recording disk in response to a request from an application, and is generally provided as one function of an operating system (hereinafter referred to as OS). Particularly, a system applied to a client server system for performing file manipulation through a network from a client side with respect to a recording disk on a server side is referred to as a remote file system.

FIG. 31 is a block diagram showing the configuration of a client server system to which a conventional remote file system is applied.

In FIG. 31, the client server system comprises a file server 3102 and a plurality of clients 3101. The file server 3102 and the plurality of clients 3101 are connected to one another through a network 3103. The file server 3102 and the plurality of clients 3101 are respectively realized by computer devices. The network 3103 is realized by a wire network such as ATM or Ethernet or a wireless network such as W-CDMA.

FIG. 32 is a block diagram showing the functional configuration of the conventional remote file system (in a case where it is applied to the client server system shown in FIG. 31).

In FIG. 32, a conventional remote file system (hereinafter merely referred to as file system) 3201 is a part of an OS 3203 for preparing an environment in which an application 3202 operates on the computer device realizing the client 3101, and comprises a file management part 3204, a file reading part 3205, and a file writing part 3206. An application program interface (hereinafter, API) 3207 is provided between the application 3202 and the OS 3203.

The application 3202 requests file manipulation such as file creation and file writing/reading. The API 3207 converts the format of the request from the application 3202 into a format adapted to the OS 3203. The OS 3203 feeds the request whose format has been converted by the API 3207 to the file system 3201, and the file system 3201 performs file manipulation through the network 3103 with respect to the file server 3102 in response to the fed request.

In the file system 3201, the file management part 3204 judges the type of the request fed to the file system 3201. If the request is judged as being a file creation request, the file management part 3204 creates a file on a recording disk of the file server 3102, and generates attribute information (described later) of the file. On the other hand, if the request is a file reading request, the file management part 3204 reads out the attribute information from the file server 3102 and feeds the attribute information together with the file reading request to the file reading part 3205, while reading out, if the request is a file writing request, the attribute information from the file server 3102 and feeds the attribute information together with the file writing request to the file writing part 3206.

The file reading part 3205 refers to the fed attribute information in response to the fed request to perform file reading out of the file server 3102 through the network 3103. The file writing part 3206 refers to the fed attribute information in response to the fed request to perform file writing into the file server 3102 through the network 3103.

A typical example of the above-mentioned conventional remote file system is a remote file system of Windows NT (Registered Trademark) which is an OS manufactured by Microsoft (Registered Trademark) Corporation. The Windows NT, its remote file system, Win32API which is its standard API, and so forth are described in detail in "ADVANCED WINDOWS NT" issued by "ASCII Co., Ltd.", written by "Jeffrey Richter" and translated by "Kei Umehara/Shinji Suzuki/Takahiro Nagao" and "Comment on Complete Technology of Windows NT 3.5" (ISBN4-8227-1005-X) issued by "Nikkei BP Publishing Center" and written by "Takuya Oikawa, et.al".

Examples of the above-mentioned application 3202 include a non-linear editing application handling moving image data as a file (a moving image file) for editing the moving image file using a computer device.

The file manipulation performed through the network 3103 by the conventional remote file system 3201 configured as described above will be described below.

First, the application 3202 requests the file manipulation. At this time, the file manipulation request issued by the application 3202 includes information for designating a file to be an object of manipulation and the type of the file manipulation (any of file creation, file reading, and file writing).

The API 3207 then converts the format of the file manipulation request from the application 3202 into a format adapted to the OS 3203. The OS 3203 then feeds the request whose format has been converted by the API 3207 to the file system 3201. The file system 3201 then performs file manipulation through the network 3103 with respect to the file server 3102 in response to the fed request.

FIG. 33 is a flow chart showing processing (file manipulation) that the remote file system 3201 shown in FIG. 32 performs through the network 3103 upon being applied to the client server system shown in FIG. 31.

In FIG. 33, the file management part 3204 first judges whether or not a file manipulation request is fed to the file system 3201 (step S3301). The file management system 3204 waits if the result of the judgment is negative, while judging whether or not the request fed to the file system 3201 is a file creation request if it is affirmative (step S3302). When the result of the judgment at the step S3302 is affirmative, the procedure goes to the step S3307.

When the result of the judgement at the step S3302 is negative, the file management part 3204 reads out attribute information from the file server 3012 through the network 103 (step S3303), and then retrieves a file to be an object of manipulation (reading or writing) on the basis of a file name and a directory which are included in the attribute information read out (step S3304).

Thereafter, the file management part 3024 judges whether or not the request fed to the file system 3201 is a file writing request (step S3305).

If the result of the judgment at the step S3305 is negative, that is, the request is a reading request, the file reading part 3205 performs file reading (step S3306). Thereafter, the procedure goes to the step S3309.

The file read out at the step S3306 is stored once in an area managed by the file system 3201, and is then delivered to the application 3202 (i.e., is copied on a buffer area on the side of the application 3202).

On the other hand, if the result of the judgment at the step S3305 is affirmative, that is, the request is a writing request, the file writing part 3206 performs file writing (step S3308). Thereafter, the procedure goes to the step S3309.

At the step S3307, a file is created, and attribute information of the file (which shall be a moving image file herein) is generated. The generated attribute information, together with the moving image file, is stored in the recording disk of the file server 3102.

At the step S3309, it is judged whether or not the operation of the file system 3201 is terminated. If the result of the judgment is negative, the program is returned to the step S3301, so that the same processing as described above is repeated. On the other hand, if the result of the judgment is affirmative, the operation is terminated.

The file reading processing at the step S3306 is performed in the following manner.

When an attempt to read out a certain file is made, the application 3202 divides the file into a plurality of blocks (a reading minimum unit) of a predetermined size, and issues respective requests to read out the blocks (hereinafter referred to as block reading request) in order. The block reading request is fed to the file reading part 3205 through the OS 3203 after the format thereof is converted by the API 3207. Correspondingly, the file reading part 3205 reads out the blocks constituting the file in order.

FIG. 34 is a timing chart showing an example of timing at which the application 3202 shown in FIG. 32 issues a file reading request and a series of block reading requests in the case of file reading (in the case of "synchronous" reading).

As shown in FIG. 34, the application 3202 issues the file reading request (described above), and then starts processing for issuing the block reading requests in order. In the case, it issues a request to read out a certain block, and then issues, upon waiting until the block is completely read out, a request to read out the subsequent block.

There is also an application for performing not "synchronous" reading as shown in FIG. 34 but "asynchronous" reading. However, judgment whether the application performs "synchronous" reading or "asynchronous" reading is not directly related to the essence of the present invention. Therefore, description is now made, assuming that the application 3202 issues the reading request in the procedure as shown in FIG. 34.

The file writing processing at the step S3308 is also performed in units of blocks in the same manner as described above.

Random access to the recording disk can be made by performing the file reading/writing in units of blocks (this is indispensable for editing processing of the moving image file). Moreover, it is possible to save the capacity of a buffer temporarily storing a file read out.

The file reading/writing at the steps S3306/S3308 shown in FIG. 33 are performed utilizing a vacant bandwidth which is not used by the other systems (for example, other file systems and communication systems) in a bandwidth for the network 3103.

In the client server system as shown in FIG. 31, therefore, if the other systems use a lot of bandwidths, a bandwidth used by the file system 3201 is decreased. Even in a case where the bandwidth used by the file system 3201 is fixed, if the plurality of clients 3101 simultaneously perform file reading/writing, the bandwidth per client 3101 is decreased.

Further, even in a case where the bandwidth used by each of the clients 3101 is fixed, if the client 3101 simultaneously performs reading/writing of a plurality of files, the bandwidth per file is decreased.

On the other hand, the smaller a bandwidth for file reading/writing is, the smaller a transmission bandwidth becomes. As a result, reading delay/writing delay are increased. In the conventional remote file system 3201, therefore, it is difficult to handle a moving image file requiring real-time properties for recording and reproduction.

The bandwidth means the maximum amount of data which can be transmitted per unit time. When the network 3103 is compared to a water pipe, for example, the thickness thereof (i.e., the cross-sectional area of the pipe) corresponds to the bandwidth for the network 3103.

On the other hand, the transmission bandwidth means the amount of data which is transmitted per unit time when file reading and file writing are performed. For example, the amount of water flowing in the water pipe per unit time corresponds to a transmission bandwidth in a case where data transmission is made utilizing the network 3103. The reading delay means a time period required from the time when the application 3202 issues a request to read out a certain block until the block is read out of the recording disk and is delivered to the application 3202.

Therefore, a file system applied to the client server system as shown in FIG. 31 and making it possible for the client 3101 to access the file server 3102 through the network and perform file reading/file writing in real time is desired. Such a file system is referred to as a real-time remote file system. The definition of the real time referred to herein will be clarified later.

The following two techniques are known as the prior art useful for realizing the real-time remote file system.

The first is a bandwidth assurance technique which is disclosed in Japanese Patent Laying-Open No. 10-111761. The technique is a technique for always ensuring, even if a plurality of clients 3101 simultaneously perform file reading/writing, and one of the clients 3101 simultaneously performs reading/writing of a plurality of files, only a predetermined bandwidth for each of the clients and a predetermined bandwidth for each of the files. If the technique is used, it is possible to prevent the transmission bandwidth from the file server 3102 to the client 3101 and the transmission bandwidth in a case where the file reading/writing are performed from being decreased. As a result, delay time can be ensured, that is, reading delay and writing delay can fall within a predetermined time period with a sufficiently high probability.

The second is a prefetching technique. The prefetching means, assuming that the order in which a plurality of blocks constituting a file are read out is previously determined, processing for reading out, when a request to read out the head block is received from the application 3202 (or at the time point where the file to be read out is designated), not only the head block but also a predetermined number of blocks to be read out subsequently to the head block (i.e., before receiving the request from the application 3202).

The performance of the prefetching allows, at the time point where the application 3202 issues a request to read out the subsequent block, the block to have already been read out of the recording disk and stored in a buffer of the file system 3201. Therefore, it is possible to conceal reading delay. Such prefetching is disclosed in Japanese Patent Laying-Open No. 9-284343, for example.

It can be expected that a real-time remote file system can be realized by thus using the conventional bandwidth assurance technique and prefetching technique for the remote file system 3201 shown in FIG. 32. The reason for this is that it is assured that reading delay/writing delay fall within not more than a predetermined value, so that the reading delay can be concealed if the prefetching technique is further used.

However, the real-time remote file system has the following problems.

(1) As a result of bandwidth assurance, effective utilization of a bandwidth may, in some cases, be prevented. For example, a bandwidth assured for reading a certain file becomes a vacant bandwidth in a time period during which the file is not read out.

The occurrence of the vacant bandwidth decreases the utilization efficiency of limited bandwidth sources, and consequently increases delay time.

In order to solve the above-mentioned problem, the vacant bandwidth may be effectively utilized. For example, a method of utilizing a vacant bandwidth occurring in an assured bandwidth for a certain file to transmit data representing another file is considered.

(2) However, the transmission bandwidth of the other file is exceeding the assured bandwidth, so that reading delay may be insufficiently concealed. The reason for this is that the conventional prefetching technique presupposes that a transmission bandwidth is not more than an assured bandwidth, that is, transmission is made within the range of the assured bandwidth.

All the problems are related to "bandwidth". In order to realize a real-time remote file system in which the problems are solved, the following problem must be first solved.

That is, all the conventional file systems have no function relating to "bandwidth".

For example, the assured bandwidth set in the conventional file system is fixed. Even if a request to set another assured bandwidth is received from an application, therefore, the conventional file system cannot even recognize the request. It is considered that at least a function to perform bandwidth setting in response to the request from the application is indispensable.

SUMMARY OF THE INVENTION

Therefore, an object of the present invention is to realize a file system capable of performing bandwidth setting.

Another object of the present invention is to realize a real-time remote file system by organically coupling a bandwidth setting function to a bandwidth assurance technique and a prefetching technique.

In order to attain the above-mentioned objects, the present invention has the following features.

A first aspect of the present invention is directed to a file system for performing file reading and/or file writing out of and/or into a data storage part storing a file upon receipt of a file reading request and/or a file writing request issued by an application, wherein the application further issues a bandwidth setting request, the file system comprising:

a file reading part for performing file reading out of the data storage part in response to the file reading request from the application;

a file writing part for performing file writing into the data storage part in response to the file writing request from the application;

a first transmission bandwidth control part for controlling a transmission bandwidth used for data transmission from the file writing part to the data storage part in the case of the file writing;

a second transmission bandwidth control part for controlling the transmission bandwidth used for data transmission from the data storage part to the file reading part in the case of the file reading; and a bandwidth setting part for performing bandwidth setting for the first transmission bandwidth control part and/or the second transmission bandwidth control part in response to the bandwidth setting request from the application.

According to the first aspect, the file system capable of setting bandwidths for file writing and file reading in response to the requests from the application is realized.

A second aspect is characterized in that in the first aspect, the bandwidth setting part sets a standard bandwidth and the type of bandwidth assurance when the bandwidth setting is performed, the type of bandwidth assurance includes maximum bandwidth assurance for assuring the standard bandwidth as the maximum bandwidth, and the first transmission bandwidth control part and/or the second transmission bandwidth control part carry out, when the maximum bandwidth assurance is set, such transmission bandwidth control that even if there is a vacant bandwidth, data is transmitted using only the assured standard bandwidth.

According to the second aspect, the bandwidths for file writing and file reading are assured, thereby making it possible to prevent the transmission bandwidth from being decreased in performing the file reading and the file writing. As a result, delay time can be assured, that is, reading delay and writing delay can fall within a predetermined time period with a sufficiently high probability.

A third aspect is characterized in that in the second aspect, the type of bandwidth assurance further includes minimum bandwidth assurance for assuring the standard bandwidth as the minimum bandwidth, and the first transmission bandwidth control part and/or the second transmission bandwidth control part carry out, when the minimum bandwidth assurance is set, such transmission bandwidth control that if there is a vacant bandwidth, data is transmitted using not only the assured standard bandwidth but also the vacant bandwidth.

In the third aspect, when the minimum bandwidth assurance is set, data transmission is made using the vacant bandwidth occurring when the maximum bandwidth assurance is set, thereby making it possible to effectively utilize the bandwidth.

Supplementary explanation will be given. For example, when the maximum bandwidth assurance is set for a certain file, the standard bandwidth is ensured (as a bandwidth dedicated to the file). If a data transmission bandwidth relating to the file (the amount of data transmitted per unit time) is decreased, therefore, a vacant bandwidth occurs in the standard bandwidth. The vacant bandwidth is utilized for data transmission relating to a file for which the minimum bandwidth assurance is set.

A fourth aspect is characterized in that in the third aspect, the type of bandwidth assurance further includes such bandwidth unassurance that no bandwidth is assured, and the first transmission bandwidth control part and/or the second transmission bandwidth control part carry out, when the bandwidth unassurance is set, such transmission bandwidth control that if there is a vacant bandwidth, data is transmitted using the vacant bandwidth.

According to the fourth aspect, the bandwidth can be more flexibly utilized.

A fifth aspect is characterized in that in the third aspect, the first transmission bandwidth control part and/or the second transmission bandwidth control part distribute, when the transmission bandwidth control is carried out, the vacant bandwidth among transmission data corresponding to the minimum bandwidth assurance depending on the standard bandwidth.

According to the fifth aspect, the bandwidth can be more efficiently utilized.

A sixth aspect is characterized in that in the fourth aspect, the first transmission bandwidth control part and/or the second transmission bandwidth control part uniformly distribute, when the transmission bandwidth control is carried out, the vacant bandwidth among the transmission data.

According to the sixth aspect, processing for distributing the vacant bandwidth is simply performed.

A seventh aspect is characterized in that in the fourth aspect, the first transmission bandwidth control part and/or the second transmission bandwidth control part distribute, when the transmission bandwidth control is carried out, the vacant bandwidth among transmission data corresponding to the minimum bandwidth assurance in preference to transmission data corresponding to the bandwidth unassurance.

In the seventh aspect, it is possible to reduce the possibility that delay occurs with respect to the file for which the minimum bandwidth assurance is set, for example.

An eighth aspect is characterized in that in the fourth aspect, the first transmission bandwidth control part and/or the second transmission bandwidth control part carry out, when the transmission bandwidth control is carried out, the control also in consideration of the state of a transmission buffer.

According to the eighth aspect, it is possible to prevent the utilization efficiency of the vacant bandwidth from being decreased due to lack of the transmission buffer.

A ninth aspect is characterized in that in the fourth aspect, the first transmission bandwidth control part and/or the second transmission bandwidth control part carry out, when the transmission bandwidth control is carried out, the control also in consideration of the state of a receiving buffer at a destination of transmission.

According to the ninth aspect, it is possible to prevent the utilization efficiency of the vacant bandwidth from being decreased due to lack of the receiving buffer.

A tenth aspect is characterized in that in the first aspect, the bandwidth setting part further performs the bandwidth setting also for the file reading part, and the file reading part comprises:

a prefetching control part for prefetching a predetermined amount of data which is not requested by the application when the file reading is performed; and a prefetching buffer management part for managing a prefetching buffer in which prefetched data is temporarily stored, and the prefetching control part determines the amount of data to be prefetched on the basis of the bandwidth set by the bandwidth setting part.

In the tenth aspect, data in an amount corresponding to the bandwidth is prefetched. Even if the bandwidth is changed by the bandwidth setting, therefore, it is possible to conceal reading delay.

An eleventh aspect is characterized in that in the third aspect, the bandwidth setting part further performs the bandwidth setting also for the file reading part, the file reading part comprises:

a prefetching control part for prefetching a predetermined amount of data which is not requested by the application when the file reading is performed; and a prefetching buffer management part for managing a prefetching buffer in which prefetched data is temporarily stored, and the prefetching control part determines the amount of data to be prefetched on the basis of the product of the standard bandwidth set by the bandwidth setting part and maximum delay time previously calculated.

According to the eleventh aspect, data in an amount determined by the product of the standard bandwidth assured (as the maximum bandwidth) and the maximum delay time is prefetched, thereby making it possible to conceal reading delay with a high probability.

A twelfth aspect is characterized in that in the eleventh aspect, the maximum delay time is time calculated such that the probability that reading delay above the time occurs is considerably reduced.

According to the twelfth aspect, data in an amount determined by the product of the standard bandwidth assured (as the maximum bandwidth) and the assured maximum delay time is prefetched, thereby making it possible to conceal reading delay with a high probability.

A thirteenth aspect is characterized in that in the eleventh aspect, the file reading part further comprises a prefetching amount control part for controlling the amount of data to be prefetched, and the prefetching amount control part carries out, when the minimum bandwidth assurance is set, control such that the amount of data to be prefetched is not less than an amount determined by the prefetching control part when the transmission bandwidth corresponding to the reading request from the application exceeds the standard bandwidth.

In the thirteenth aspect, even when the minimum bandwidth assurance is set, the amount of prefetching follows variations in the transmission bandwidth, thereby making it possible to conceal reading delay.

A fourteenth aspect is characterized in that in the thirteenth aspect, the prefetching buffer management part carries out prefetching amount control on the basis of situations where the prefetching buffer managed by the buffer management part is employed.

A fifteenth aspect is characterized in that in the thirteenth aspect, the prefetching buffer management part monitors the amount of data to be prefetched which is stored in the prefetching buffer, and reports the result of the monitoring to the prefetching amount control part as the amount of use of the prefetching buffer, and the prefetching amount control part carries out the prefetching amount control on the basis of the reported amount of use of the prefetching buffer.

A sixteenth aspect is characterized in that in the fifteenth aspect, the prefetching amount control part compares the reported amount of use of the prefetching buffer with a previously determined threshold, and increases or decreases the amount of data to be prefetched in relation to the result of the comparison.

In the fourteenth to sixteenth aspects, the prefetching buffer for storing the prefetched data is utilized for the prefetching amount control. For example, the amount of data to be prefetched in the prefetching buffer is monitored. On the other hand, a total of four thresholds, that is, a threshold at which prefetching amount increase processing is started, a threshold at which the processing is terminated, a threshold at which prefetching amount decrease processing is started, and a threshold at which the processing is terminated are determined, and the amount of the prefetched data in the prefetching buffer is compared with each of the thresholds, to increase or decrease the amount of data which will be prefetched.

A seventeenth aspect is characterized in that in the thirteenth aspect, the buffer management part manages the prefetching buffer upon dividing the prefetching buffer into a basic area corresponding to the standard bandwidth and a shared area corresponding to a vacant area other than the standard bandwidth.

According to the seventeenth aspect, such inconvenience that when the maximum bandwidth assurance is set for a certain file, and the minimum bandwidth assurance is set for another file, for.example, the vacant bandwidth is used for reading out the latter file, so that the remaining capacity of the buffer is decreased, resulting in malfunction in the maximum bandwidth assurance is prevented.

An eighteenth aspect is characterized in that in the seventeenth aspect, the size of the shared area is not less than the size of the basic area.

According to the eighteenth aspect, the following inconvenience is prevented: that is, such inconvenience that in a case where the shared area is smaller than the basic area, even if there is a vacant bandwidth, the prefetching amount control becomes unstable due to lack of the buffer, resulting in decreased utilization efficiency of the vacant bandwidth.

A nineteenth aspect is characterized in that in the seventeenth aspect, the size of the shared area is not less than N (N is an arbitrary integer of two or more) times the size of the basic area.

According to the nineteenth aspect, even if (N−1) files for which the minimum bandwidth assurance is set are simultaneously being subjected to prefetching amount decrease processing, the utilization efficiency of the vacant bandwidth can be prevented from being decreased in another file for which the minimum bandwidth assurance is set.

A twentieth aspect is characterized in that in the tenth aspect, the prefetching control part changes, when reading is started at a position different from the head of a file, the position where prefetching is performed into a position, where prefetching has not been performed yet, ahead of a position designated by the application, and starts the prefetching at the position.

According to the twentieth aspect, in starting the reading from the middle of the file, the data which has already been read out is prevented from being uselessly prefetched again.

A twenty-first aspect is characterized in that in the tenth aspect, when high-speed reproduction for intermittently reading out data in the file is performed, the prefetching control part determines the position where prefetching is performed on the basis of a request from the application, the size of a data area in the file and the direction of reading, and intermittently performs prefetching, starting at the determined position.

According to the twenty-first aspect, prefetching can be performed even in the case of high-speed reproduction.

A twenty-second aspect is characterized in that in the tenth aspect, when backward reproduction is performed upon switching the direction of reproduction from a forward direction to a backward direction, the prefetching control part detects that the direction of reproduction is changed from the forward direction to the backward direction on the basis of the positional relationship in the file between data which has been requested to read out this time and data which was requested to read out last time, and switches, when it detects that the direction of reproduction is changed from the forward direction to the backward direction, the direction in which prefetching is performed from the forward direction to the backward direction, and changes the position where prefetching is performed into a position, where prefetching has not been performed yet, in a direction opposite to the position, and starts the prefetching in the opposite direction at the position.

A twenty-third aspect is characterized in that in the twenty-second aspect, the prefetching control part holds data in the opposite direction, whose amount is the same as the amount of data to be prefetched, in preparation for a case where backward reproduction is performed upon switching the direction of reproduction from the forward direction to the backward direction.

According to the twenty-second and twenty-third aspects, even in the case of the backward reproduction, the prefetching can be performed. Moreover, in the case, the data which has already been read out is prevented from being uselessly prefetched again.

A twenty-fourth aspect is characterized in that in the fourth aspect, the first transmission bandwidth control part and/or the second transmission bandwidth control part calculate, when the minimum unit of data requested by the application and the minimum unit of data handled by the data storage part differ from each other, a real bandwidth actually required on the basis of the two minimum units, and carry out the transmission bandwidth control using the real bandwidth in place of the standard bandwidth.

According to the twenty-fourth aspect, even if the minimum unit of the data requested by the application and the minimum unit of the data handled by the data storage part differ from each other, it is possible to carry out the transmission bandwidth control.

A twenty-fifth aspect is characterized in that in the first aspect, the file system further comprises:

a first API (Application Program Interface; the same is true for the following) for converting the file reading request and/or the file writing request from the application into a format suitable for the file reading part; and a second API for converting the bandwidth setting request from the application into a format corresponding to the bandwidth setting part.

According to the twenty-fifth aspect, the API for bandwidth setting (the second API) is added (as extended API) while using the same API (the first API) as that in the existing file system, thereby making it possible to reduce the development cost of the file system.

A twenty-sixth aspect is characterized in that in the first aspect, the file system further comprises:

a file management part for managing the file stored in the data storage part on the basis of attribute information representing the attribute of the file; and an attribute information management part for managing the attribute information.

According to the twenty-sixth aspect, the file management and the management of the attribute information can be performed.

A twenty-seventh aspect is characterized in that in the twenty-sixth aspect, the attribute information includes initialization information relating to the bandwidth setting performed by the bandwidth setting part.

According to the twenty-seventh aspect, the initialization information (a default) relating to the bandwidth setting is managed as one of the attribute information. Even when an application having no function of issuing the bandwidth setting request is used, therefore, the transmission bandwidth control can be carried out while referring to the default.

A twenty-eighth aspect is characterized in that in the thirteenth aspect, the data storage part is realized by a file server connected to a network, the file reading part performs the file reading out of the file server through the network, and the file writing part performs the file writing into the file server through the network.

According to the twenty-eighth aspect, as a result of the assurance of the maximum delay time, a real-time remote file system applied to a client server system through a network, that is, a file system capable of performing reading and writing out of and into a file server through a network in real time is realized.

Such a file system produces the greatest effect when it is used in a network environment. However, it goes without saying that it may be used in an environment without through the network. The reason for this is that reading delay and writing delay occur not only in the case of network transmission but also in making random access to the recording disk, for example.

A twenty-ninth aspect is characterized in that in the twenty-eighth aspect, the bandwidth setting part further sets a bandwidth for the network.

In the twenty-ninth aspect, when the network has a transmission bandwidth control function, it is possible to also control the bandwidth for the network.

A thirtieth aspect is characterized in that in the twenty-eighth aspect, the bandwidth setting part performs bandwidth setting for the network such that one connection in the network is assigned to one file.

According to the thirtieth aspect, the bandwidth control for the file can be simply carried out.

A thirty-first aspect is characterized in that in the twenty-eighth aspect, the bandwidth setting for the network is performed such that one connection in the network is assigned to a plurality of files.

According to the thirty-first aspect, one connection in the network is shared among the plurality of files, so that the effect produced by the bandwidth control becomes more significant.

A thirty-second aspect is characterized in that in the first aspect, the bandwidth setting part performs the bandwidth setting for each file.

In the thirty-second aspect, the bandwidth setting is performed for each file (i.e., for each of the files into and out of which writing and reading are to be performed), thereby making it possible to set a bandwidth suitable for the file.

A thirty-third aspect is characterized in that in the twenty-sixth aspect, the bandwidth setting part performs the bandwidth setting for group of files classified on the basis of their attributes.

In the thirty-third aspect, the bandwidth setting is performed for each group of files (i.e., for each of groups each comprising files having a common attribute), thereby making it possible to set a bandwidth suitable for the attribute. As a simple example, a large bandwidth is set for a "moving image" file, while a small bandwidth is set for a "document" file.

A thirty-fourth aspect is characterized in that in the twenty-eighth aspect, clients transmitting and receiving data to and from the file server through the network are connected to the network, and the bandwidth setting part performs the bandwidth setting for each of the clients.

According to the thirty-fourth aspect, the bandwidth setting is performed for each client (i.e., for each of clients performing reading and writing out of and into the file server through the network), thereby making it possible to set a bandwidth suitable for the client. As a simple example, a large bandwidth is set for a non-linear editing machine handling a moving image, while a small bandwidth is set for a general terminal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an example of a standard bandwidth and the type of bandwidth assurance which are set by a bandwidth setting part 305 shown in FIG. 3;

FIGS. 6A and 6B are diagrams showing examples of a standard bandwidth and the type of bandwidth assurance which are set by the bandwidth setting part 305 shown in FIG. 3;

Figure 3:
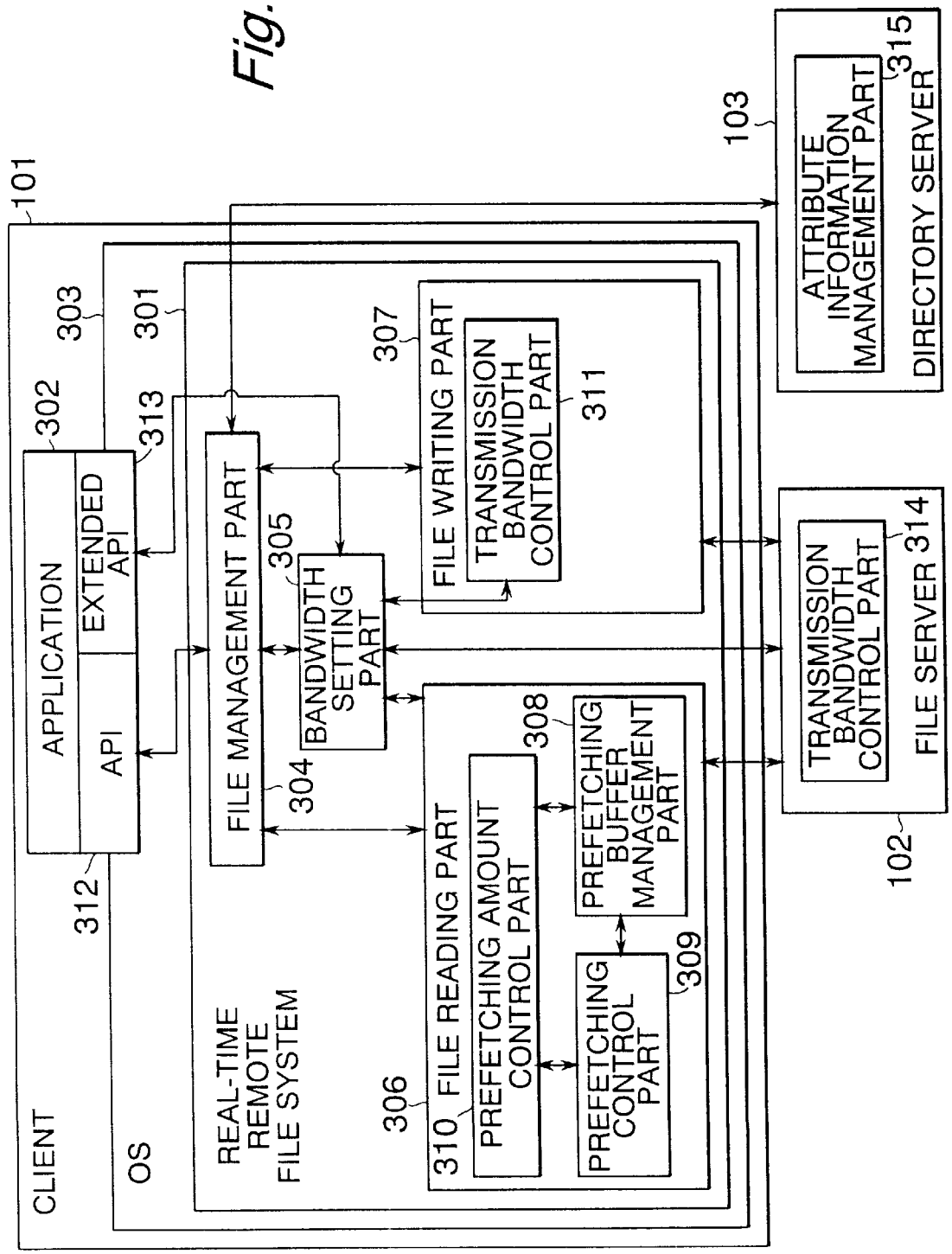
FIG. 3 is a block diagram showing the configuration of a real-time remote file system according to one embodiment of the present invention (in a case where it is applied to the client server system shown in FIG. 1)
Figure 10:
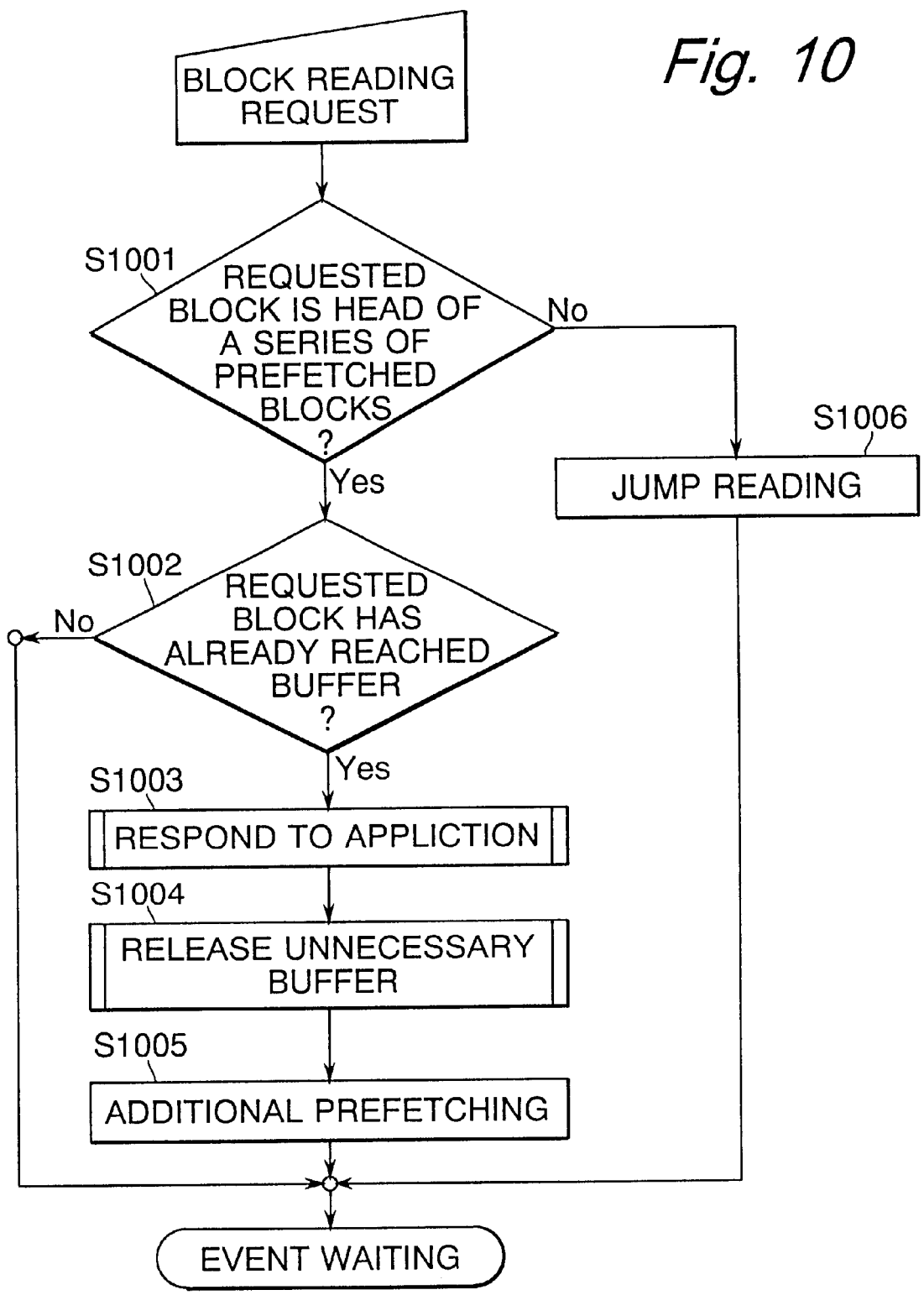
Figure 11:
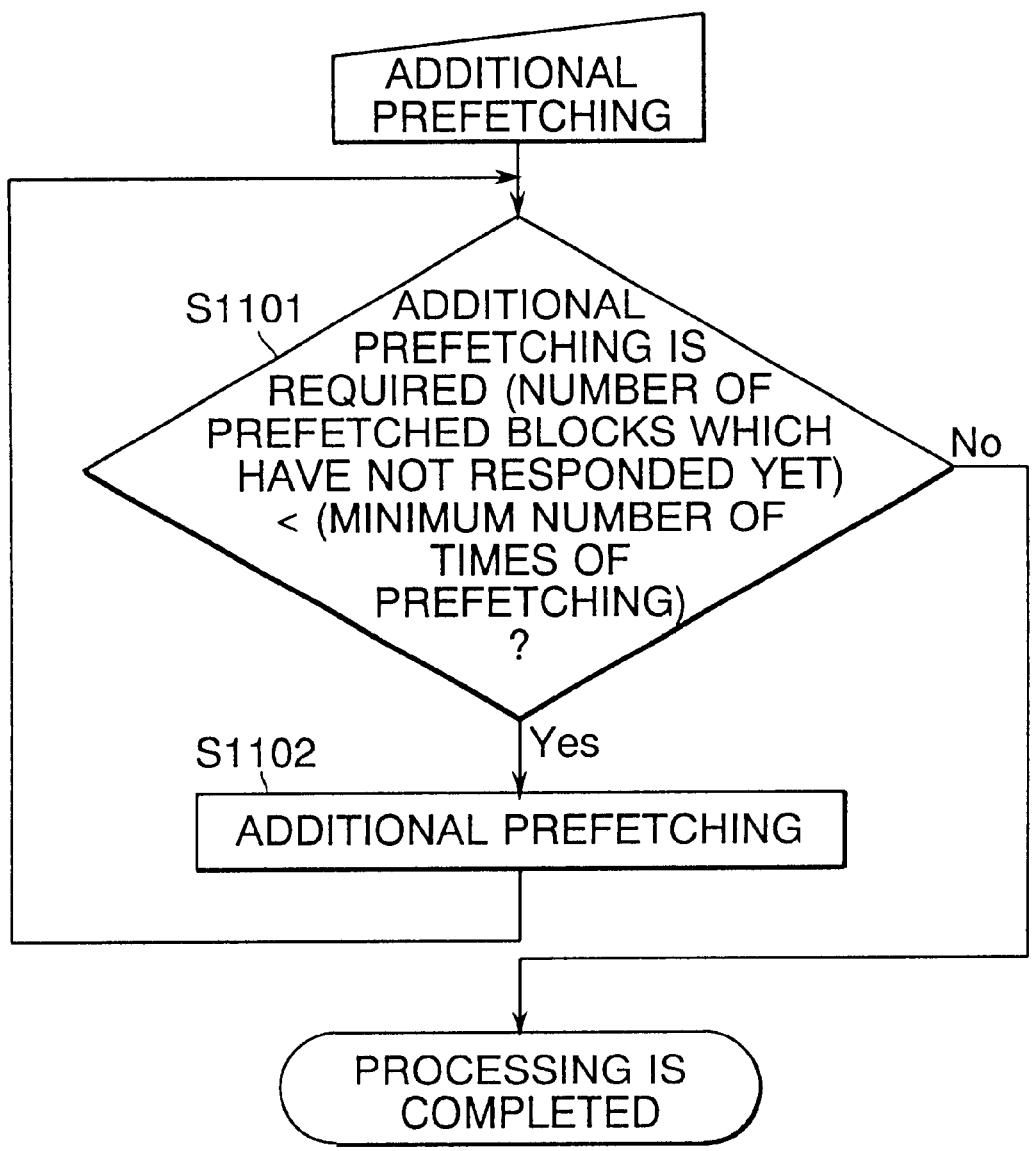
Figure 12:
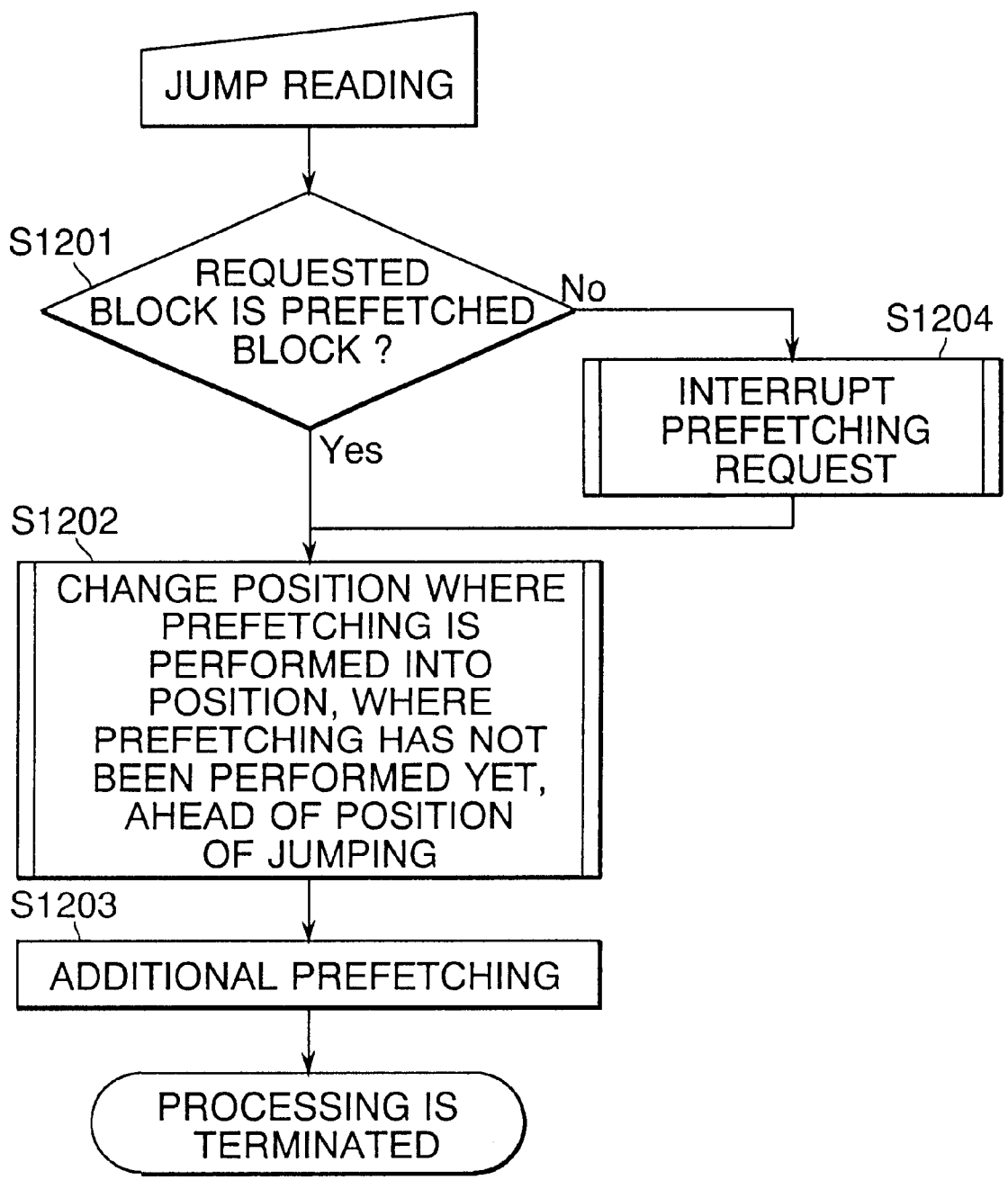
Figure 13:
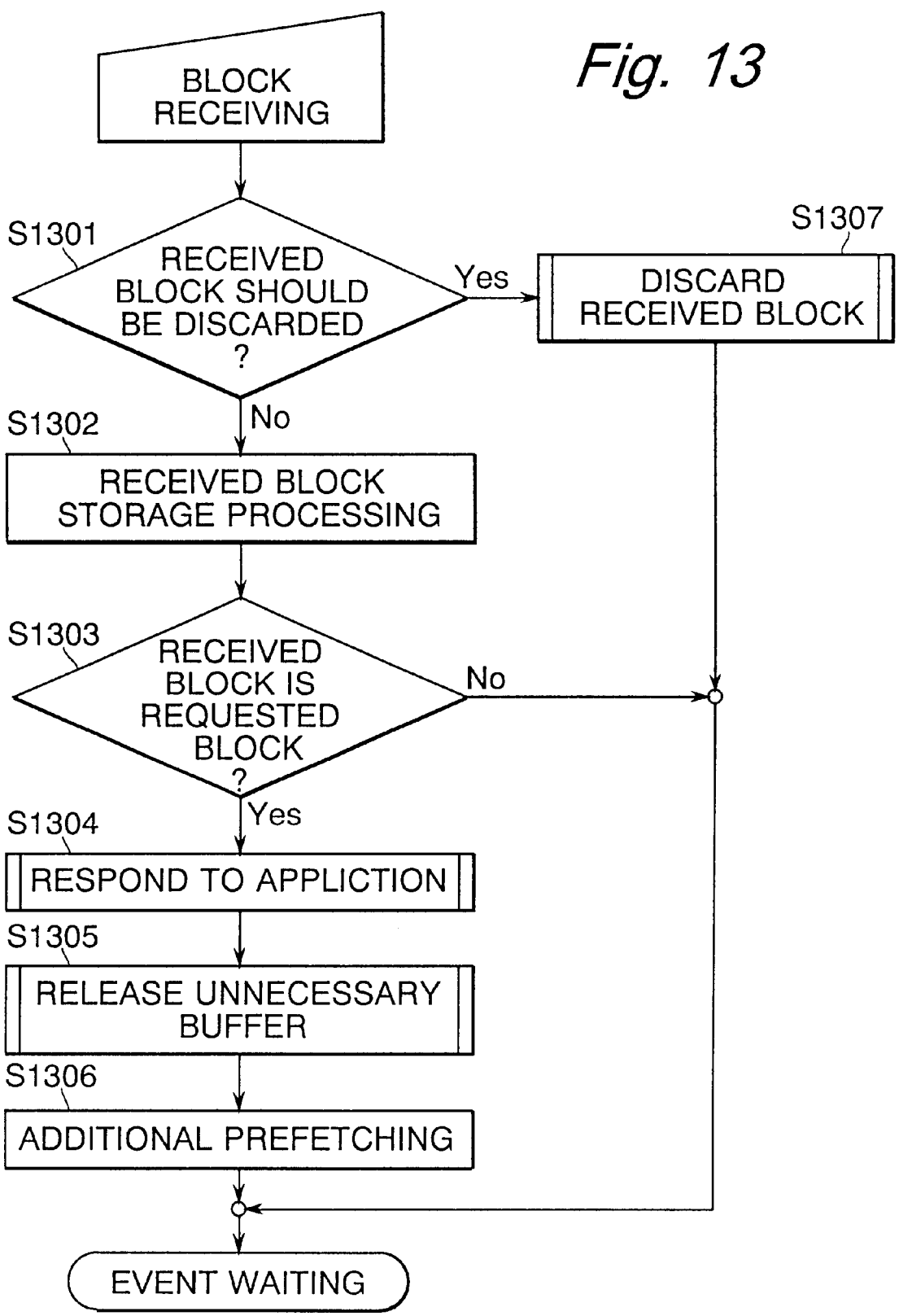
Figure 14:
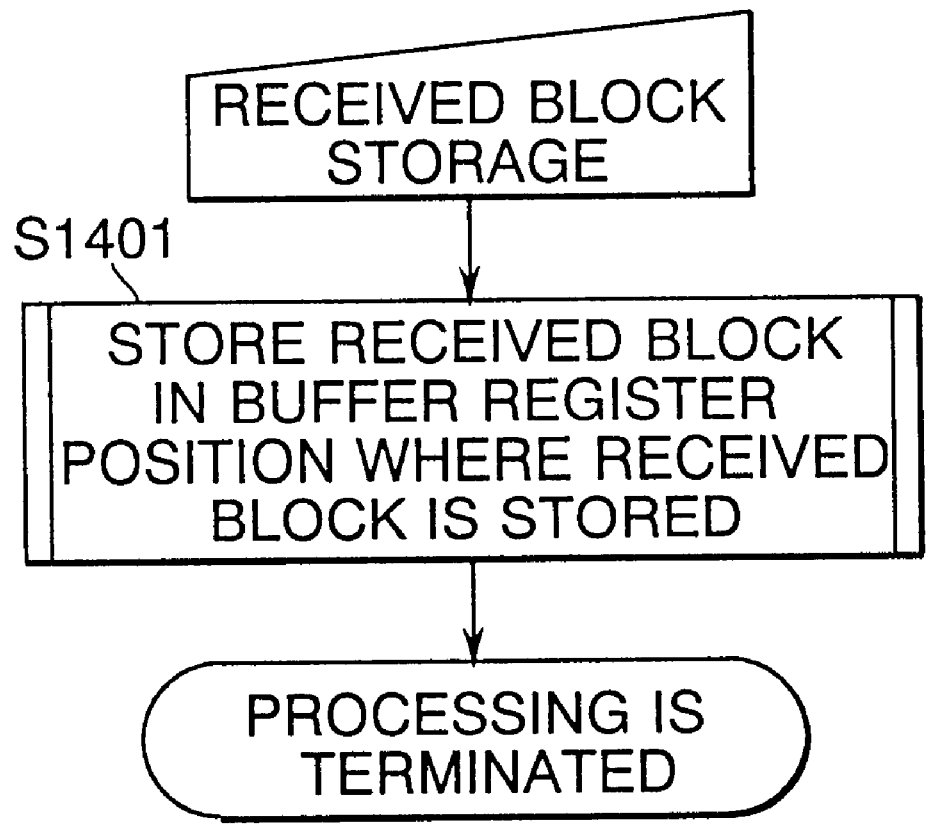
Figure 15:
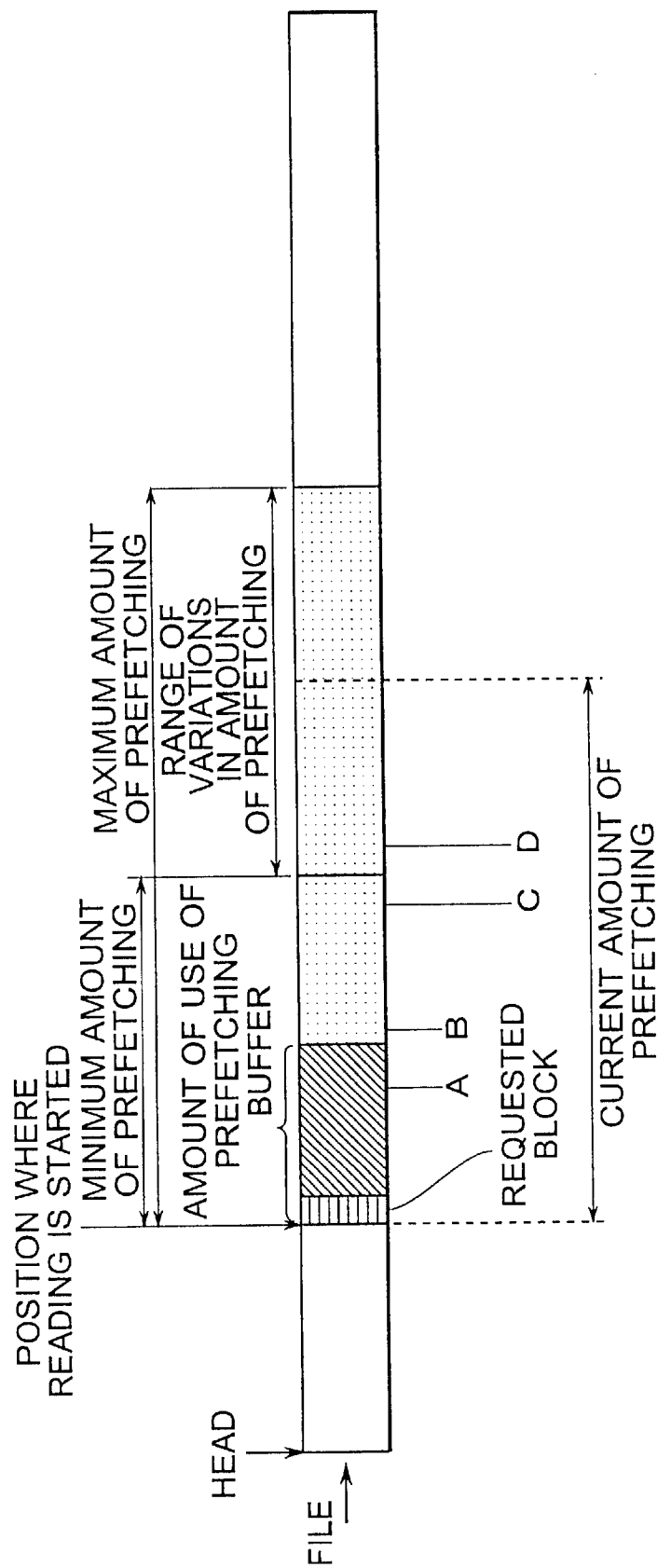
Figure 16:
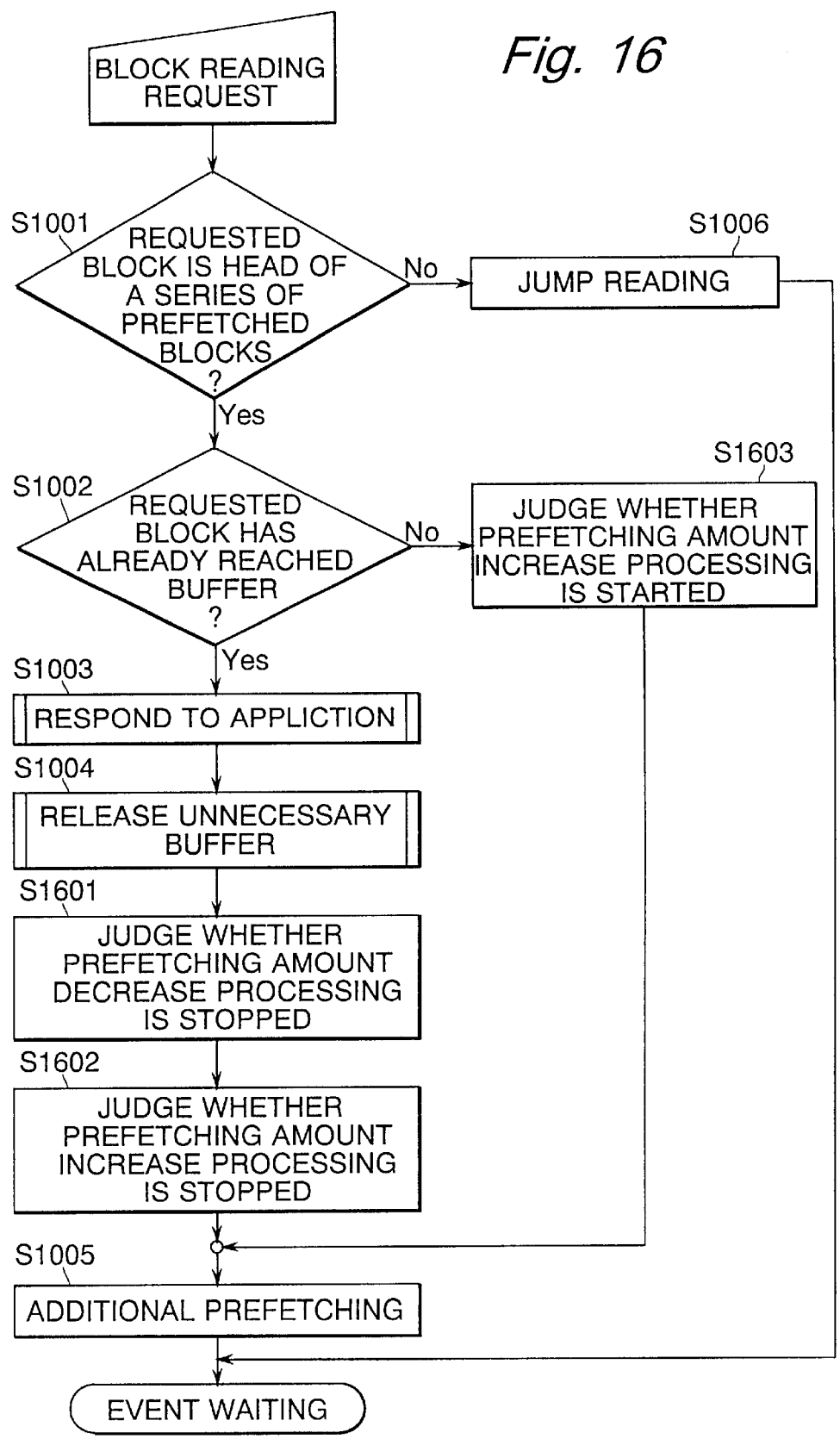
Figure 17:
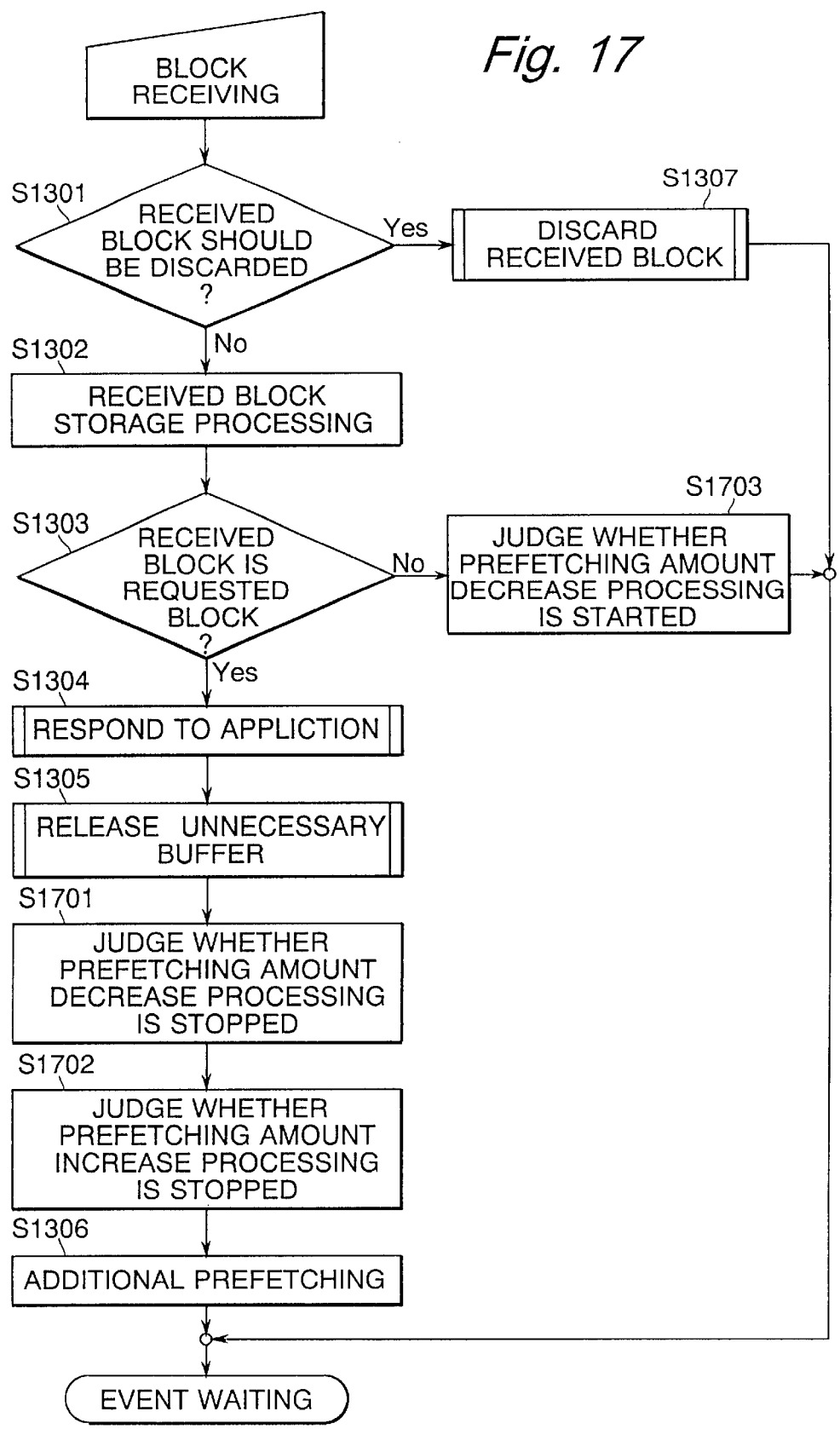
Figure 18:
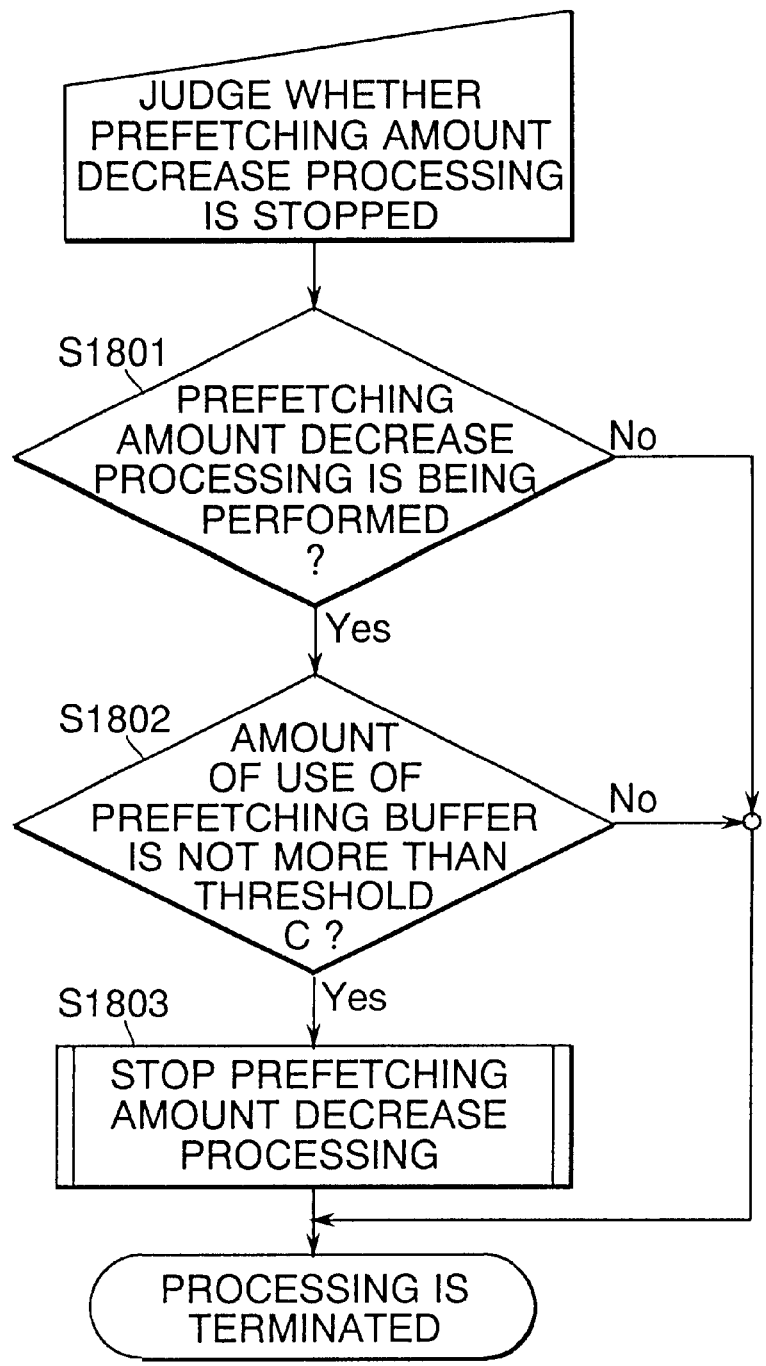
Figure 19:
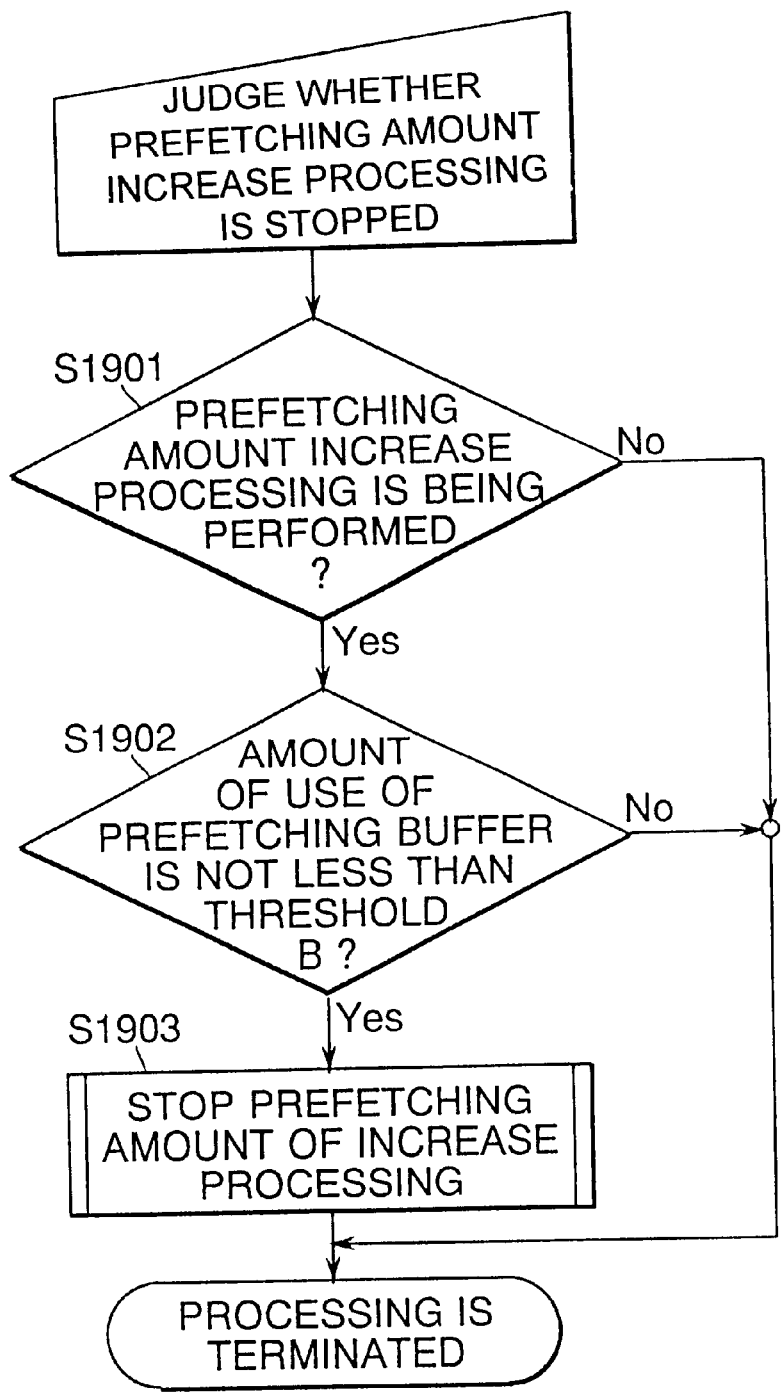
Figure 20:
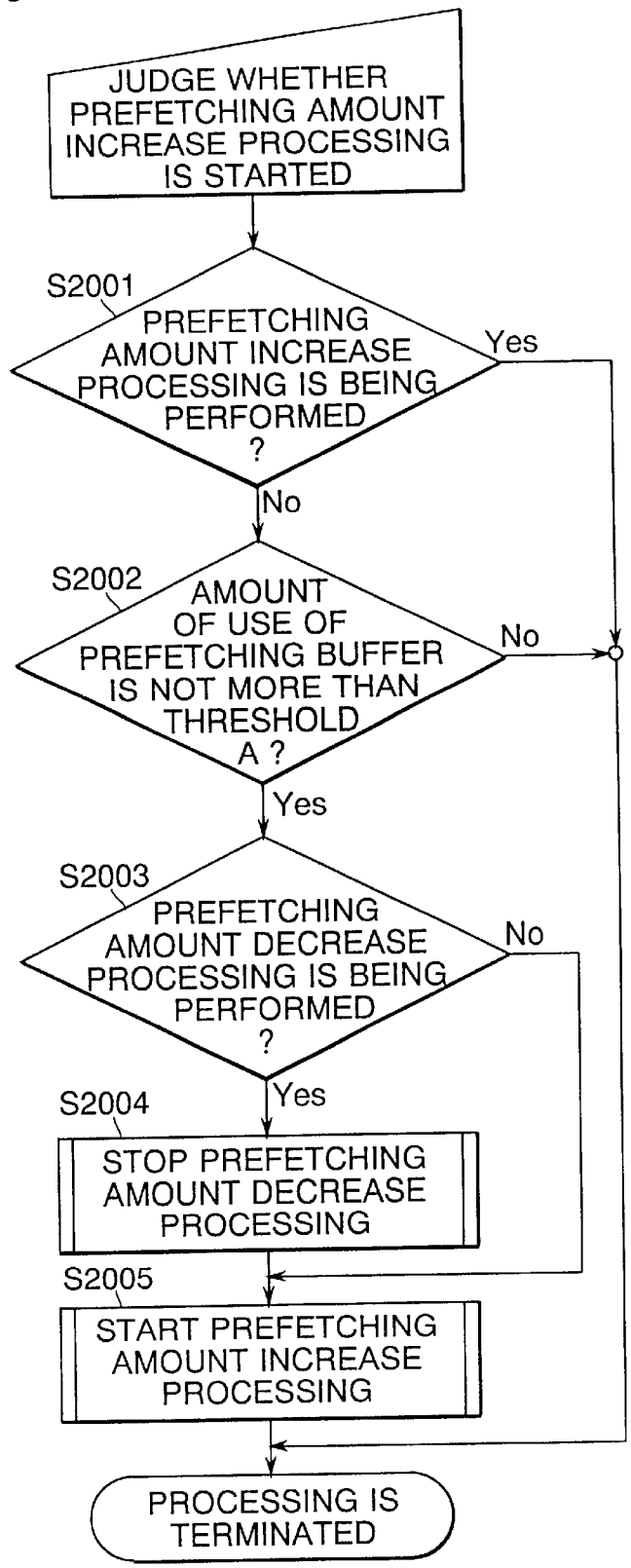
Figure 21:
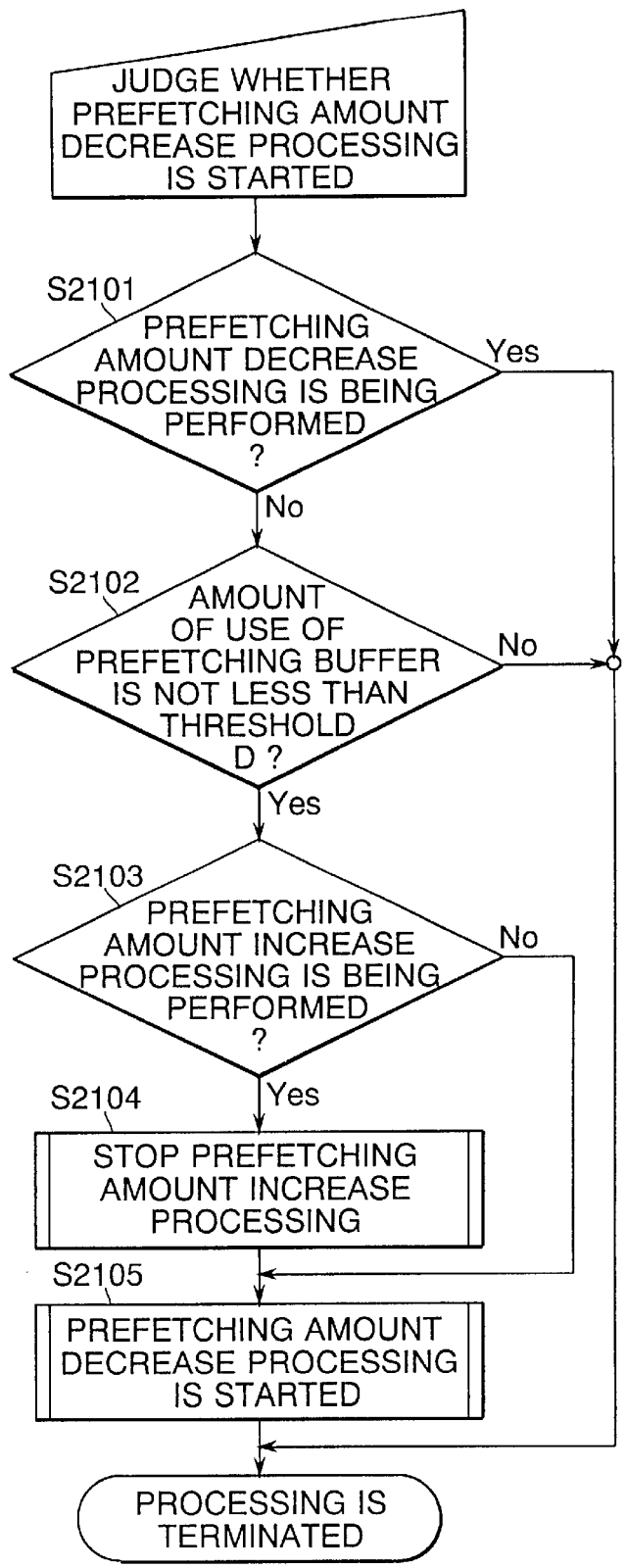
Figure 22:
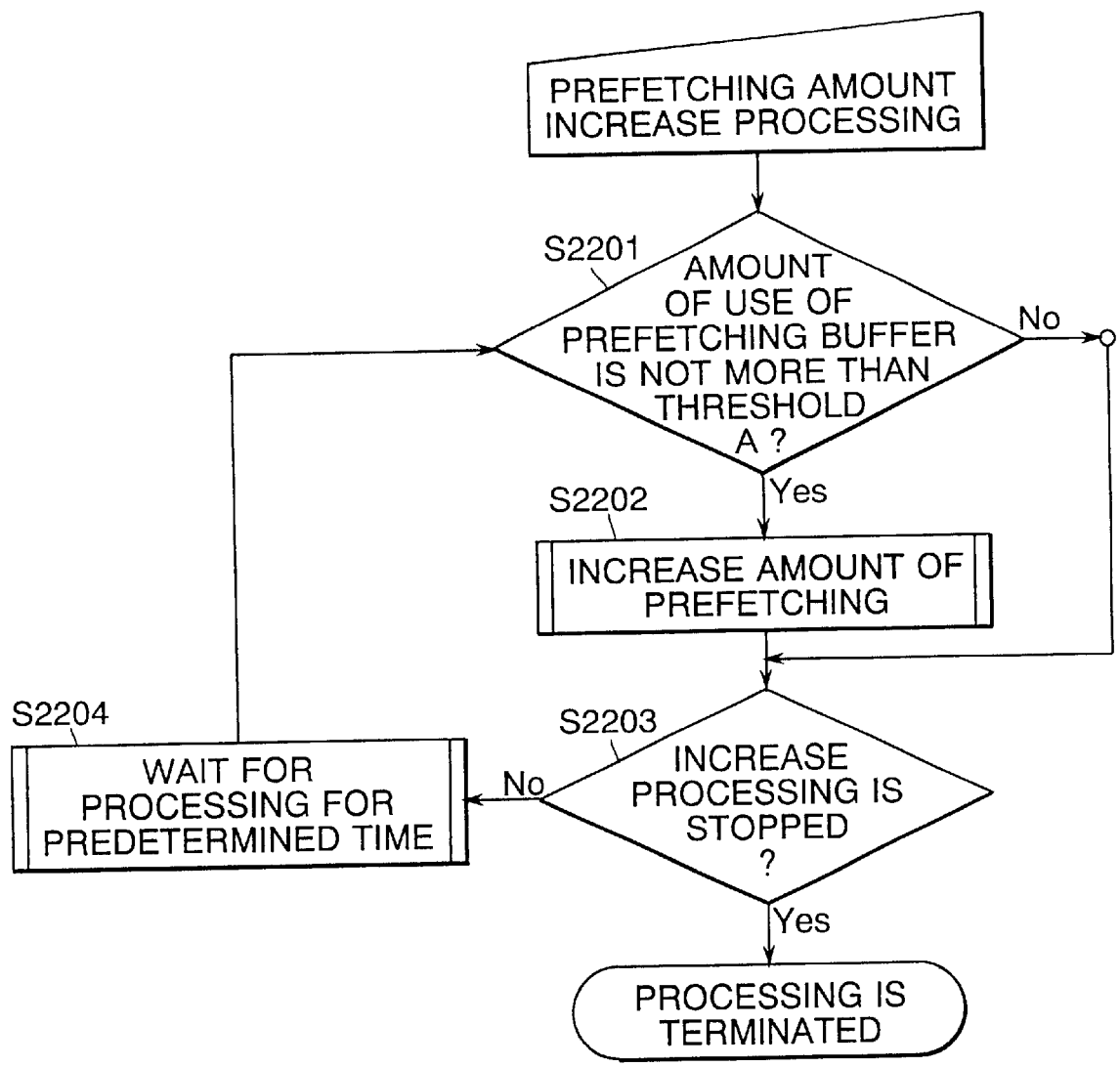
Figure 23:
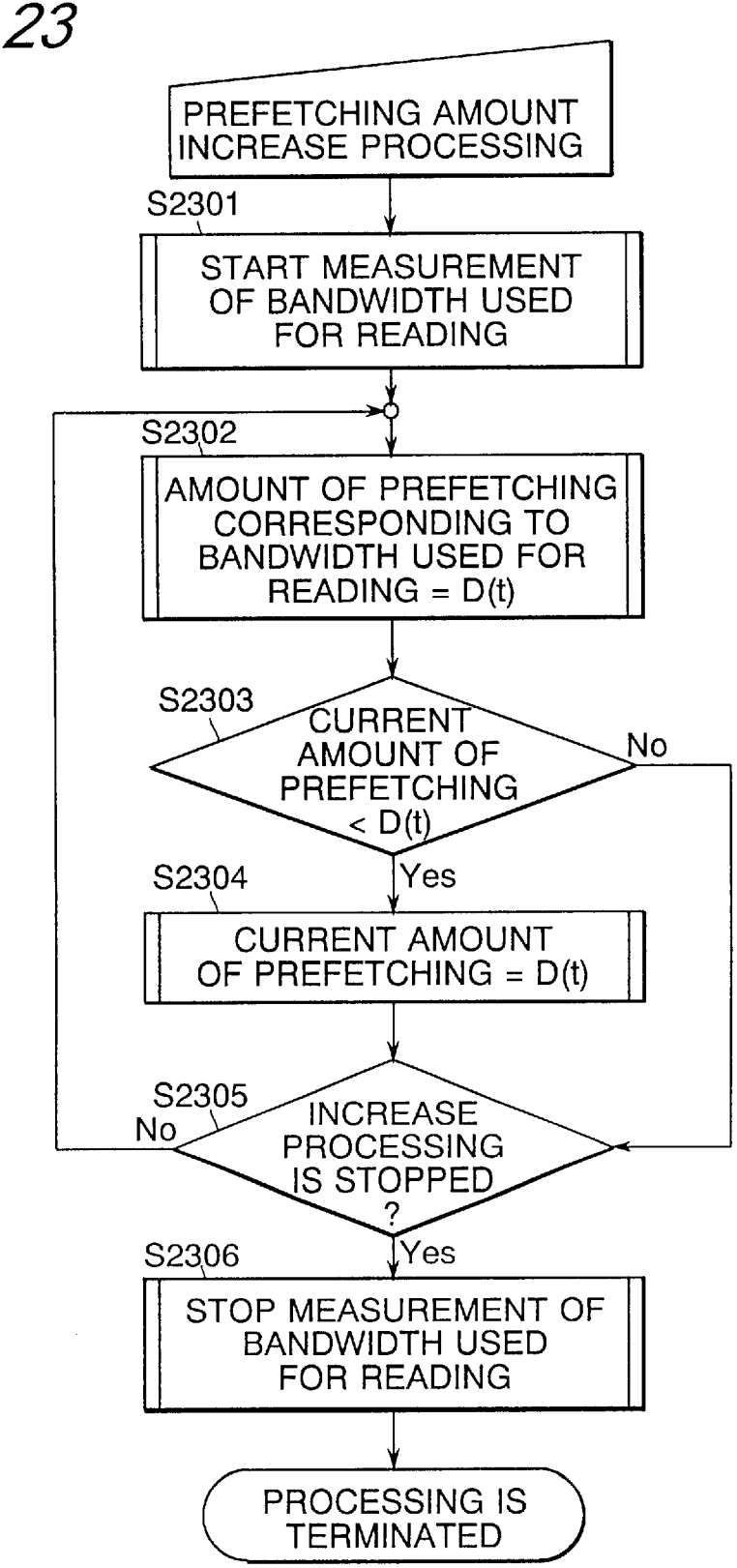
Figure 24:
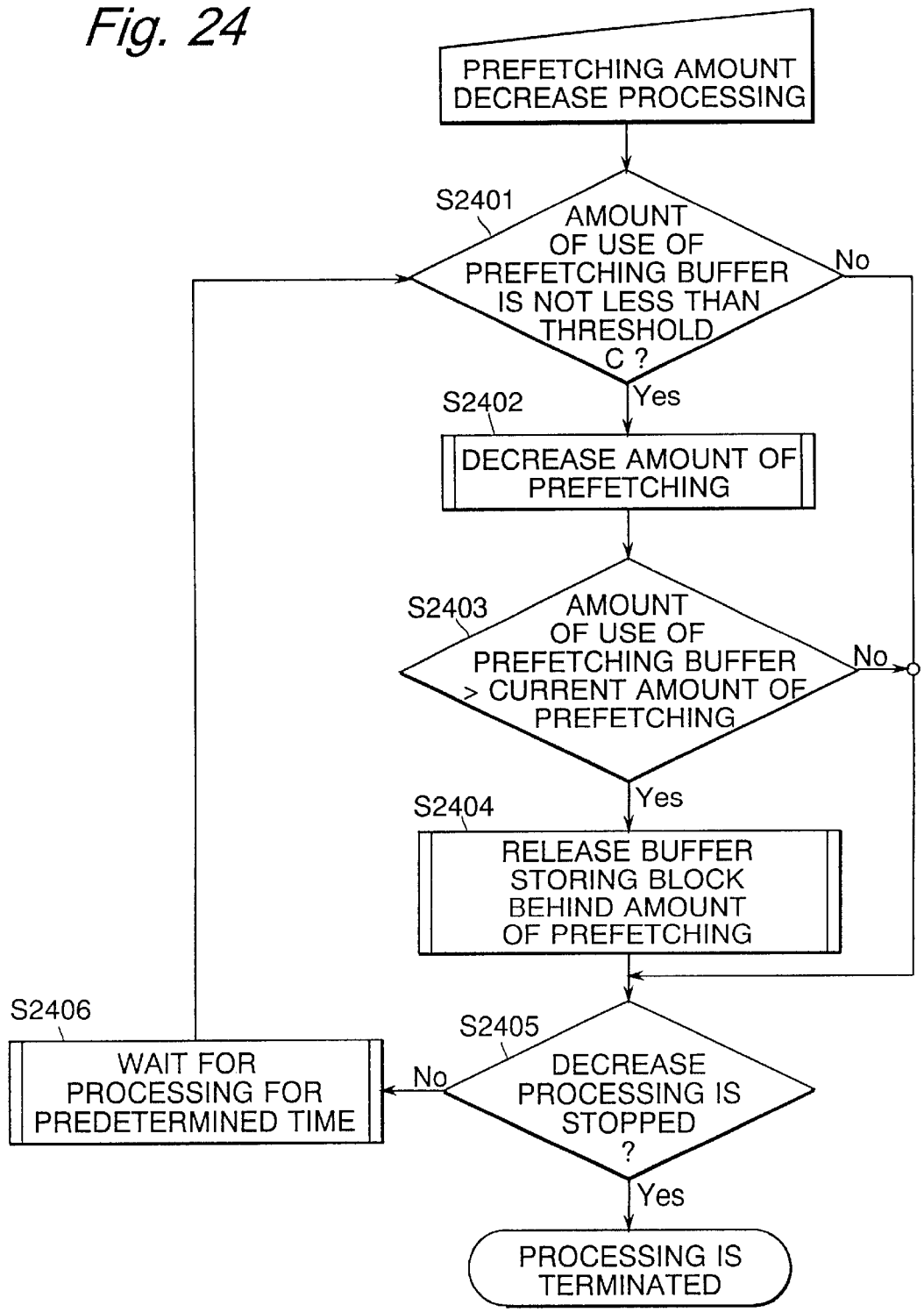
Figure 25:
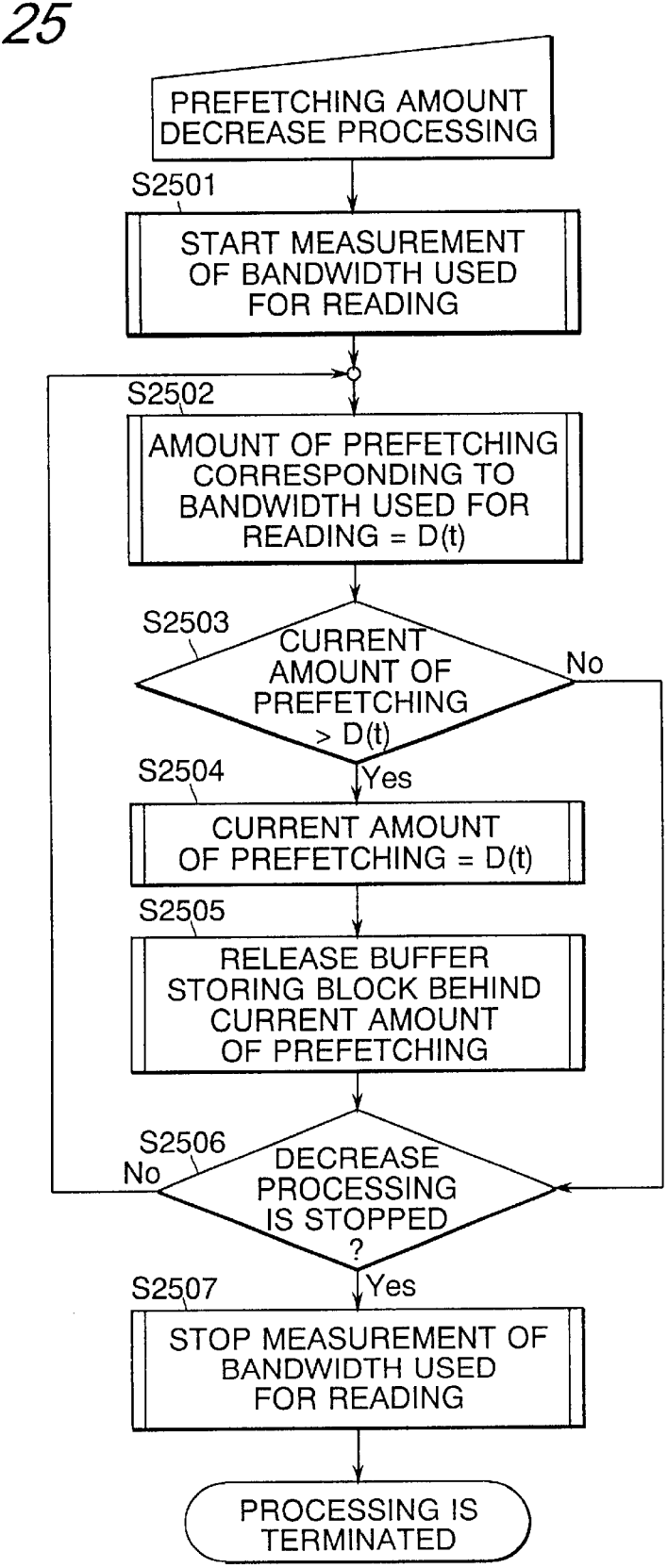
Figure 26:
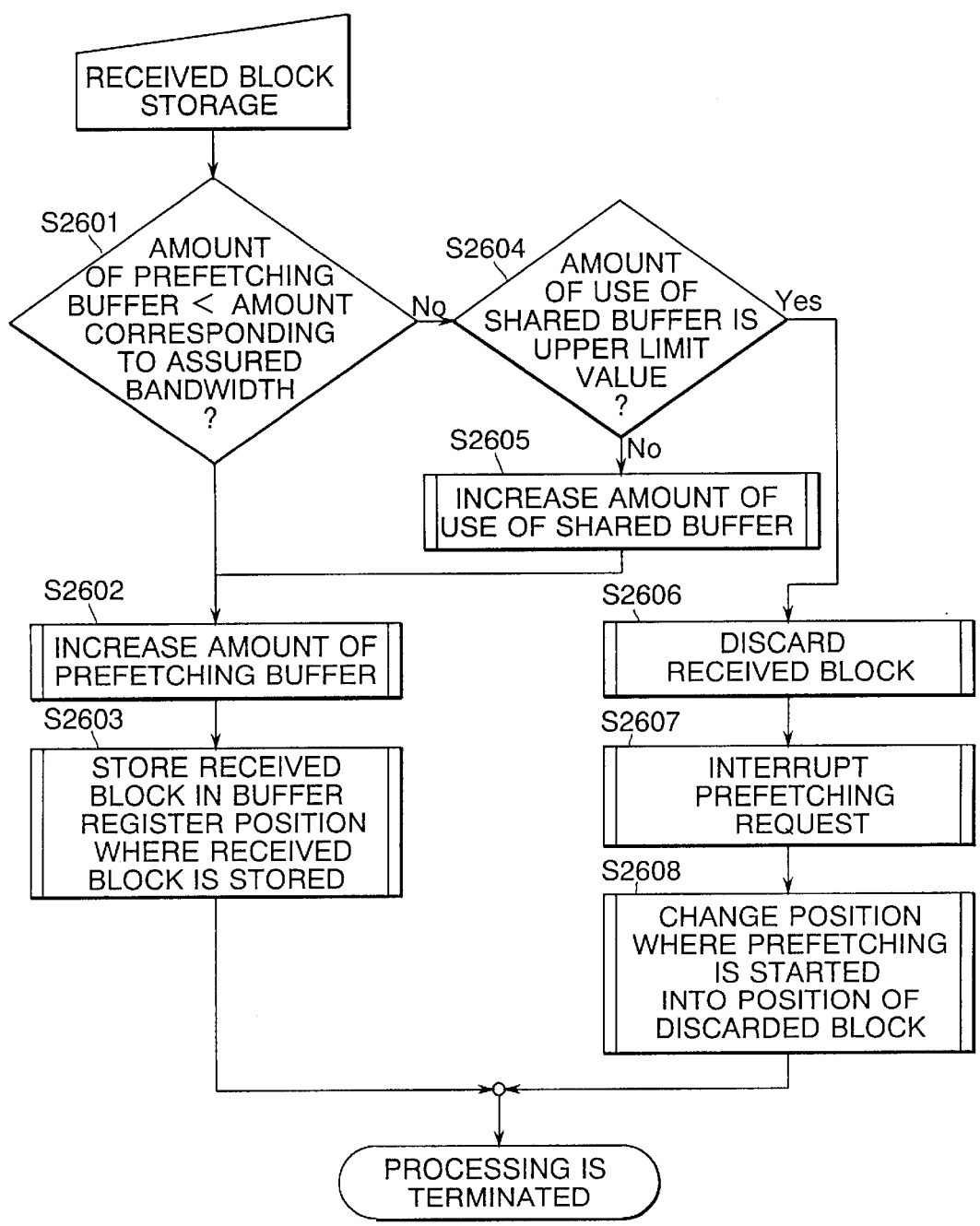
Figure 27:
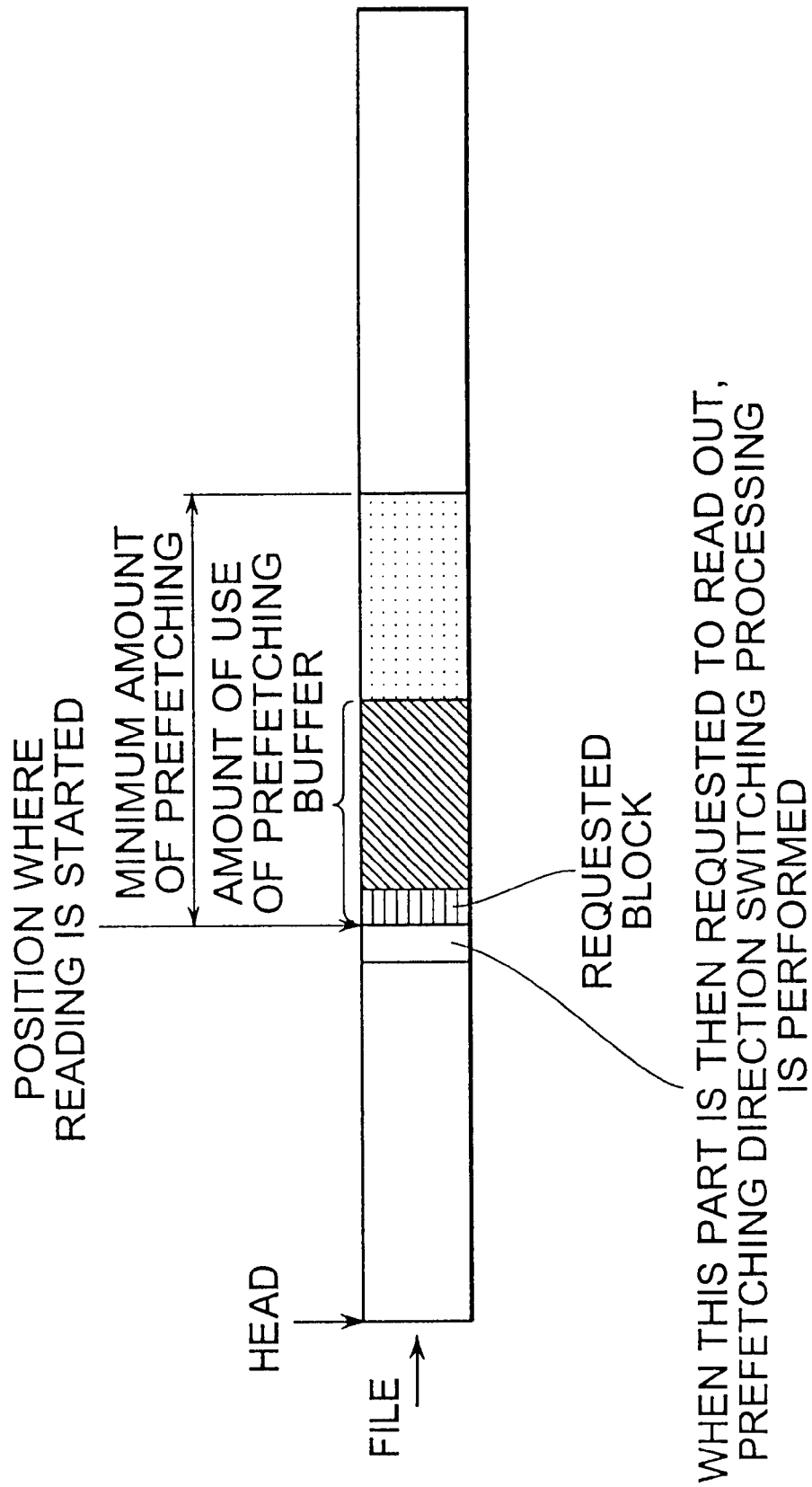
Figure 28:
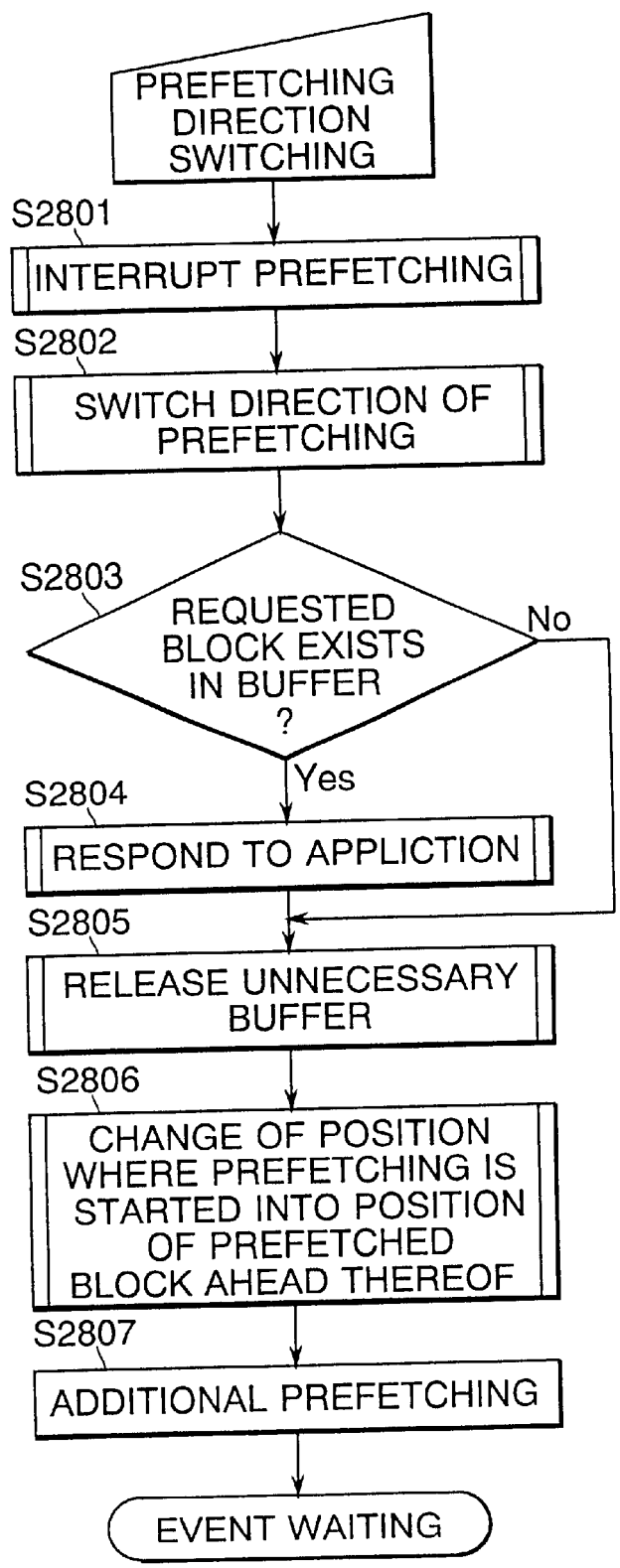
Figure 29:
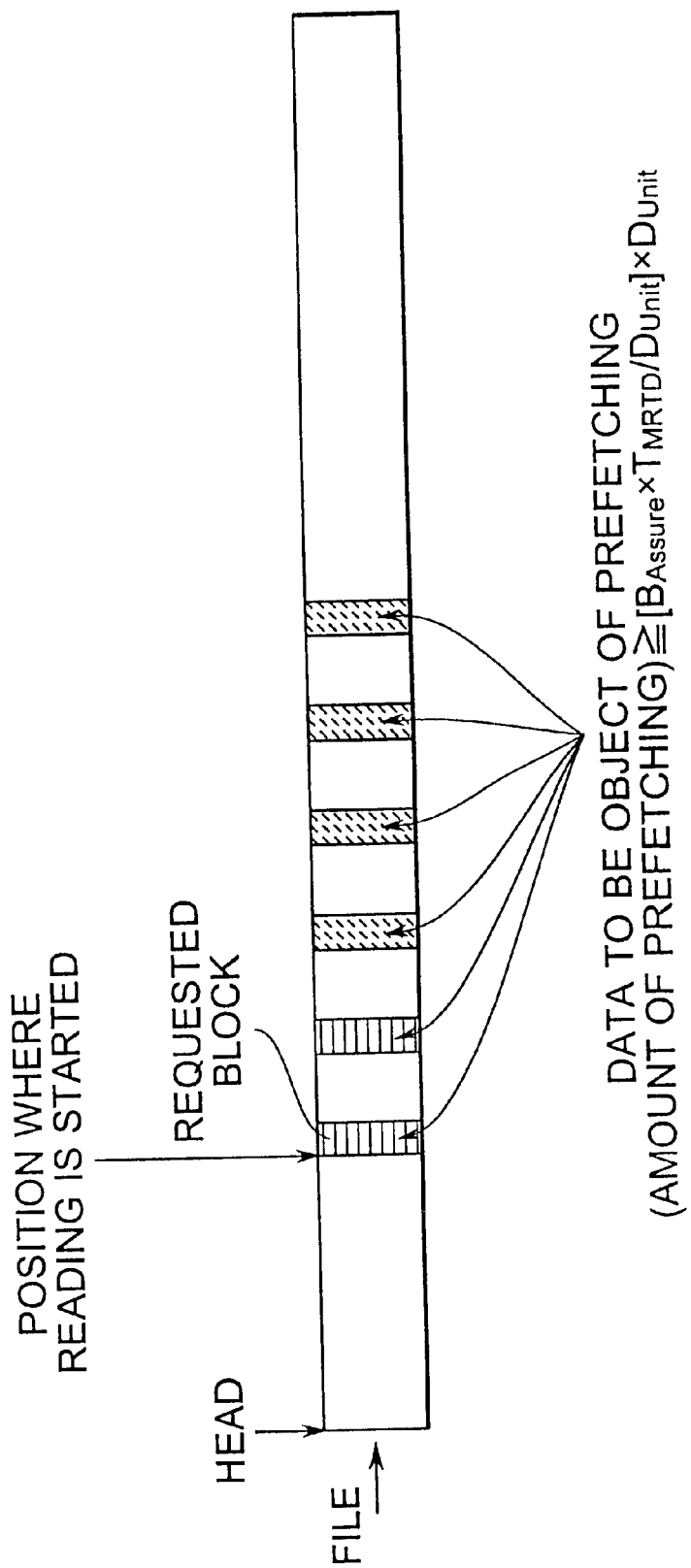
Figure 30:
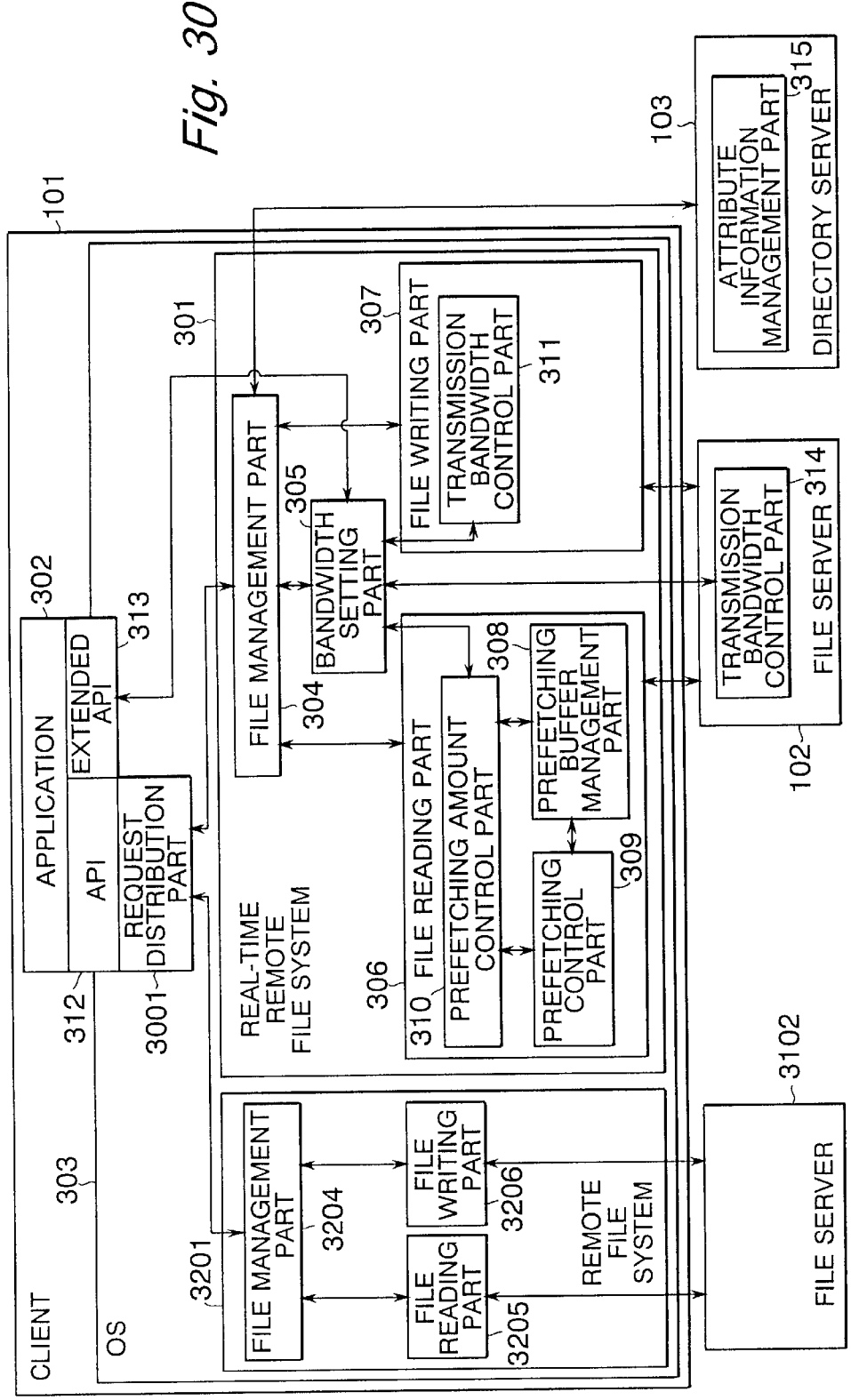
Figure 31:
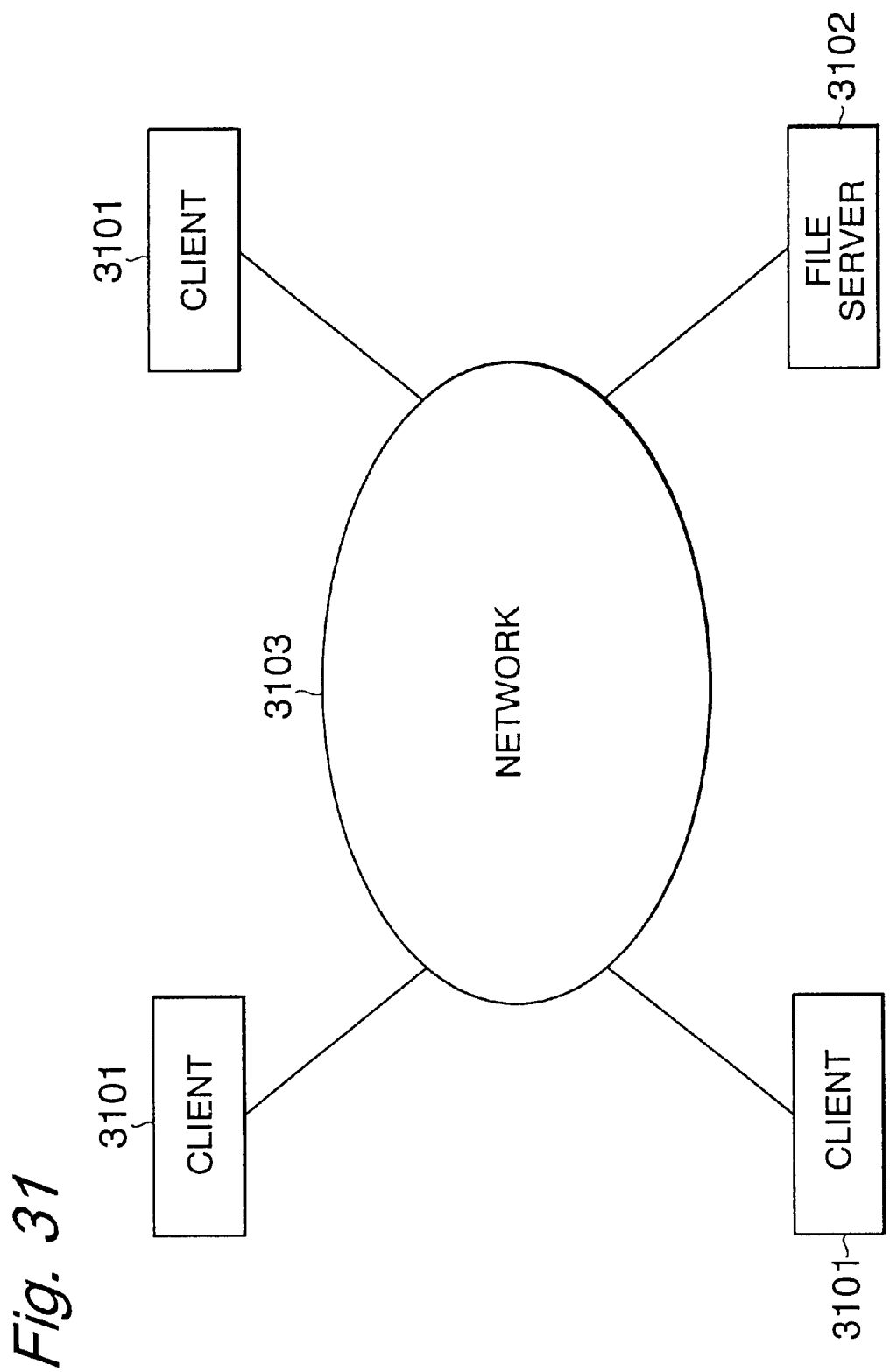
Figure 32:
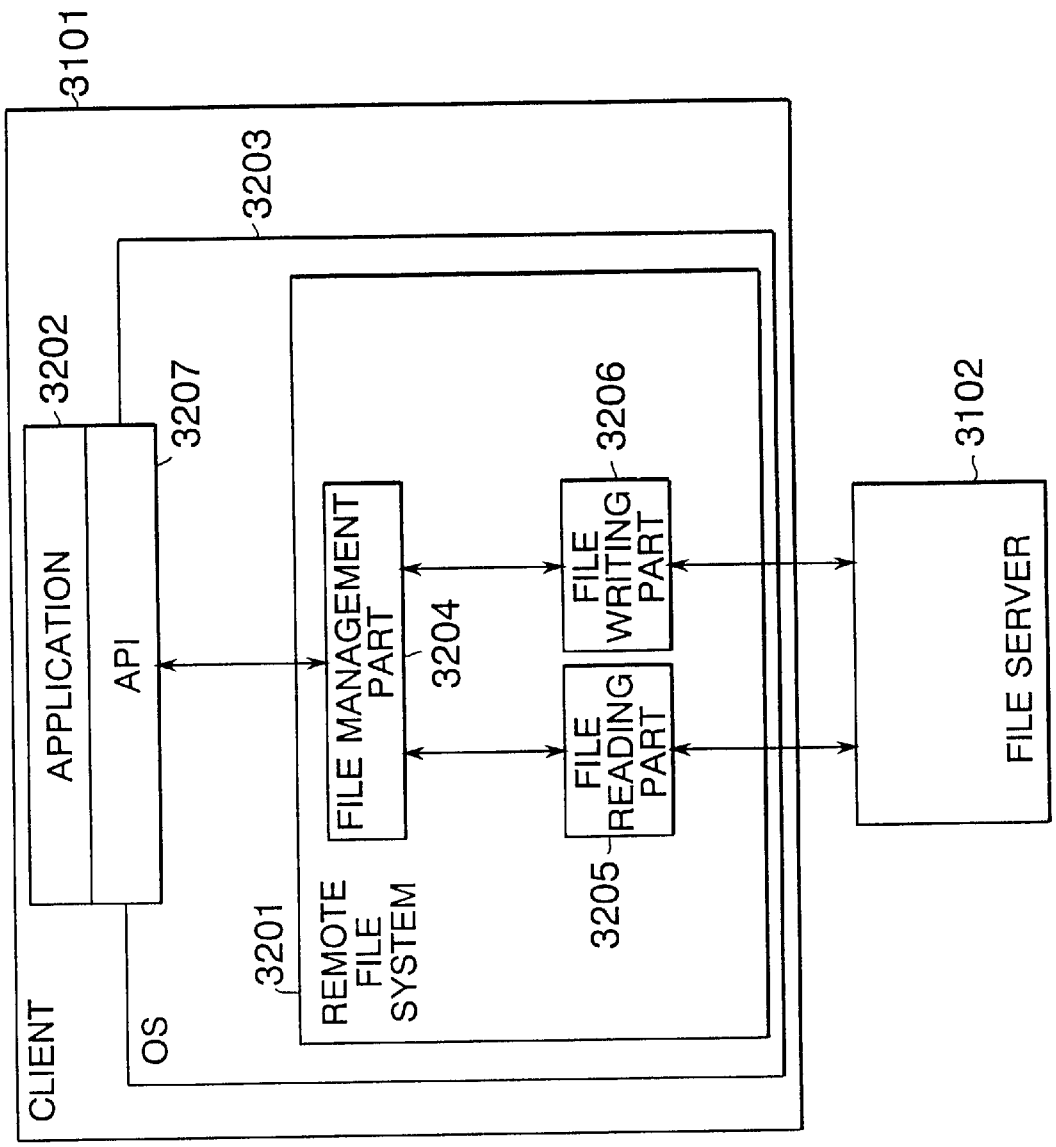
Figure 33:
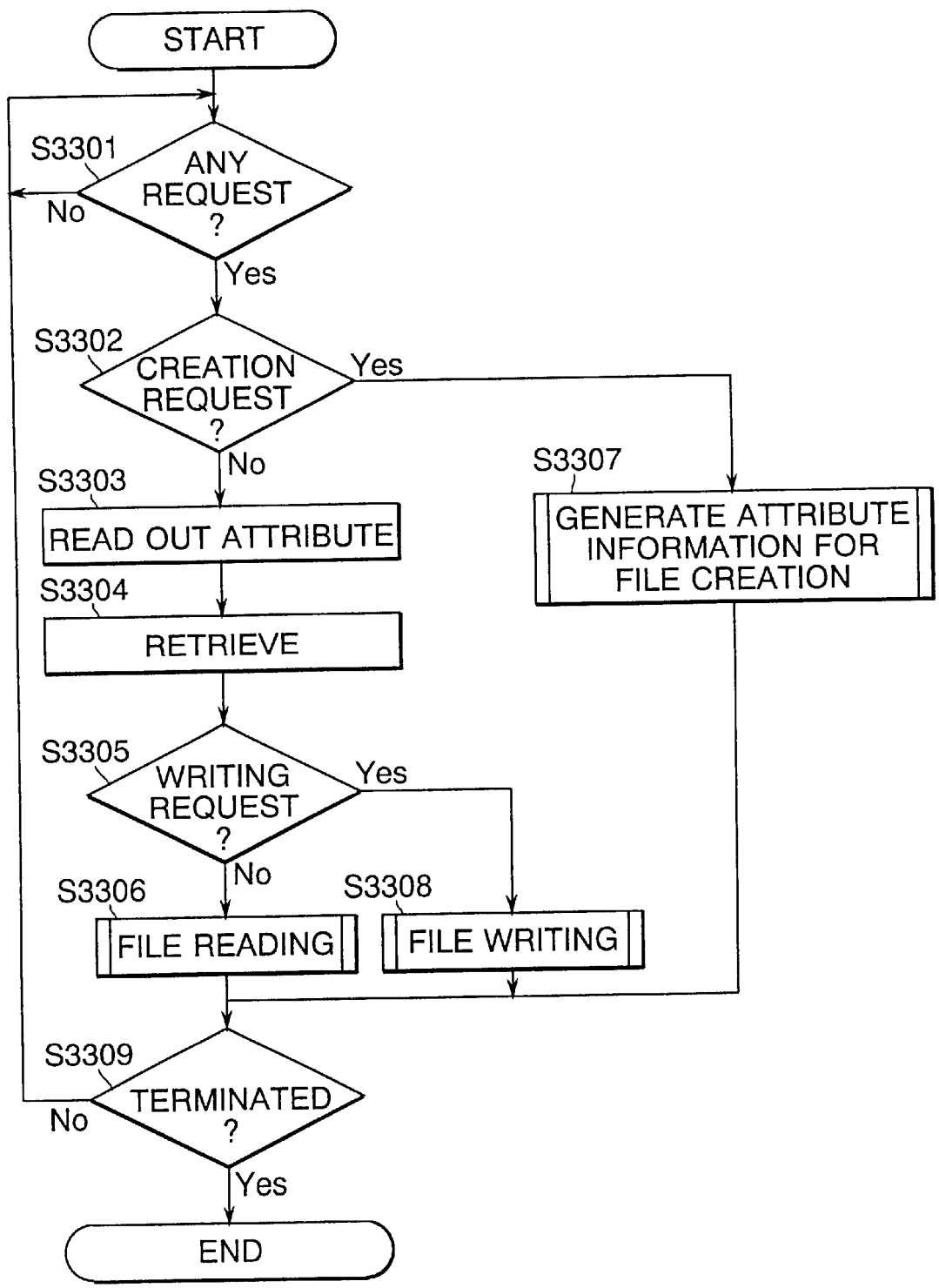
Figure 34:
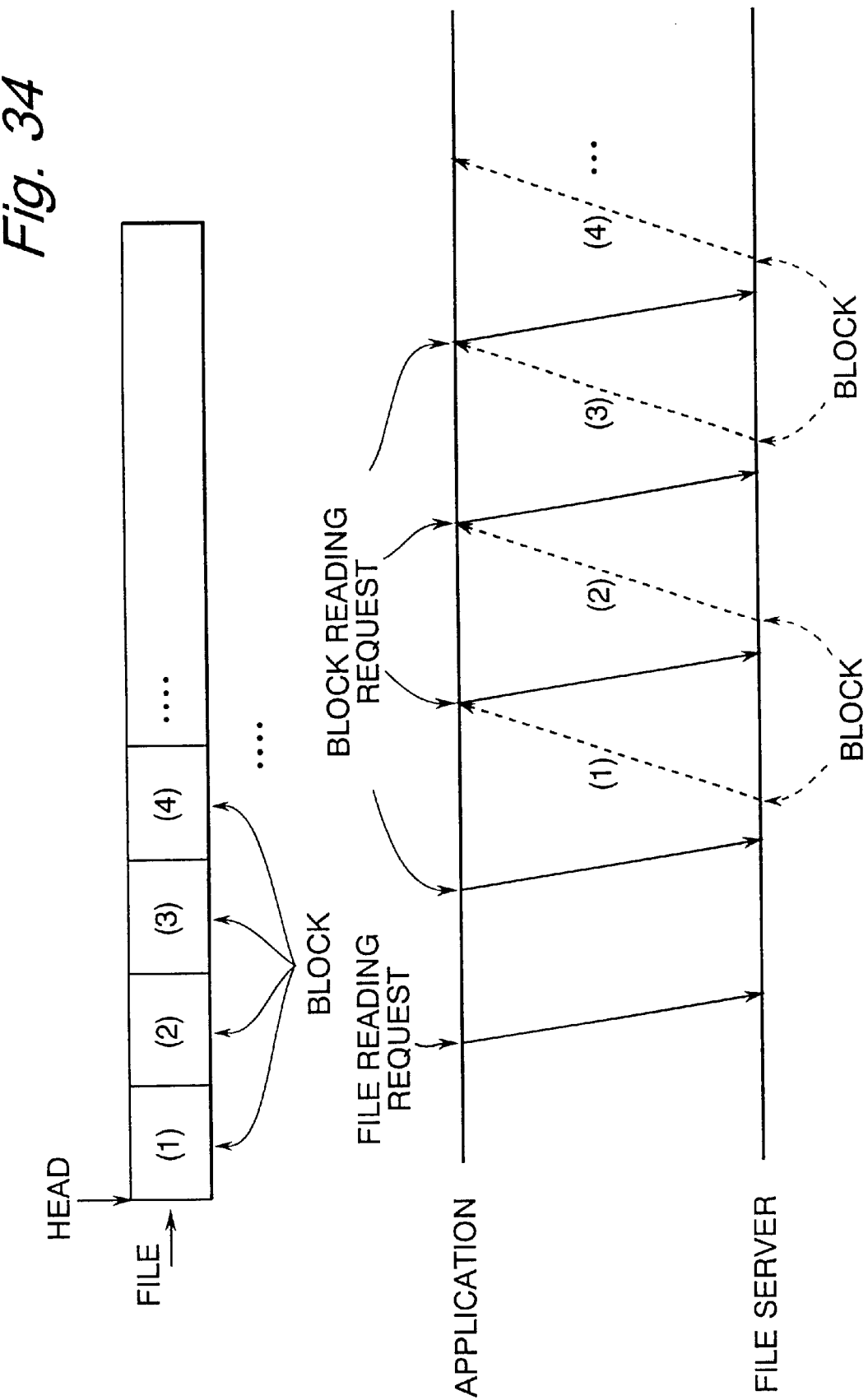

FIG. 10 is a flow chart showing block reading processing performed by a file reading part 306 shown in FIG. 3 in response to a block reading request from the application 302;

FIG. 11 is a flow chart showing additional prefetching processing at the step S1005 shown in FIG. 10;

FIG. 12 is a flow chart showing jump reading processing at the step S1006 shown in FIG. 10;

FIG. 13 is a flow chart showing processing performed by the file reading part 306 shown in FIG. 3 for storing a block read out (hereinafter referred to as received block) in a prefetching buffer;

FIG. 14 is a flow chart showing received block storage processing at the step S1302 shown in FIG. 13;

FIG. 15 is a diagram for intuitively explaining the principle of prefetching amount control carried out by a prefetching amount control part 310 shown in FIG. 3;

FIG. 16 is a flow chart showing block reading processing performed by the file reading part 306 shown in FIG. 3 in response to a block reading request from the application 302;

FIG. 17 is a flow chart showing processing performed by the file reading part 306 shown in FIG. 3 for storing a received block in a prefetching buffer;

FIG. 18 is a flow chart showing judgment whether or not prefetching amount decrease processing is stopped at the step S1601 shown in FIG. 16;

FIG. 19 is a flow chart showing judgment whether or not prefetching amount increase processing is stopped at the step S1602 shown in FIG. 16:

FIG. 20 is a flow chart showing judgment whether or not prefetching amount increase processing is started at the step S1603 shown in FIG. 16;

FIG. 21 is a flow chart showing judgment whether or not prefetching amount decrease processing is started at the step S1703 shown in FIG. 17;

FIG. 22 is a flow chart showing prefetching amount increase processing performed by the prefetching amount control part 310 shown in FIG. 3;

FIG. 23 is a flow chart showing another prefetching amount increase processing performed by the prefetching amount control part 310 shown in FIG. 3;

FIG. 24 is a flow chart showing prefetching amount decrease processing performed by the prefetching amount control part 310 shown in FIG. 3;

FIG. 25 is a flow chart showing another prefetching amount decrease processing performed by the prefetching amount control part 310 shown in FIG. 3;

FIG. 26 is a flow chart showing processing performed by the file reading part 306 shown in FIG. 3 for storing a block read out (a received block) in a prefetching buffer (including prefetching buffer amount control carried out by a prefetching buffer management part 308);

FIG. 27 is a diagram for intuitively explaining prefetching processing in a case where backward reproduction is performed;

FIG. 28 is a flow chart showing prefetching direction switching processing performed by a prefetching control part 309 shown in FIG. 3 as the backward reproduction is performed;

FIG. 29 is a diagram for intuitively explaining prefetching processing in a case where high-speed reproduction is performed;

FIG. 30 is a block diagram showing the configuration of a real-time remote file system according to another embodiment of the present invention;

FIG. 31 is a block diagram showing the configuration of a client server system to which a conventional remote file system is applied;

FIG. 32 is a block diagram showing the functional configuration of a conventional remote file system (in a case where it is applied to the client server system shown in FIG. 31);

FIG. 33 is a flow chart showing processing (file manipulation) that a remote file system 320 shown in FIG. 32 performs through a network 3103 upon being applied to the client server system shown in FIG. 31; and FIG. 34 is a timing chart showing an example of timing at which an application 3202 shown in FIG. 32 issues a file reading request and a series of block reading requests in the case of file reading (in the case of "synchronous" reading).

DESCRIPTION OF THE PREFERRED EMBODIMENTS

Embodiments of the present invention will be described while referring to drawings.

[Environment in which Real-time Remote File System is Applied]

Figure 1:
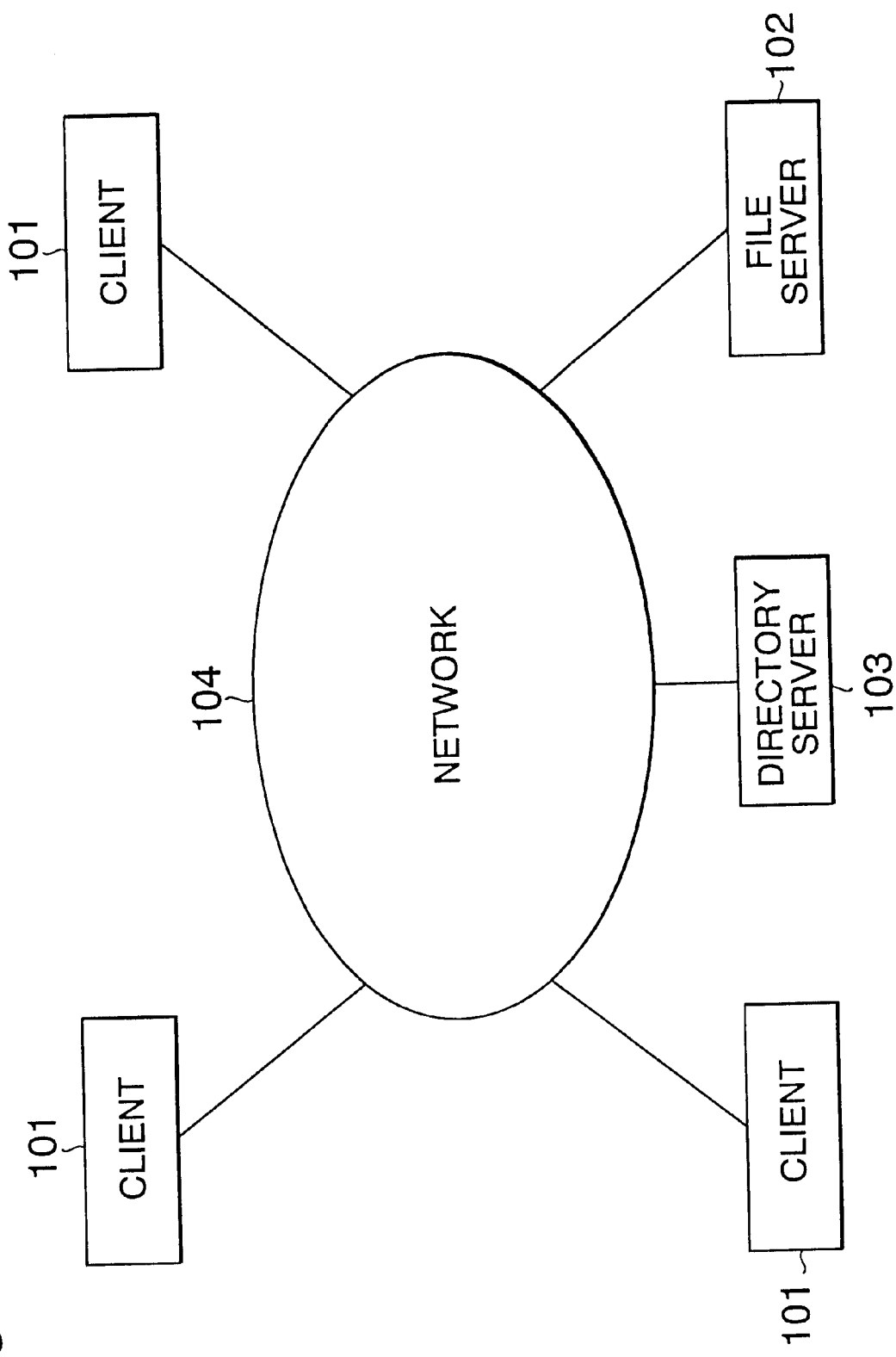
FIG. 1 is a block diagram showing the configuration of a client server system to which a real-time remote file system according to one embodiment of the present invention is applied.

FIG. 1 is a block diagram showing the configuration of a client server system to which a real-time remote file system according to one embodiment of the present invention is applied.

In FIG. 1, the client server system comprises a file server 102, a directory server 103, and a plurality of clients 101. The file server 102, the directory server 103, and the plurality of clients 101 are connected to one another through a network 104.

The file server 102, the directory server 103, and each of the clients 101 are respectively realized by computer devices. On the other hand, the network 104 is the same as the network 3101 shown in FIG. 31, and is realized by a wire network such as ATM or Ethernet or a wireless network such as W-CDMA.

Figure 2:
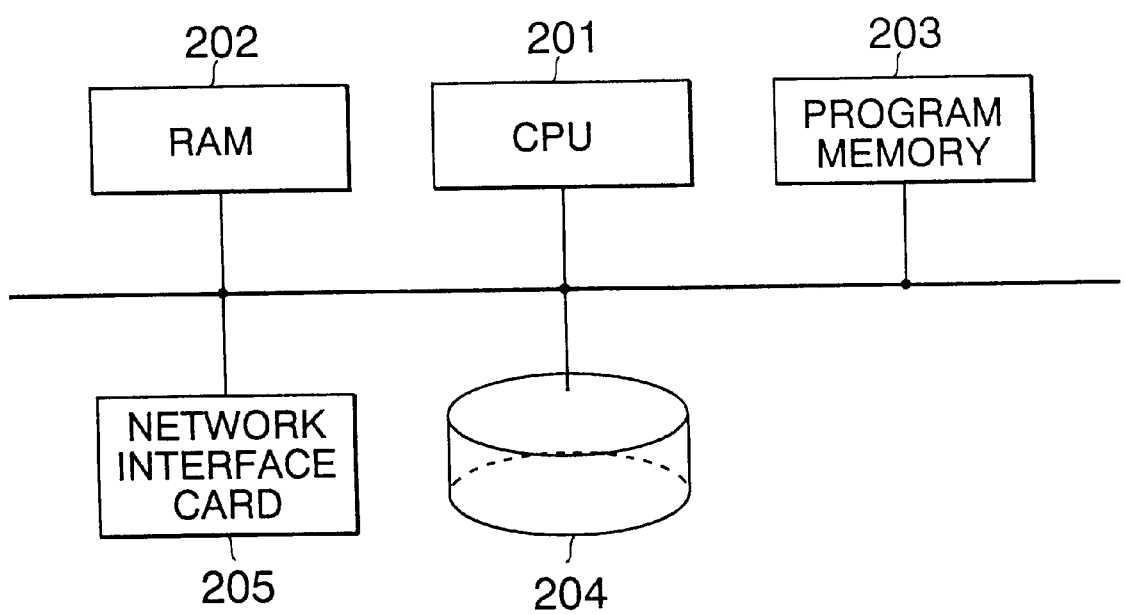
FIG. 2 is a block diagram showing an example of the configuration of a computer device realizing a file server 102, directory server 103, and each of clients 101 shown in FIG. 1.

FIG. 2 is a block diagram showing an example of the configuration of the computer device realizing the file server 102, the directory server 103 and each of the clients 101.

In FIG. 2, the computer device comprises a CPU 201, a RAM 202, a program memory 203, a recording disk 204, and a network interface card 205. The program memory 203 stores programs of an application 302 and an OS (including a file system). The CPU 201 operates in accordance with the programs. The RAM 202 stores the type of data necessary for the CPU 201 to operate, and is also utilized as a buffer temporarily storing a file read out (data constituting the file), for example. The recording disk 204 is a random-accessible disk-type recording medium, for example, a hard disk or a compact disk, and a file (particularly a moving image file composed of moving image data requesting real-time properties in the following) and attribute information representing the attribute of the moving image file are recorded thereon. The network interface card 205 inputs and outputs data to and from a network (the inside thereof may be provided with a dedicated buffer memory temporarily storing the file read out).

The following three methods are known as a method of storing a program in the program memory 203. The first is a method of previously storing a program in the program memory 203 at the time of shipment of the computer device. The second is a method of reading out, from a recording medium on which a program has been recorded, the program and storing the program in the program memory 203. The third is a method of storing a program supplied through a network in the program memory 203.

The attribute information also includes not only the same attribute information as conventional one, for example, a file name, a file size, or a directory but also attribute information relating to a bandwidth, for example, a standard bandwidth for reading/writing and the type of bandwidth assurance (the details will be described later). The former attribute information is utilized for managing or retrieving a moving image file, and the latter attribute information is utilized for controlling a transmission bandwidth for file reading/writing (i.e., a transmission bandwidth for transferring a file from the file server 102 to the client 101/ from the client 101 to the file server 102).

[Configuration of Real-time Remote File System]

FIG. 3 is a block diagram showing the configuration of the real-time remote file system according to one embodiment of the present invention (in a case where it is applied to the client server system shown in FIG. 1).

In FIG. 3, a real-time remote file system (hereinafter merely referred to as file system) 301 according to one embodiment of the present invention is a part of an OS 303 preparing an environment in which an application 302 operates on the computer device (see FIG. 2) realizing the client 101, and comprises a file management part 304, a bandwidth setting part 305, a file reading part 306, and a file writing part 307.

The file reading part 306 comprises a prefetching buffer management part 308, a prefetching control part 309, and a prefetching amount control part 310. The file writing part 307 comprises a transmission bandwidth control part 311. An API 312 and an extended API 313 are provided between the application 302 and the OS 303 (the OS 303 and the API 312 are the same as the OS 3203 and the API 3207 shown in FIG. 32).

The file system 301 further comprises another transmission bandwidth control part 314 provided in the file server 102 and an attribute information management part 315 provided in the directory server 103. Both the transmission bandwidth control part 314 and the attribute information management part 315 are constituent elements of the file system 301, although they are illustrated outside the file system 301.

The application 302 not only requests file manipulation such as file creation and writing/reading but also requests to set a standard bandwidth for writing/reading and the type of bandwidth assurance (the former request is referred to as file manipulation request, and the latter request is referred to as bandwidth setting request).

The API 312 converts the format of the file manipulation request from the application 302 into a format adapted to the OS 303. The extended API 313 converts the format of the bandwidth setting request from the application 302 into a format adapted to the OS 303.

The reason why the extended API 313 is required is that the API 312 does not have the function of converting a request relating to a bandwidth.

The OS 303 feeds to the file system 301 the file manipulation request whose format has been converted by the API 312 and the bandwidth setting request whose format has been converted by the extended API 313. The file system 301 performs file manipulation through the network 104 with respect to a recording disk of the file server 102 (the recording disk 204 shown in FIG. 2; the same is true for the following) in response to the fed file manipulation request, and sets the standard bandwidth for file reading/writing and the type of bandwidth assurance (hereinafter merely referred to as bandwidth setting) in response to the fed bandwidth setting request.

In the file system 301, the file management part 304 judges the type of the file manipulation request fed to the file system 301. As a result of the judgment, if the request is a file creation request, a file is created on the recording disk of the file server 102, and attribute information of the file is generated on a recording disk of the directory server 103. The attribute information management part 315 remotely arranged in the directory server 103 manages the attribute information recorded on the recording disk.

The attribute information generated by the file management part 304 and managed by the attribute information management part 315 includes attribute information for file management and retrieval such as a file name, a file size, and a directory and attribute information for bandwidth control such as a standard bandwidth for file reading/writing and the type of bandwidth assurance. The latter attribute information is a default (an initial set value) herein. If a bandwidth setting request is later issued from the application 302, and bandwidth setting is performed by the bandwidth setting part 305, the default is made invalid (or updated) at that time point.

On the other hand, if the request is a file reading request, the file management part 304 reads out the attribute information through the attribute information management part 315 from the directory server 103, and feeds the attribute information, together with the file reading request, to the file reading part 306. If the request is a file writing request, it reads out the attribute information through the attribute information management part 315 from the directory server 103, and feeds the attribute information, together with the file writing request, to the file writing part 307.

The bandwidth setting part 305 performs bandwidth setting in response to the bandwidth setting request fed to the file system 301. Here, the bandwidth for file reading/writing and the type of bandwidth assurance are set (or there is a method of updating a default in the directory server 103).

The file reading part 306 refers to the fed attribute information in response to the fed file reading request, to perform file reading out of the recording disk of the file server 102 through the network 104. The file writing part 307 refers to the fed attribute information in response to the fed file writing request, to perform file writing into the recording disk of the file server 102 through the network 104.

In the file reading part 306, the prefetching buffer management part 308 manages a buffer area (a prefetching buffer; described later) for temporarily storing prefetched data read out of the recording disk of the file server 102 by the file reading part 306, and monitors the amount of use of the buffer area (the amount of use of the prefetching buffer; described later) during the reading. The prefetching control part 309 carries out prefetching control (i.e., controls the file reading part 306 to perform prefetching).

The prefetching means, assuming that the order in which a plurality of blocks constituting a file are read out is previously determined, and the application 302 issues respective requests to read out the blocks in order, processing performed by the file system 301 for reading out, when it receives the request to read out the head block from the application 302, not only the head block but also a predetermined number of blocks subsequent thereto (the number can be designated by the file system depending on a bandwidth, which differs from the conventional prefetching)

previously (i.e., before receiving the request from the application 302) (or starting a reading operation) and storing the block in the prefetching buffer.

Thereafter, every time the request from the application 302 is received, the blocks in the prefetching buffer are copied on a buffer on the side of the application 302. If a block positioned a predetermined number of blocks previous to the requested block is additionally prefetched, not less than a predetermined number of prefetched blocks are always stored in the prefetching buffer.

The prefetching amount control part 310 determines the minimum value of the amount of data to be prefetched (the minimum amount of prefetching; described later) on the basis of the standard bandwidth for file reading included in the attribute information fed to the file reading part 306 and maximum delay time for reading (described later) inherent in the client server system shown in FIG. 1. The amount of prefetching is controlled such that even if a reading bandwidth is exceeding the standard bandwidth, the amount of use of the prefetching buffer is not below a predetermined amount in preparation for a case where the minimum bandwidth assurance is set as the type of bandwidth assurance.

In the file writing part 307, the transmission bandwidth control part 311 controls a transmission bandwidth used for file transfer from the client 101 to the file server 102 on the basis of the attribute information fed to the file writing part 307.

On the other hand, the transmission bandwidth control part 314 provided in the file server 102 controls a transmission bandwidth used for file transfer from the file server 102 to the client 101 when the file reading part 306 on the side of the client 101 performs file reading.

[Outline of Operation of Real-time Remote File System]

The outline of the operation of the real-time remote file system 301 configured as described above will be described later.

First, the application 302 requests file manipulation (any one of file creation, file reading, and file writing) or bandwidth setting. At this time, a file creation request, a file reading request, and a file writing request which are issued by the application 302 include information for designating a file to be an object of manipulation (for example, a file name), and a bandwidth setting request includes information for designating a file to be an object of setting, a standard bandwidth (described later), and the type of bandwidth assurance (any one of maximum bandwidth assurance, minimum bandwidth assurance, and bandwidth unassurance; described later).

The API 312 then converts the format of the file manipulation request from the application 302 into a format adapted to the OS 303. On the other hand, the extended API 313 converts the format of the bandwidth setting request from the application 302 into a format adapted to the OS 303. The OS 303 then feeds to the file system 301 the request whose format has been converted by the API 312 or the extended API 313.

The file system 301 performs file manipulation through the network 104 with respect to the file server 102 in response to the fed request. Further, it performs bandwidth setting for the file writing part and the file reading part 306 inside the file system 301 and the file server 102 (the former through directly and the latter through the network 104).

Figure 4:
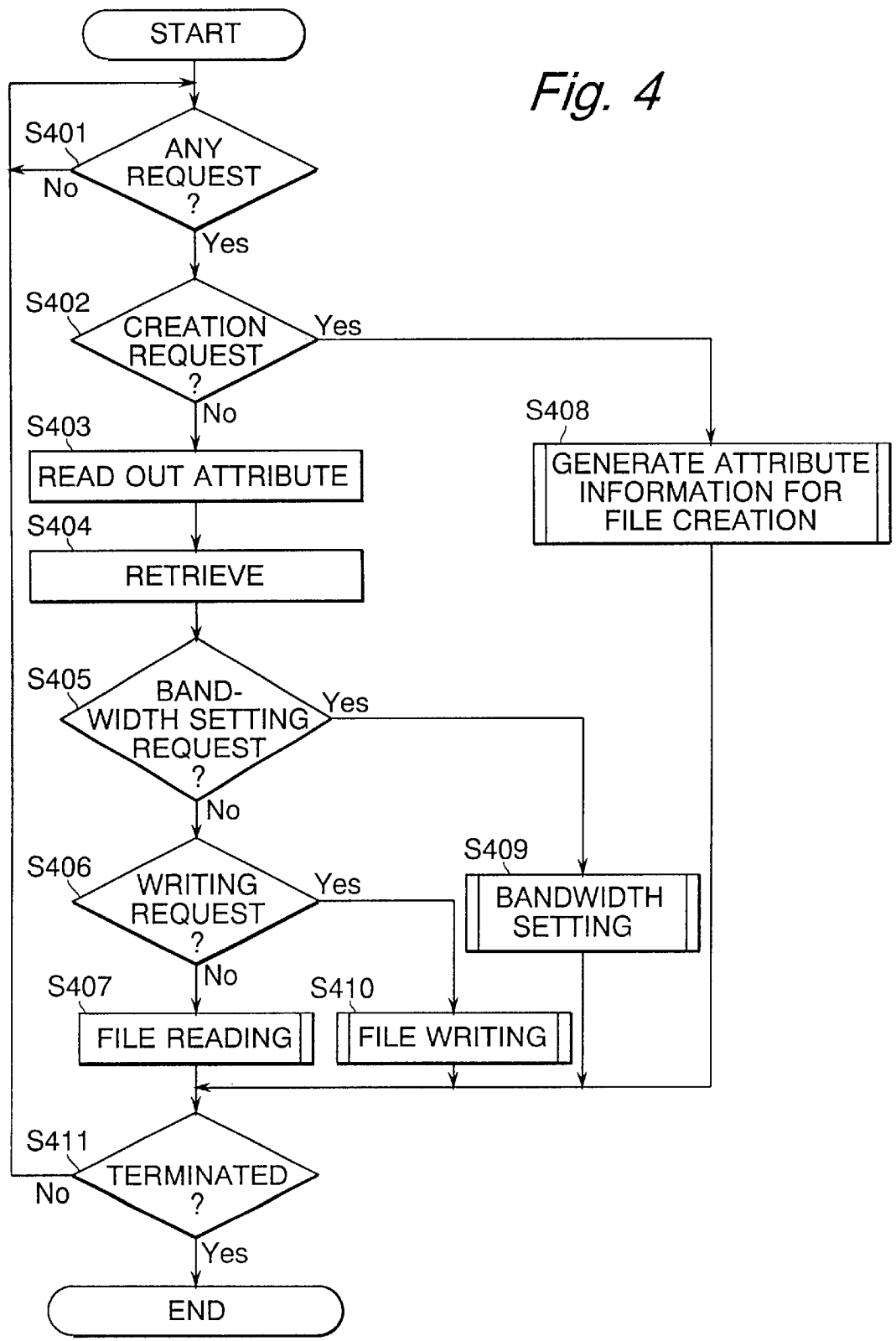
FIG. 4 is a flow chart showing processing (file manipulation and bandwidth setting) that the real-time remote file system according to a first embodiment of the present invention performs through a network 104 (or internally) upon being applied to the client server system shown in FIG. 1.

FIG. 4 is a flow chart showing processing (file manipulation and bandwidth setting) that the real-time remote file system according to the first embodiment of the present invention performs through the network 104 (or internally) upon being applied to the client server system shown in FIG. 1.

In FIG. 4, the file management part 304 first judges whether or not a request (any one of a file creation request, a file reading request, a file writing request, and a bandwidth setting request) is fed to the file system 301 (step S401). The file management part 304 waits if the result of the judgment is negative, while subsequently judging whether or not the request is the file creation request if it is affirmative (step S402). If the result of the judgment at the step S402 is affirmative, the procedure goes to the step S408.

When the result of the judgment at the step S402 is negative, the file management part 304 reads out attribute information through the attribute information management part 315 from the directory server 103 (step S403), and then retrieves a file to be an object of manipulation or setting in the file server 102 on the basis of a file name and a directory included in the attribute information read out (step S404). The retrieval means processing for finding where a file to be an object of manipulation or bandwidth setting is recorded in the recording disk of the file server 102.

The file management part 304 then judges whether of not the request fed to the file system 301 is a bandwidth setting request (step S405). When the result of the judgment at the step S405 is affirmative, the procedure goes to the step S409.

When the result of the judgment at the step S405 is negative, the file management part 304 judges whether or not the request fed to the file system 301 is a file writing request (step S406). When the result of the judgment at the step S406 is affirmative, the procedure goes to the step S410.

When the result of the judgment at the step S406 is negative, the file management part 304 notifies the file reading part 306 of the file reading request and the result of the retrieval at the step S404 (i.e., the place where a file to be an object of reading is recorded), and simultaneously notifies the file server 102 of the attribute information read out at the step S403. Correspondingly, the file reading part 306 performs file reading out of the file server 102 through the network 104 (step S407). At this time, in the file server 102, the transmission bandwidth control part 314 controls a transmission bandwidth (described later) on the basis of a standard bandwidth and the type of bandwidth assurance which are included in the fed attribute information. Thereafter, the procedure goes to the step S411.

In reading out the file, the prefetching control part 309 carries out prefetching control in the file reading part 306, so that a predetermined amount (a minimum amount of prefetching) of data is prefetched. The prefetched data is temporarily stored in the prefetching buffer, and is then copied on the buffer on the side of the application 302. The prefetching buffer management part 308 manages the prefetching buffer and the prefetched data stored therein, and reports the amount of use of the prefetching buffer (described later) to the prefetching amount control part 310. The prefetching amount control part 310 controls the amount of prefetching on the basis of the reported amount of use of the prefetching buffer. The prefetching buffer management processing, the prefetching processing and the prefetching amount control processing will be described later.

At the step S408, a file (a moving image file) is created by the file management part 304, and attribute information of the moving image file is simultaneously generated by the bandwidth setting part 305. The attribute information generated at this time includes attribute information for file management and retrieval (a file name, a file size, and a directory) and attribute information (a standard bandwidth and the type of bandwidth assurance; both are defaults) for transmission bandwidth control carried out in the case of file reading/writing (see steps S407 and S409). Thereafter, the procedure goes to the step S411.

The moving image file created at the step S408 is recorded on the recording disk of the file server 102, and the generated attribute information is recorded on the recording disk of the directory server 103. The moving image file in the file server 102 and the attribute information in the directory server 103 are respectively managed by the file management part 304 and the attribute information management part 315.

At the step S409, bandwidth setting is performed by the bandwidth setting part 305. That is, the file management part 304 notifies the bandwidth setting part 305 of the bandwidth setting request from the application. Correspondingly, the bandwidth setting part 305 sets the standard bandwidth and the type of bandwidth assurance. As a result of the bandwidth setting processing, the default in the directory server which is previously set at the step S408 is made invalid (or is updated to a standard bandwidth and the type of bandwidth assurance which are designated by the application 302).

At the step S410, file writing is performed by the file writing part 307. That is, the file management part 304 notifies the file writing part 307 of the file writing request, the result of the retrieval at the step S404 (i.e., the place where a file to be an object of writing is recorded), and the attribute information read out at the step S403. Correspondingly, the file writing part 307 performs file writing into the file server 102 through the network 104. In the case, in the file writing part 307, the transmission bandwidth control part 311 controls the transmission bandwidth (described later) on the basis of the standard bandwidth and the type of bandwidth assurance which are included in the fed attribute information. Thereafter, the procedure goes to the step S411.

At the step S411, it is judged whether or not the operation of the file system 301 is continued. If the result of the judgment is affirmative, the procedure is returned to the step S401, so that the same processing as described above is repeated. If it is negative, the operation is terminated.

[Standard Bandwidth and Type of Bandwidth Assurance]

The standard bandwidth and the type of bandwidth assurance which are set at the foregoing step S409 will be then described in detail.

FIG. 5 is a diagram showing an example of the standard bandwidth and the type of bandwidth assurance which are set by the bandwidth setting part 305 shown in FIG. 3.

In FIG. 5, a file handle is an identifier for specifying a file. The type of bandwidth assurance includes a total of three types, i.e., maximum bandwidth assurance, minimum bandwidth assurance, and bandwidth unassurance. Any one of them is set for each of files. For the file for which the maximum bandwidth assurance or the minimum bandwidth assurance is set, the standard bandwidth is simultaneously set.

Although in the present embodiment, bandwidth setting is performed for the file, it may be set for a directory, or may be set for the client 101. Alternatively, it is considered that it is set for each of systems utilizing the network 104.

The bandwidth unassurance means not assuring a bandwidth for performing file reading/writing (see steps S407 and S410) and performing, if there is a vacant bandwidth, file reading/writing using the vacant bandwidth.

The minimum bandwidth assurance means such bandwidth assurance as to assure a bandwidth for performing file reading/writing (a standard bandwidth) and further performing, it there is a vacant bandwidth, file reading/writing also using the vacant bandwidth. That is, in the case of the minimum bandwidth assurance, the standard bandwidth is the minimum value of a bandwidth used for file reading/writing.

The maximum bandwidth assurance means such bandwidth assurance as to assure a bandwidth for performing file reading/writing (a standard bandwidth) but not to perform, even if there is a vacant bandwidth, file reading/writing using the vacant bandwidth. That is, in the case of the maximum bandwidth assurance, the standard bandwidth is the maximum value of a bandwidth used for file reading/writing.

[Transmission Bandwidth Control Based on Standard Bandwidth and Type of Bandwidth Assurance]

The transmission bandwidth control which is carried out by the transmission bandwidth control parts 314 and 311 at the foregoing steps S407 and S410 will be described in detail. Since control carried out by the transmission bandwidth control part 311 in the file writing part 307 and control carried out by the transmission bandwidth control part 314 in the file server 102 are the same in the principle of control. Therefore, description is made of the control carried out by the transmission bandwidth control part 314 in the file server 102 (in a case where file reading is performed, as viewed from the file system 301).

FIGS. 6A and 6B are diagrams showing examples of the standard bandwidth and the type of bandwidth assurance which are set by the bandwidth setting part 305 shown in FIG. 3.

In FIG. 6A, the standard bandwidth and the type of bandwidth assurance are set with respect to four files (file handles "1" to "4"). Maximum bandwidth assurance and bandwidth unassurance are respectively set with respect to the file handles "1" to "3" and the file handle "4". The standard bandwidth is 60 Mbps and 30 Mbps, respectively, with respect to the file handles "1" and "2" and the file handle "3". On the other hand, in FIG. 6B, minimum bandwidth assurance and bandwidth unassurance are respectively set with respect to the file handles "1" to "3" and the file handle "4". The standard bandwidth is 60 Mbps and 30 Mbps, respectively, with respect to the file handles "1" and "2" and the file handle "3", as in FIG. 6A.

Figure 7A:
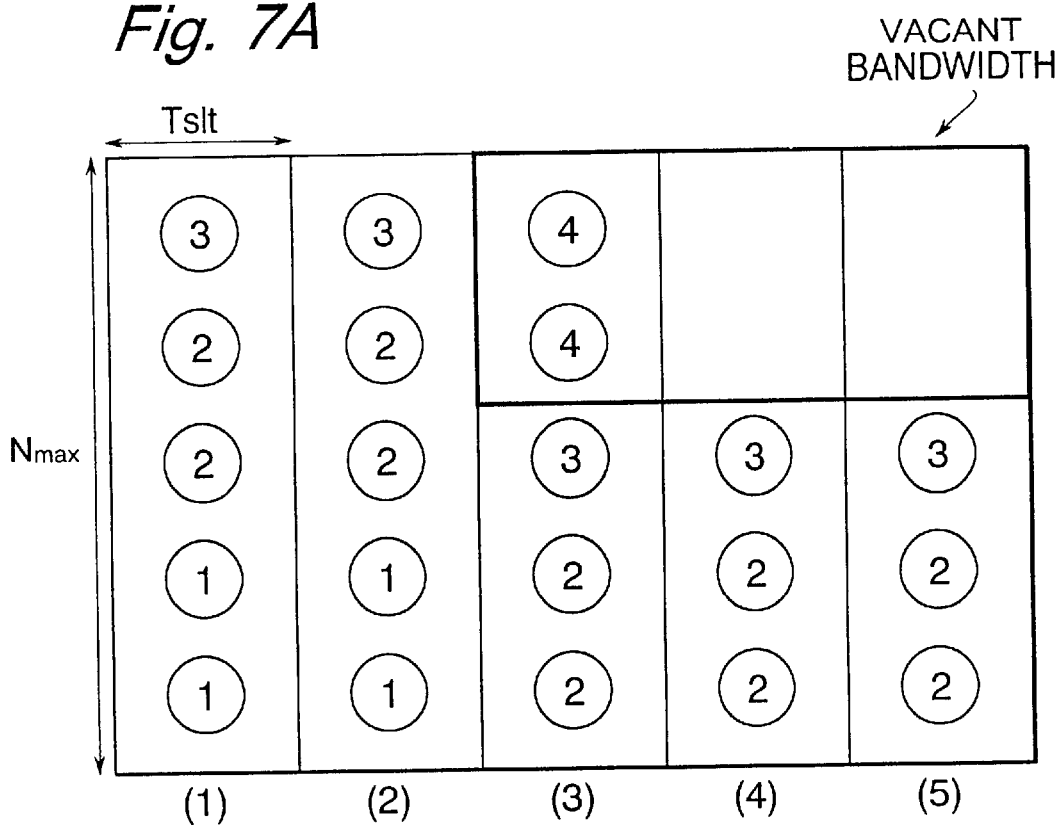
FIGS. 7A and 7B are diagrams for intuitively explaining transmission bandwidth control carried out by a transmission bandwidth control part 314 shown in FIG. 3 on the basis of the standard bandwidth and the type of bandwidth assurance which are set as shown in FIGS. 6A and 6B.
Figure 7B:
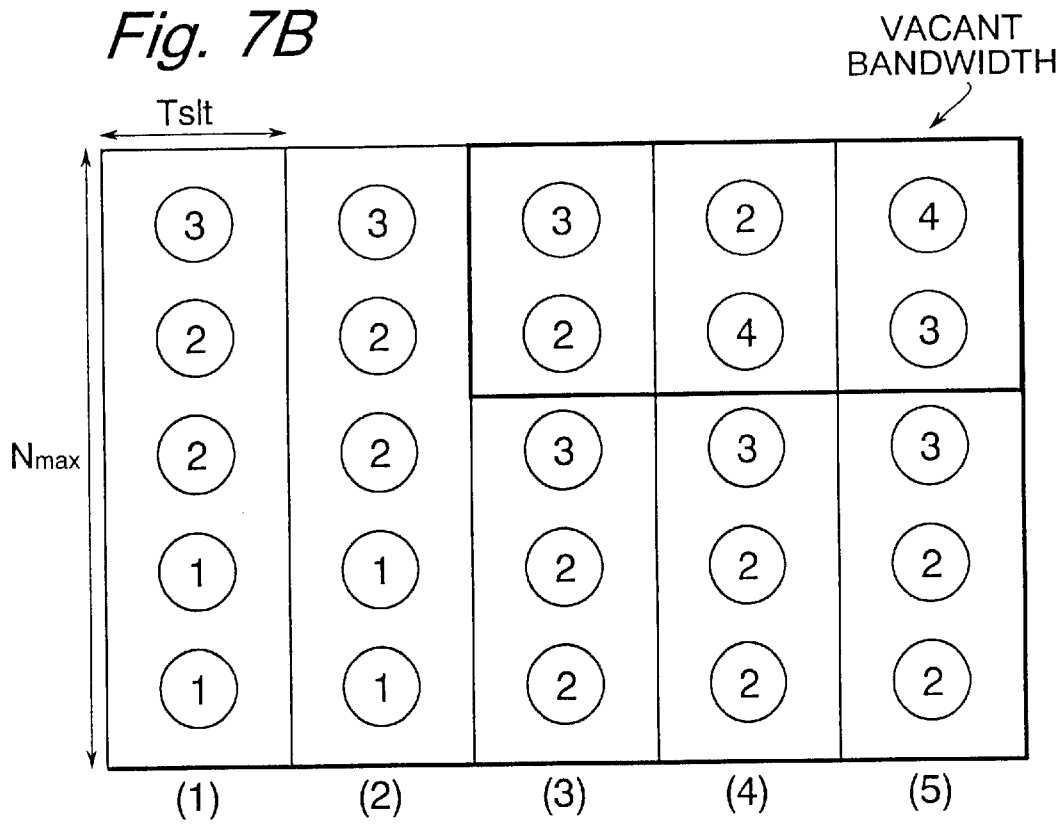

FIGS. 7A and 7B are diagrams for intuitively explaining transmission bandwidth control carried out by the transmission bandwidth control part 314 shown in FIG. 3 on the basis of the standard bandwidth and the type of bandwidth assurance which are set as shown in FIGS. 6A and 6B.

In FIGS. 7A and 7B, Tslt (a time slot) is a unit time corresponding to a period for processing a request, and Nmax is the maximum value of the number of requests which can be processed per Tslt. ○ in the drawing indicates a request to read out one block (hereinafter merely referred to as request), and ①  to ④ respectively correspond to the file handles "1" to "4" shown in FIGS. 6A and 6B. Here, Nmax=5. A transmission bandwidth in a case where one request (○) is processed per Tslt is taken as 30 Mbps. That is, in the transmission bandwidth control part 314, a maximum of five requests is processed per Tslt, and the maximum transmission bandwidth is 30*5=150 Mbps.

In the transmission bandwidth control part 314, if it is assumed that a total of 25 requests, that is, 4 requests ①, 12 requests ②, 7 requests ③, and 2 requests ④ are in a processing waiting state (actually, new requests are successively sent, so that the number of requests which wait for processing is ceaselessly changed), the transmission bandwidth control part 314 fills Tslt(1), Tslt(2), . . . , Tslt(5) with the 25 requests in order on the basis of the standard bandwidth and the type of bandwidth 20 assurance which are set by the bandwidth setting part 305.

FIG. 7A shows how the Tslt is filled with the requests ① to ④ when the standard bandwidth and the type of bandwidth assurance are set as shown in FIG. 6A.

① to ③ correspond to files for which the maximum bandwidth assurance is set. The Tslt is filled with the requests, whose respective numbers correspond to the standard bandwidths set for the files, by priority. Even if there is a vacant bandwidth in the Tslt, the vacant bandwidth is not additionally filled with the requests. ④ corresponds to a file for which the bandwidth unassurance is set. If there is a vacant bandwidth in the Tslt, the vacant bandwidth is filled with the request.

In FIG. 7A, the transmission bandwidth control part 314 first fills the Tslt(1) with a total of five requests, i.e., two requests ①, two requests ②, and one request ③, and then fills the Tslt(2) with a total of five requests, i.e., two requests ①, two requests ②, and one request ③. At this time point, there is no request ① with which the Tslt(1) and the Tslt(2) have not been filled yet. In each of the Tslt(3) to the Tslt(5), therefore, a vacant bandwidth corresponding to two requests occurs.

The transmission bandwidth control part 314 then fills the Tslt(3) with two requests ② and one request ③, and fills the vacant bandwidth corresponding to two requests, which occurs at this time, with two requests ④. At this time point, there is no request ④ with which the Tslt has not been filled yet.

The transmission bandwidth control part 314 then fills the Tslt(4) with two requests ② and one request ③. A vacant bandwidth corresponding to two requests, which occurs at this time, is filled with no request.

The transmission bandwidth control part 314 then fills the Tslt(5) with two requests ② and one request ③. A vacant bandwidth corresponding to two requests, which occurs at this time, is filled with no request. At the time point, there are respective two requests ② and ③ with which the Tslt(1) to the Tslt(5) have not been filled yet. Tslt(6), Tslt(7), . . . , which are not illustrated, subsequent to the Tslt(5) are filled with the total of four requests.

On the other hand, FIG. 7B shows how the Tslt is filled with the requests ① to ④ when the standard bandwidth and the type of bandwidth assurance are set as shown in FIG. 6B.

① to ③ correspond to files for which the maximum bandwidth assurance is set. The Tslt is filled with the requests, whose respective numbers correspond to the standard bandwidths set for the files, by priority. If there is a vacant bandwidth in the Tslt, the vacant bandwidth is additionally filled with the requests. ④ corresponds to a file for which the bandwidth unassurance is set. If there is a vacant bandwidth in the Tslt, the vacant bandwidth is filled with the request.

In FIG. 7B, the transmission bandwidth control part 314 first fills the Tslt(1) with a total of five requests, i.e., two requests ①, two requests ②, and one request ③, and then fills the Tslt(2) with a total of five requests, i.e., two requests ①, two requests ②, and one request ③. At this time point, there is no request ① with which the Tslt(1) and the Tslt(2) have not been filled yet. In each of the Tslt(3) to the Tslt(5), therefore, a vacant bandwidth corresponding to two requests occurs.

The transmission bandwidth control part 314 then fills the Tslt(3) with two requests ② and one request ③, and fills the vacant bandwidth corresponding to two requests, which occurs at this time, with respective one requests ② and ③.

The transmission bandwidth control part 314 then fills the Tslt(4) with two requests ② and one request ③, and fills a vacant bandwidth corresponding to two requests, which occurs at this time, with respective one requests ② and ④.

The transmission bandwidth control part 314 then fills the Tslt(5) with two requests ② and one request ③, and fills a vacant bandwidth corresponding to two requests, which occurs at this time, with respective one requests ③ and ④. At this time point, the filling with all the requests is completed.

As can be seen from comparison between FIG. 7A and FIG. 7B, a vacant bandwidth existing in a case where the maximum bandwidth assurance is used can be effectively utilized by using the minimum bandwidth assurance as bandwidth assurance in a case where the file system 301 performs file reading (or file writing).

Supplementary explanation will be given. The bandwidth assurance (both maximum and minimum) according to the present application differs from the conventional bandwidth assurance in that an assured standard bandwidth is arbitrarily set depending on a request from an application (a bandwidth setting request). That is, the assured bandwidth is fixed in the conventional bandwidth assurance, while the assured bandwidth (the standard bandwidth) can be variably set as required in the bandwidth assurance in the present application.

Although a case where the bandwidth unassurance and the maximum bandwidth assurance are used has been herein described while being compared with a case where the bandwidth unassurance and the maximum bandwidth assurance are used, the vacant bandwidth can be effectively utilized even if the maximum bandwidth assurance and the minimum bandwidth assurance are used or all the bandwidth unassurance, the maximum bandwidth assurance and the minimum bandwidth assurance are used.

In the example shown in FIG. 7B, the transmission bandwidth control part 314 respectively fills the vacant bandwidths, which occur in the Tslt(3) to the Tslt(5), with the requests ② and ③, ② and ④, and ③ and ④. That is, the vacant bandwidths are uniformly distributed among the files for which the bandwidth unassurance or the minimum bandwidth assurance is set irrespective of whether the bandwidth assurance is the bandwidth unassurance or the minimum bandwidth assurance and independently of the standard bandwidth. Alternatively, the vacant bandwidths may be distributed among the files for which the minimum bandwidth assurance is set in preference to the files for which the bandwidth unassurance is set.

When there are a plurality of files for which the minimum bandwidth assurance is set as the type of bandwidth assurance, the vacant bandwidths may be distributed at a ratio corresponding to the standard bandwidths set for the respective files.

The distribution ratio may be determined on the basis of situations where each of the files is read out and situations where it is written, and the vacant bandwidths may be distributed in accordance with the distribution ratio.

Furthermore, although a destination to which blocks are transmitted (the file reading part 306 and the file server 102 are respectively destinations of transmission referred to herein, as viewed from the transmission bandwidth control part 314 in the file server 102 and the transmission bandwidth control part 311 in the file writing part 307) is provided with a buffer temporarily storing the blocks for each file, the vacant bandwidths may be distributed depending on vacant areas of the buffers. For example, a method of determining for each of the files a threshold relating to the vacant area of the buffer and not distributing, in a time period during which the vacant area of the buffer for a certain file is not more than the threshold, the vacant bandwidths to the file (or decreasing the amount of distribution) is considered.

Although the transmission bandwidth control part 314 carries out the transmission bandwidth control using the standard bandwidth set by the bandwidth setting part 305 as it is, the transmission bandwidth control may be carried out by calculating an actually necessary bandwidth on the basis of the standard bandwidth and using a real bandwidth obtained thereby. An example of a case where the real bandwidth must be calculated is a case where in reading out a file, the size of a block (a reading minimum unit) requested by the application 302 and the size of a block handled by the file server 102 differ from each other. An example of the case is shown in FIG. 8.

Figure 8:
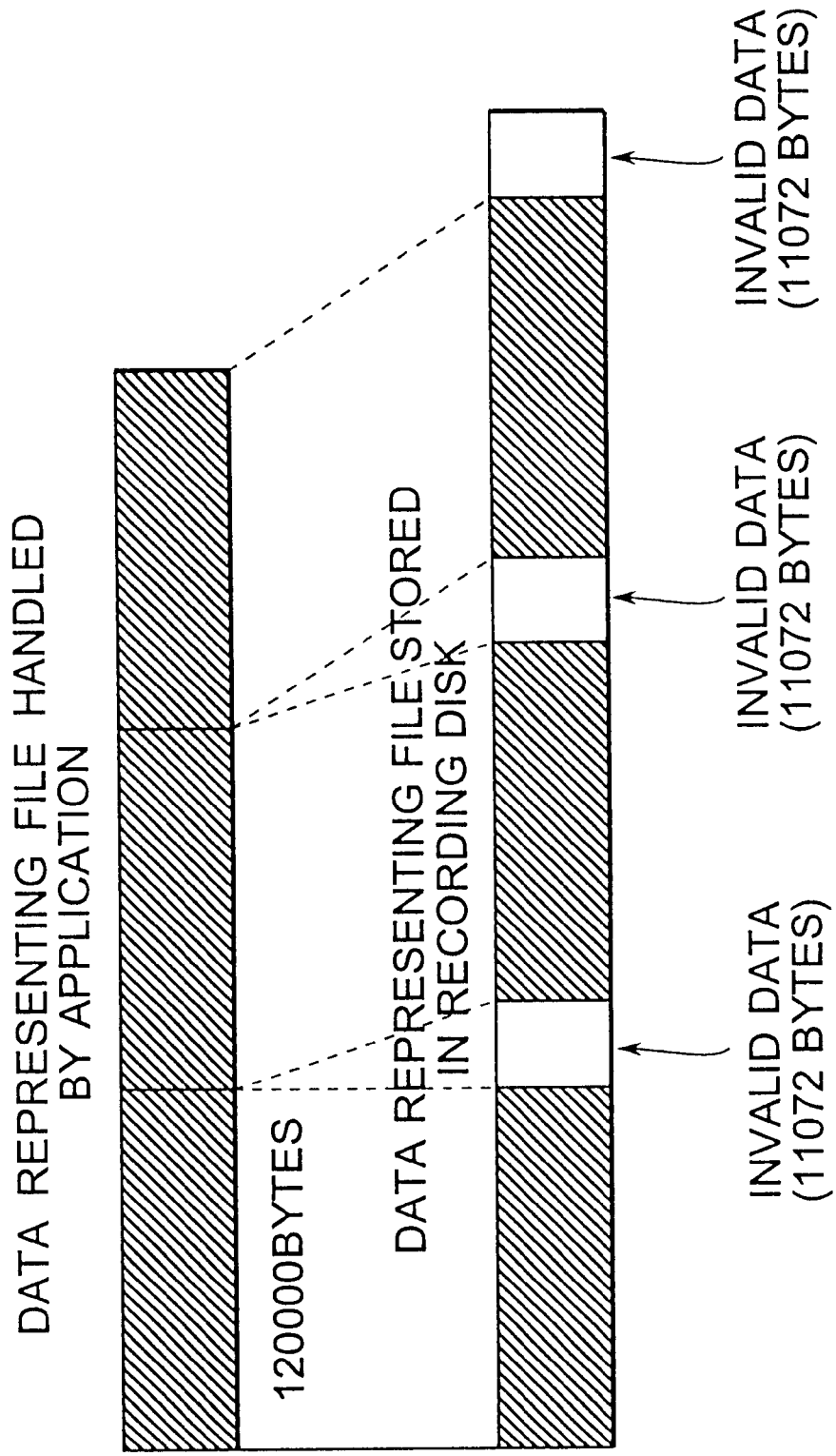
FIG. 8 is a diagram showing the difference in size between a block requested by an application 302 and a block recorded on a recording disk of the file server 102.

Specifically, FIG. 8 is a diagram showing the difference in size between the block requested by the application 302 and the block recorded on the recording disk of the server 102.

As shown in FIG. 8, the application 302 may, in some cases, requested blocks which are 120000 bytes in size every 120000 bytes, although the block handled by the file server 102 is 128 KB (=131072 bytes) in size. In such a case, the transmission bandwidth control part 314 in the file server 102 may, in some cases, preferably transmit data corresponding to 131072 bytes including 11072 bytes which are not requested in response to a data request corresponding to 120000 bytes. A real bandwidth in a case where the data is thus transmitted is (131072/120000) times the standard bandwidth. For example, when the standard bandwidth is composed of 60 Mbps, the real bandwidth is calculated to be 65.5 Mbps.

In the following case, another calculation of a real bandwidth is required. Similarly to FIG. 8, when the block handled by the file server 102 is 128 KB(=131072 bytes) in size, while the block requested by the application 302 is 120000 bytes in size, the application 302 may, in some cases, intermittently requested blocks (for example, every other block) when file reading is performed. An example is shown in FIG. 9.

Figure 9:
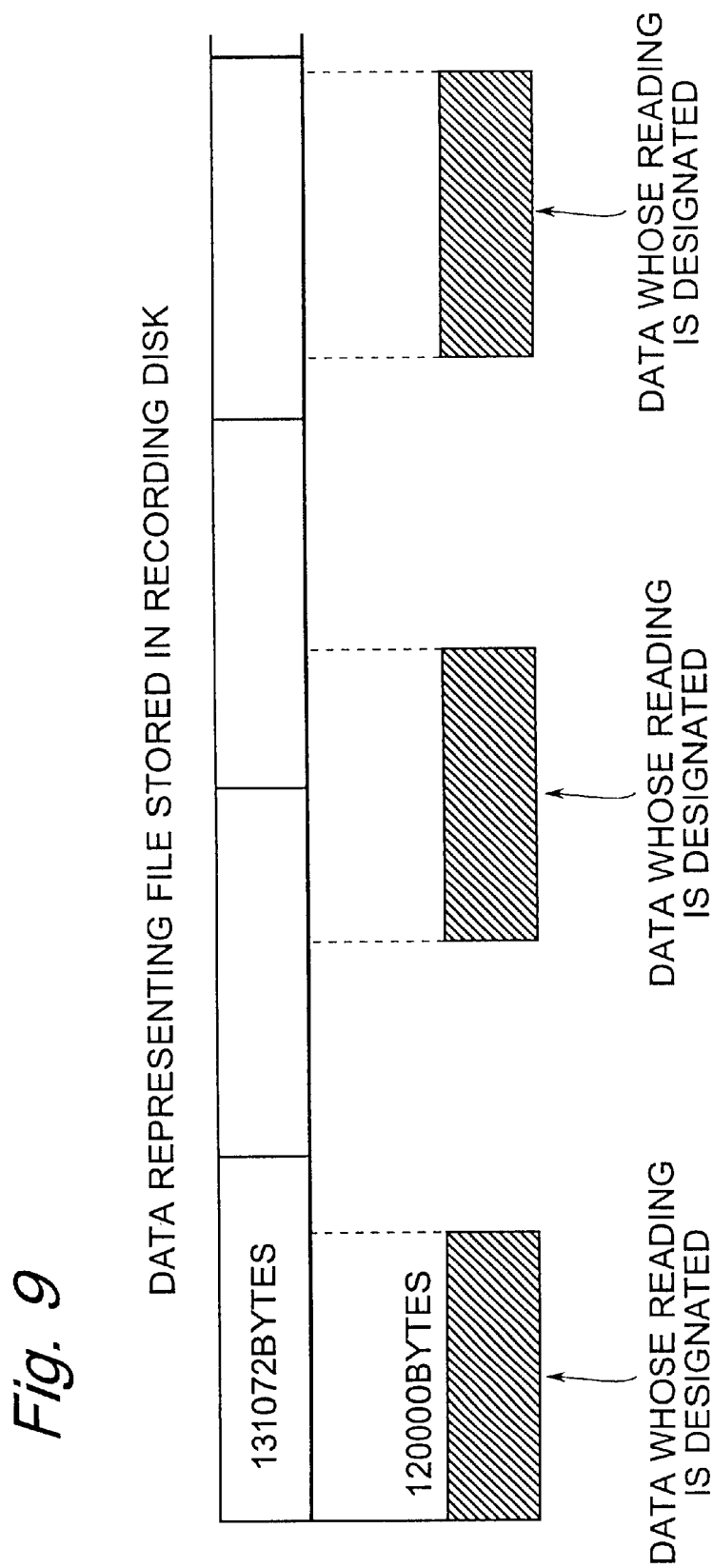
FIG. 9 is a diagram showing, when blocks each composed of 128 KB (=131072 bytes) are continuously recorded on the recording disk of the file server 102, how an application 302 intermittently requests the blocks every other one (i.e., every 120000 bytes)

Specifically, FIG. 9 is a diagram showing how the application 302 intermittently requests, when blocks composed of 128 KB (=131072 bytes) are continuously recorded on the recording disk of the file server 102, the blocks every other one (i.e., every 120000 bytes).

In the case shown in FIG. 9, even if the application 302 requests the blocks every other one (=120000 bytes), the transmission bandwidth control part 314 in the file server 102 transmits almost all of the blocks (one block=131072 bytes). Accordingly, it is found that the real bandwidth is twice the standard bandwidth. For example, when the standard bandwidth is composed of 60 Mbps, the real bandwidth is calculated to be 120 Mbps. More generally, the real bandwidth can be calculated from the standard bandwidth and positional information indicating where the block to be read out by the application 302 is on the recording disk.

[Prefetching Control Processing]

Although prefetching control processing performed in the case of the file reading at the foregoing step S407 will be described in detail, the outline thereof is previously described herein.

As described above, in the file reading part 306, the prefetching buffer management part 308 manages a prefetching buffer for temporarily storing prefetched data which is read out of the recording disk of the file server 102 by the file reading part 306, and monitors the amount of use of the prefetching buffer during the reading.

When the file reading part 306 receives a file reading request, the prefetching control part 309 first calculates the minimum number of times of prefetching (which may be the minimum amount of prefetching) on the basis of a standard bandwidth set by the bandwidth setting part 305, a standard bandwidth (this is a default) included in attribute information of the directory server 103, and maximum delay time (a constant) inherent in the client server system shown in FIG. 1, and then prefetches blocks whose number is equal to the calculated minimum number of times of prefetching (this is referred to as initial prefetching). The blocks thus prefetched are temporarily stored in the prefetching buffer.

Thereafter, the application 302 starts to issue a series of block reading requests. Correspondingly, the prefetched blocks in the prefetching buffer are copied on the buffer on the side of the application 302, starting from the head block. As a result, the amount of prefetching is gradually decreased. At this time, the amount of prefetching is monitored by the prefetching buffer management part 308. When the amount of prefetching is smaller than the minimum amount of prefetching, the prefetching control part 309 performs prefetching again (this is referred to as additional prefetching) such that the amount of prefetching is equal to the minimum amount of prefetching.

The amount of use of the prefetching buffer is thus kept equal to the minimum amount of prefetching.

The above-mentioned prefetching is compared with the conventional prefetching. In the conventional prefetching, a predetermined number of blocks are always prefetched (i.e., the amount of prefetching is constant). For example, in Japanese Patent Laying-Open No. 9-284343, blocks in an amount corresponding to time required to move bank and forth in the network are prefetched in order to carry out retransmission control.

On the other hand, in the prefetching according to the present application, the minimum number of times of prefetching (this may be the minimum amount of prefetching) is calculated from the standard bandwidth arbitrarily set by the application 302 and the maximum delay time (a constant) inherent in the client server system shown in FIG. 1, to prefetch blocks whose number is equal to the minimum number of times of prefetching. The reason for this is that prefetching corresponding to the standard bandwidth is performed, and delay occurs not only in the case of network transmission but also in making access to the recording disk in the file server 102, for example (moreover, delay in making access to the recording disk is unfixed in magnitude).

The maximum delay time may not be a fixed value, as described above. For example, it may be changed depending on the standard bandwidth. Consequently, the bandwidth can be more effectively utilized.

The details of the above-mentioned prefetching control will be described below. Here, it is assumed that prefetching amount control, described later, is not carried out, and only prefetching control is carried out.

First, description is made of the minimum number of times of prefetching (the minimum amount of prefetching) calculated by the prefetching control part 309.

The prefetching control part 309 calculates the minimum number of times of prefetching (N_RA) using the following equation (1):

$$(N\_RA)=[(B\_\text{Assure})*(T\_MRTD)/(D\_\text{Unit})] \quad (1)$$

In the foregoing equation (1), "*" means multiplication, "/" means division, and [x] denotes the minimum integer which is not below x. (T_MRTD) denotes the maximum delay time (a constant) inherent in the client server system shown in FIG. 1. (B_Assure) denotes a standard bandwidth set for a file which is an object of reading, and (D_Unit) denotes the size of blocks constituting the file. The same is true for the following equation (2).

Alternatively, the prefetching control part 309 calculates the minimum amount of prefetching (D_RA) using the following equation (2).

$$(D\_RA) = (N\_RA)*(D\_Unit) = [(B\_Assure)*(T\_MRTD)/(D\_Unit)]* \quad (2)$$

That is, (D_RA) is obtained by standardizing (B_Assure)*(T_MRTD) using (D_Unit).

The maximum delay time (T_MRTD) can be found by an experiment. That is, reading delay time occurring in the client server system shown in FIG. 1 is actually measured again and again. Such delay time that the probability that delay time actually occurring is above the delay time is sufficiently low is calculated from the result of the measurement, and is defined as the maximum delay time inherent in the client server system shown in FIG. 1. At this time, it is preferable that the probability that time actually occurring is above the maximum delay time is less than $10^{-12}$.

Alternatively, the maximum delay time (T_MRTD) can be also determined from the specifications of the network 104 and the file server 102.

Used as the standard bandwidth (B_Assure) is one set by the bandwidth setting part 305 depending on a bandwidth setting request from the application 302 or a default included in attribute information recorded on the directory server 103.

When the minimum number of times of prefetching is thus calculated, the prefetching control part 309 starts initial prefetching for reading out blocks whose number is equal to the minimum number of times of prefetching.

Thereafter, the application 302 starts to issue the block reading request. Correspondingly, the following processing is performed in the file reading part 306.

FIG. 10 is a flow chart showing block reading processing performed by the file reading part 306 shown in FIG. 3 depending on the block reading request from the application 302.

Here, description is made, assuming that the size of a block requested by the application and the size of a block which can be handled by the server 102 are the same (processing in a case where the sizes differ from each other will be described later).

In FIG. 10, when the block reading request is received, the file reading part 306 judges whether or not a block which is an object of the request (hereinafter referred to as requested block) is the same as the head of a series of blocks which are objects of initial prefetching processing performed by the prefetching control part 309 (hereinafter referred to as prefetched blocks; there exist such prefetched blocks whose number is equal to the minimum number of times of prefetching) (step S1001). When the result of the judgment is negative, the procedure goes to the step S1006.

When the result of the judgment at the step S1001 is affirmative, the file reading part 306 judges whether or not the requested block has already reached the prefetching buffer (step 1002). When the result of the judgment is negative, the file reading part 306 enters event waiting.

When the result of the judgment at the step S1002 is affirmative, the file reading part 306 responds to the application 302 (step S1003). That is, the requested block stored in the prefetching buffer is copied on the buffer on the side of the application 302.

The file reading part 306 then releases an unnecessary area of the prefetching buffer, that is, an area storing the block which has already responded at the step S1003 (step S1004). Additional prefetching is performed (step S1005). Thereafter, the file reading part 306 enters event waiting.

At the step S1006, jump reading processing is performed. Thereafter, the file reading part 306 enters event waiting.

FIG. 11 is a flow chart showing the additional prefetching processing at the step S1005 shown in FIG. 10.

In FIG. 11, the prefetching control part 309 first judges whether or not additional prefetching must be performed (step S1001). Processing is completed if the result of the judgment is negative, while the prefetching control part 309 performs additional prefetching if it is affirmative (step S1102).

It can be judged whether or not the additional prefetching must be performed by comparing the amount of prefetching (or the number of times of prefetching) with the minimum amount of prefetching (or the minimum number of times of prefetching). The additional prefetching is performed if the number of prefetched blocks is smaller than the minimum number of times of prefetching, while processing is completed if it is larger.

FIG. 12 is a flow chart showing the jump reading processing at the step S1006 shown in FIG. 10.

In FIG. 12, the file reading part 306 first judges whether or not the requested block is a prefetched block, that is, the same block as any one of the series of prefetched blocks is requested (step S1201). If the result of the judgment is negative, the prefetching which is being performed is interrupted (step S1204). Thereafter, the procedure goes to the step S1202.

When the result of the judgment at the step S1201 is affirmative, the position where prefetching is performed is changed into a position, where prefetching has not been performed yet, ahead of a destination of jumping (step S1202). Additional prefetching is then performed (step S1203). Thereafter, the processing is terminated.

In summary, even if the requested block is not the head of the series of prefetched blocks (see step S1001) but any one of the series of prefetched blocks (see step S1201), the prefetching which is being currently performed need not be interrupted. By paying attention to the point, the frequency of interruption of reading processing is reduced in the jump reading processing. The reason for this is that the effective utilization of the bandwidth and the improvement of responsivity can be achieved.

FIG. 13 is a flow chart showing processing for storing a block read out (hereinafter referred to as received block) in the prefetching buffer by the file reading part 306 shown in FIG. 3.

In FIG. 13, the file reading part 306 first judges whether or not the received block should be discarded (step S1301). Examples of the block which should be discarded include a block which is not required because jump reading is performed, although it is prefetched and a block which is not required as the amount of prefetching is decreased (see prefetching amount control processing, described later, with respect to the increase or decrease of the amount of prefetching).

When the result of the judgment at the step S1301 is affirmative, the file reading part 306 discards the received block (step S1307), and then enters event waiting. On the other hand, when it is negative, the received block is stored in the prefetching buffer (step S1302).

The file reading part 306 then judges whether or not the received block is a requested block (step S1303). When the result of the judgment is negative, the file reading part 306 enters event waiting.

When the result of the judgment at the step S1303 is affirmative, the file reading part 306 responds to the application 302 (step S1304), and then releases an unnecessary buffer (step S1305). The prefetching control part 309 then performs additional prefetching (step S1306), and then enters event waiting.

FIG. 14 is a flow chart showing the received block storage processing at the step S1302 shown in FIG. 13.

In FIG. 14, the file reading part 306 stores the received block in the prefetching buffer, and simultaneously registers the position where the received block is stored (in which position in the buffer is the block stored) (step S1401). Thereafter, the processing is terminated.

[Prefetching Amount Control Processing]

Although the prefetching amount control processing performed in the case of the file reading at the step S407 will be described in detail, the outline thereof is previously described herein.

If the prefetching control part 309 performs the above-mentioned prefetching control processing, so that the transmission bandwidth is always not more than the standard bandwidth (i.e., if the maximum bandwidth assurance is set as the type of bandwidth assurance), the amount of prefetching is sufficient it if is kept equal to the minimum amount of prefetching. If the minimum bandwidth assurance is set as the type of bandwidth assurance, however, the transmission bandwidth may, in some case, exceed the standard bandwidth. Accordingly, the amount of prefetching is not sufficient even if it is kept equal to the minimum amount of prefetching.

The prefetching amount control part 310 carries out, when the minimum bandwidth assurance is set, such control that the amount of prefetching is not less than the minimum amount of prefetching when the transmission bandwidth exceeds the standard bandwidth. Consequently, the vacant bandwidth can be sufficiently utilized. The principle of the prefetching amount control will be described using FIG. 15.

Specifically, FIG. 15 is a diagram for intuitively explaining the principle of the prefetching amount control carried out by the prefetching amount control part 310 shown in FIG. 3.

In FIG. 15, in the prefetching amount control, four thresholds A to D (where A<B<C<D) relating to the amount of use of the buffer are previously determined. A is a first threshold which is to be a criterion for judging whether or not prefetching amount increase processing is started, B is a second threshold which is to be a criterion for judging whether or not the prefetching amount increase processing is stopped, C is a third threshold which is to be a criterion for judging whether or not prefetching amount decrease processing is started, and D is a fourth threshold which is to be a criterion for judging whether or not the prefetching amount decrease processing is started.

On the other hand, the prefetching buffer management part 308 monitors the amount of use of the prefetching buffer, and reports the result of the monitoring to the prefetching amount control part 310 on demand.

The amount of use of the prefetching buffer means the number of prefetched blocks stored in the prefetching buffer, and more accurately the number of blocks (or the amount of data) which have not been copied on the buffer on the side of the application 302 yet out of the prefetched blocks stored in the prefetching buffer.

The prefetching amount control part 310 compares the reported amount of use of the prefetching buffer with each of the thresholds A to D, starts/stops the prefetching amount increase processing depending on the result of the comparison, and starts/stops the prefetching amount decrease processing, to vary the amount of prefetching within a predetermined range.

At this time, if the thresholds A to D are suitably determined, the range of variations in the amount of prefetching is such a range that its lower limit is the minimum amount of prefetching and its upper limit is the maximum capacity of the prefetching buffer. The thresholds A to D can be suitably determined by experiments or from the specifications of the network 104 and the file server 102.

The details of the above-mentioned prefetching amount control processing will be described below. Here, prefetching amount control shall be further carried out in addition to the above-mentioned prefetching control.

FIG. 16 is a flow chart showing the block reading processing performed by the file reading part 306 shown in FIG. 3 in response to the block reading request from the application 302.

The processing shown in FIG. 16 is obtained by adding steps S1601 to S1603 to the processing shown in FIG. 10.

In FIG. 16, when the block reading request is received, the file reading part 306 judges whether or not a requested block is the same as the head of the series of prefetched blocks (step S1001). When the result of the judgment is negative, the procedure goes to the step S1006.

When the result of the judgment at the step S1001 is affirmative, the file reading part 306 judges whether or not the requested block has already reached the prefetching buffer (step S1002). When the result of the judgment is negative, the prefetching amount control part 310 judges whether or not prefetching amount increase processing is started. Additional prefetching is then performed (step S1005). Thereafter, the file reading part 306 enters event waiting.

When the result of the judgment at the step S1002 is affirmative, the file reading part 306 responds to the application 302 (step S1003).

The file reading part 306 then releases an unnecessary area of the prefetching buffer (step S1004). The prefetching amount control part 310 then judges whether or not prefetching amount decrease processing is stopped (step S1601), and then judges whether or not prefetching amount increase processing is stopped (step S1602). Additional prefetching is then performed (step S1005). Thereafter, the file reading part 306 enters event waiting.

At the step S1006, jump reading processing is performed. Thereafter, the file reading part 306 enters event waiting.

FIG. 17 is a flow chart showing processing performed by the file reading part 306 shown in FIG. 3 for storing the received block in the prefetching buffer.

The processing shown in FIG. 17 is obtained by adding steps S1701 to S1703 to the processing shown in FIG. 13.

In FIG. 17, the file reading part 306 first judges whether or not the received block should be discarded (step S1301).

When the result of the judgment at the step S1301 is affirmative, the file reading part 306 discards the received block (step S1307), and then enters event waiting. On the other hand, when it is negative, the received block is stored in the prefetching buffer (step S1302).

The file reading part 306 then judges whether or not the received block is a requested block (step S1303). When the result of the judgment is negative, the prefetching amount control part 310 judges whether or not prefetching amount decrease processing is started (step S1703). Thereafter, the file reading part 306 enters event waiting.

When the result of the judgment at the step S1303 is affirmative, the file reading part 306 responds to the application 302 (step S1304), and then releases an unnecessary buffer (step S1305).

The prefetching amount control part 310 then judges whether or not prefetching amount decrease processing is stopped (step S1701), and then judges whether or not prefetching amount increase processing is stopped (step S1702). The prefetching control part 309 performs additional prefetching (step S1306). Thereafter, the file reading part 306 enters event waiting.

FIG. 18 is a flow chart showing the judgment whether or not prefetching amount decrease processing is stopped at the step S1601 shown in FIG. 16.

In FIG. 18, the prefetching amount control part 310 first judges whether or not the prefetching amount decrease processing is being performed (step S1801). When the result of the judgment is negative, the processing is terminated.

When the result of the judgment at the step S1801 is affirmative, the prefetching amount control part 310 judges whether or not the amount of use of the prefetching buffer is not more than the threshold C (step S1802). When the result of the judgment is negative, the processing is terminated.

When the result of the judgment at the step S1802 is affirmative, the prefetching amount control part 310 stops the prefetching amount decrease processing (step S1803). Thereafter, the processing is terminated.

FIG. 19 is a flow chart showing the judgment whether or not prefetching amount increase processing is stopped at the step S1602 shown in FIG. 16.

In FIG. 19, the prefetching amount control part 310 first judges whether or not the prefetching amount increase processing is being performed (step S1901). When the result of the judgment is negative, the processing is terminated.

When the result of the judgment at the step S1901 is affirmative, the prefetching amount control part 310 judges whether or not the amount of use of the prefetching buffer is not less than the threshold B (step S1902). When the result of the judgment is negative, the processing is terminated.

When the result of the judgment at the step S1902 is affirmative, the prefetching amount control part 310 stops the prefetching amount increase processing (step S1903). Thereafter, the processing is terminated.

FIG. 20 is a flow chart showing the judgment whether or not prefetching amount increase processing is started at the step S1603 shown in FIG. 16.

In FIG. 20, the prefetching amount control part 310 first judges whether or not the prefetching amount increase processing is being performed (step S2001). When the result of the judgment is affirmative, the processing is terminated.

When the result of the judgment at the step S2001 is negative, the prefetching amount control part 310 judges whether or not the amount of use of the prefetching buffer is not more than the threshold A (step S2002). When the result of the judgment is negative, the processing is terminated.

When the result of the judgment at the step S2002 is affirmative, the prefetching amount control part 310 judges whether or not the prefetching amount decrease processing is being performed (step S2003). When the result of the judgment is negative, the procedure goes to the step S2005.

When the result of the judgment at the step S2003 is affirmative, the prefetching amount control part 310 stops the prefetching amount decrease processing (step S2004). Thereafter, the procedure goes to the step S2005.

At the step S2005, the prefetching amount increase processing is started. Thereafter, the processing is terminated.

The judgment whether or not prefetching amount decrease processing is stopped at the step S1701 shown in FIG. 17 is the same as that at the step S1601 shown in FIG. 16. Therefore, the description thereof is omitted by citing the flow chart shown in FIG. 18.

The judgment whether or not prefetching amount increase processing is stopped at the step S1702 shown in FIG. 17 is the same as that at the step S1602 shown in FIG. 16. Therefore, the description thereof is omitted by citing the flow chart shown in FIG. 19.

FIG. 21 is a flow chart showing the judgment whether or not prefetching amount decrease processing is started at the step S1703 shown in FIG. 17.

In FIG. 21, the prefetching amount control part 310 first judges whether or not the prefetching amount decrease processing is being performed (step S2101). When the result of the judgment is affirmative, the processing is terminated.

When the result of the judgment at the step S2101 is negative, the prefetching amount control part 310 judges whether or not the amount of use of the prefetching buffer is not less than the threshold D (step S2101). When the result of the judgment is negative, the processing is terminated.

When the result of the judgment at the step S2102 is affirmative, the prefetching amount control part 310 judges whether or not the prefetching amount increase processing is being performed (step S2103). When the result of the judgment is negative, the procedure goes to the step S2105.

When the result of the judgment at the step S2103 is affirmative, the prefetching amount control part 310 stops the prefetching amount increase processing (step S2104). Thereafter, the procedure goes to the step S2105.

At the step S2105, the prefetching amount decrease processing is started. Thereafter, the processing is terminated.

FIGS. 22 and 23 are respectively flow charts showing the prefetching amount increase processing performed by the prefetching amount control part 310 shown in FIG. 3.

In FIG. 22, the prefetching amount control part 310 first judges whether or not the amount of use of the prefetching buffer is not more than the threshold A (step S2201). When the result of the judgment is negative, the procedure goes to the step S2203.

When the result of the judgment at the step S2201 is affirmative, the prefetching amount control part 310 increases the amount of prefetching (step S2202). Thereafter, the procedure goes to the step S2203.

At the step S2203, it is judged whether or not the refetching amount increase processing is stopped (step S2203). When the result of the judgment is affirmative, the processing is terminated.

When the result of the judgment at the step S2203 is negative, the prefetching amount control part 310 waits for processing for only a predetermined time period (step S2204). Thereafter, the procedure is returned to the step S2201, so that the same processing as described above is repeated.

In FIG. 23, the prefetching control part 309 first starts processing for measuring a bandwidth used for reading (step S2301). The bandwidth used for reading can be measured by detecting the frequency of a request to read out a block from the application 302 and the size of the block, for example.

The prefetching amount control part 310 then takes the amount of prefetching corresponding to the bandwidth used for reading as D(t) (step S2303), and judges whether or not the current amount of prefetching is smaller than the above-mentioned D(t) (step S2303). When the result of the judgment is negative, the procedure goes to the step S2305.

When the result of the judgment at the step S2303 is affirmative, the prefetching control part 309 changes the above-mentioned D(t) into the current amount of prefetching (step S2304). Thereafter, the procedure goes to the step S2305.

At the step S2305, it is judged whether or not the prefetching amount increase processing is stopped. When the result of the judgment is negative, the procedure is returned to the step S2302, so that the same processing as described above is repeated.

When the result of the judgment at the step S2305 is affirmative, the prefetching control part 309 stops the processing for measuring the bandwidth used for reading (step S2306). Thereafter, the processing is terminated.

FIGS. 24 and 25 are respectively flow charts showing the prefetching amount decrease processing performed by the prefetching amount control part 310 shown in FIG. 3.

In FIG. 24, the prefetching amount control part 310 first judges whether or not the amount of use of the prefetching buffer is not less than the threshold C (step S2401). When the result of the judgment is negative, the procedure goes to the step S2405.

When the result of the judgment at the step S2401 is affirmative, the prefetching amount control part 310 decrease the amount of prefetching (step S2402), and then judges whether or not the amount of use of the prefetching buffer exceeds the amount of prefetching (step S2403). When the result of the judgment is negative, the procedure goes to the step S2405.

When the result of the judgment at the step S2403 is affirmative, a buffer storing a block exceeding the current amount of prefetching is released (step S2404). Thereafter, the procedure goes to the step S2405.

At the step S2405, it is judged whether or not the prefetching amount decrease processing is stopped. When the result of the judgment is affirmative, the processing is terminated.

When the result of the judgment at the step S2405 is negative, the prefetching amount control part 310 waits for processing for a predetermined time period (step S2406). Thereafter, the procedure is returned to the step S2401, so that the same processing as described above is repeated.

In FIG. 25, the prefetching control part 309 first starts processing for measuring a bandwidth used for reading (step S2501).

The prefetching amount control part 310 then takes the amount of prefetching corresponding to the bandwidth used for reading as D(t) (step S2502), and judges whether or not the current amount of prefetching is smaller than the above-mentioned D(t) (step S2503). When the result of the judgment is negative, the procedure goes to the step S2506.

When the result of the judgment at the step S2503 is affirmative, the prefetching control part 309 changes the above-mentioned D(t) into the current amount of prefetching (step S2504). A buffer storing a block exceeding the current amount of prefetching is then released (step S2505). Thereafter, the procedure goes to the step S2506.

At the step S2506, it is judged whether or not the prefetching amount decrease processing is stopped. When the result of the judgment is negative, the procedure is returned to the step S2502, so that the same processing as described above is repeated.

When the result of the judgment at the step S2506 is affirmative, the prefetching control part 309 stops the processing for measuring the bandwidth used for reading (step S2507). Thereafter, the processing is terminated.

[Management of Prefetching Buffer]

Description is now made of the management of the prefetching buffer which is performed by the prefetching buffer management part 308 at the foregoing step S407.

As described above, when the minimum bandwidth assurance is set, reading may, in some cases, be performed in a bandwidth exceeding the standard bandwidth. As a simple example, consider a case where the minimum bandwidth assurance is set for a certain file, the maximum bandwidth assurance is set for another file, and the two files are simultaneously read out. At this time, if it is assumed that a bandwidth for reading out the former file exceeds the standard bandwidth, it cannot be said that there is no possibility that a bandwidth for reading out the latter file is below the standard bandwidth (i.e., the maximum bandwidth assurance does not function). The reason for this is that the capacity of the prefetching buffer is limited.

Therefore, the prefetching buffer management part 308 manages the prefetching buffer upon dividing the prefetching buffer into a basic area corresponding to the standard bandwidth (i.e., a prefetching buffer required when all files are read out in their respective standard bandwidths) and a shared area corresponding to a vacant bandwidth occurring in the standard bandwidth. Consequently, such inconvenience that the maximum bandwidth assurance does not function is overcome.

It is preferable to ensure the shared area of at least the same size as that of the basic area, as viewed from the point of view of effective utilization of bandwidths. That is, it is preferable that the entire capacity of the prefetching buffer is not less than twice an amount required when all the files are read out in their respective standard bandwidths.

The reason for this is that when the shared area is below the basic area, the prefetching amount control becomes unstable due to lack of the buffer even if there is a vacant bandwidth. As a result, the utilization efficiency of the vacant bandwidth may, in some cases, be decreased. On the other hand, if the shared area is not less than the basic area, the prefetching amount control is stabilized, thereby making it possible to prevent the utilization efficiency of the vacant bandwidth from being decreased.

Furthermore, it is more preferable that the shared area is not less than twice the basic area. The reason for this is as follows. That is, consider a case where the shared area is less than twice the basic area. In a case where a plurality of files for which the minimum bandwidth assurance is set are simultaneously read out, if one of the files is being subjected to the prefetching amount decrease processing, the utilization efficiency of the vacant bandwidth in the remaining files is decreased. On the other hand, consider a case where the shared area is not less than twice the basic area. In a case where a plurality of files for which the minimum bandwidth assurance is set are simultaneously read out, even if one of the files is being subjected to the prefetching amount decrease processing, the utilization efficiency of the vacant bandwidth in the remaining files can be prevented from being decreased.

Generally, it is preferable that the size of the shared area is not less than N (N is an arbitrary integer of two or more) times the size of the basic area. In the case, even if (N−1) files for which the minimum bandwidth assurance is set are being simultaneously subjected to the prefetching amount decrease processing, it is possible to prevent the utilization efficiency of the vacant bandwidth in the remaining files from being decreased.

FIG. 26 is a flow chart showing the processing performed by the file reading part 306 shown in FIG. 3 for storing a block read out (a received block) in the prefetching buffer (including the prefetching buffer amount control carried out by the prefetching buffer management part 308).

In FIG. 26, the prefetching buffer management part 308 first judges whether or not the current amount of the prefetching buffer is less than an amount corresponding to the standard bandwidth (the size of the basic area) (step S2601). When the result of the judgment is negative, the procedure goes to the step S2604.

When the result of the judgment at the step S2601 is affirmative, the prefetching buffer management part 308 increases the amount of the prefetching buffer (step S2602), and the file reading part 306 then stores the received block in the prefetching buffer, and simultaneously registers the position where the received block is stored (step S2603).

At the step S2604, it is judged whether or not the amount of use of the shared buffer reaches its upper limit. If it does not reach the upper limit, the prefetching buffer management part 308 increases the amount of the prefetching buffer (step S2605). Thereafter, the procedure goes to the step S2602.

The amount of use of the shared buffer means the number of blocks (the amount of a buffer, which has not been released yet, corresponding thereto) which have not been copied on the buffer on the side of the application 302 out of the prefetched blocks stored in the shared area (described above) of the prefetching buffer.

When the result of the judgment at the step S2604 is affirmative, the received block is discarded (step S2606). The prefetching request is then interrupted (steps S2607). The prefetching control part 309 changes the position where prefetching is performed into a position corresponding to the discarded received block, to perform the prefetching again, starting at the position (step S2608). Thereafter, the processing is terminated.

[Prefetching Processing in Case where Special Reproduction is Performed]

Finally, description is made of prefetching processing in a case where special reproduction, for example, high-speed reproduction or backward reproduction is performed.

The prefetching processing in the case where the backward reproduction is performed is as follows.

FIG. 27 is a diagram for intuitively explaining the prefetching processing in the case where the backward reproduction is performed.

As shown in FIG. 27, the prefetching control part 309 judges the presence or absence of inversion in the direction of reproduction on the basis of the positional relationship in a file between a requested block and the subsequent requested block. That is, when a block corresponding to a request which has just been sent is behind a block corresponding to a request which had been sent immediately before the sending, it is judged that there is no inversion in the direction of reproduction. When it is ahead of the block, it is judged that there is inversion in the direction of reproduction.

FIG. 28 is a flow chart showing prefetching direction switching processing performed by the prefetching control part 309 shown in FIG. 3 as the backward reproduction is performed.

In FIG. 28, when the direction of prefetching is switched, the prefetching control part 309 first interrupts prefetching which is being currently performed (step S2801), and then switches the direction of prefetching (step S2802). The prefetching control part 309 then judges whether or not a requested block exists in the prefetching buffer (step S2803). When the result of the judgment is negative, the procedure goes to the step S2804.

When the judgment at the step S2803 is affirmative, the file reading part 306 responds to the application 302 (step S2804), and then releases an unnecessary buffer (step S2805). The prefetching control part 309 changes the position where prefetching is performed into a position, corresponding to a block which has not been prefetched yet, ahead thereof, to perform the prefetching again, starting at the position (step S2806).

Additional prefetching is performed (step S2807). Thereafter, the file reading part 306 enters event waiting.

The prefetching processing in the case where the special reproduction is performed is as follows.

FIG. 29 is a diagram for intuitively explaining the prefetching processing in the case where the high-speed reproduction is performed.

In FIG. 29, in the high-speed reproduction, data in a file is read out every other one at predetermined intervals, and is continuously reproduced. Accordingly, data to be an object of prefetching discretely exists in the file, unlike that in the case of normal reproduction. The prefetching control part 309 intermittently performs prefetching such that the total amount of prefetching is equal to a value calculated in the foregoing equation (2), or the total number of times of prefetching is equal to a value calculated in the foregoing equation (1). The intermittent prefetching can be performed by the file system intermittently designating the position where prefetching is started and repeatedly performing the above-mentioned jump prefetching processing.

As described above, according to the present embodiment, the file system can set bandwidths for file writing and file reading in response to the requests from an application.

By using as bandwidth assurance the maximum bandwidth assurance in combination with the minimum bandwidth assurance, it is possible to effectively utilize a vacant bandwidth occurring when the maximum bandwidth assurance is set.

Data in an amount corresponding to a bandwidth is prefetched. Even if the vacant bandwidth is utilized, therefore, delay is prevented from being insufficiently concealed.

Furthermore, it is possible to follow variations in a transmission bandwidth which occur when the minimum bandwidth assurance is used by controlling the amount of prefetching.

The maximum delay time can be thus assured, that is, reading delay and writing delay can fall within a predetermined time period with a sufficiently high probability.

As a result of the assurance of the maximum delay time, a real-time remote file system applied to a client server system through a network, that is, a file system capable of performing reading and writing out of and into a file server through a network in real time is realized.

Such a file system produces the greatest effect when it is used in a network environment. However, it goes without saying that it may be used in an environment without through a network. The reason for this is that the reading delay and the writing delay also occur not only in the case of network transmission but also in making random access to a recording disk, for example.

In the present embodiment, every attribute information is collectively managed by providing the attribute information management part 315 in the directory server 103. Alternatively, each of the clients 101 may be provided with an attribute information management part dedicated to the client 101.

Although in the present embodiment, the bandwidth setting part 305 performs the bandwidth setting utilizing as objects the transmission bandwidth control part 311 in the file writing part 307 and the transmission bandwidth control part 314 in the file server 102, a transmission bandwidth control part (not shown) in the network 104 may be added to the objects of bandwidth setting. Further, the bandwidth setting may be performed, as described above, by assigning one connection of the network to one file. Further, a plurality of files may use a connection of one network in a case where the bandwidth setting is performed as described above.

The following embodiment is known as an embodiment other than the above-mentioned embodiment.

FIG. 30 is a block diagram showing the configuration of a real-time remote file system according to another embodiment of the present invention.

In FIG. 30, a remote file system 3201 and a file server 3102 are the same as those shown in FIGS. 32 and 31 (see the column of prior art), and a real-time remote file system 301, a file server 102 and a directory server 103 are the same as those shown in FIGS. 3 and 1. A request distribution part 3001 is added to the OS 303 shown in FIG. 3.

The request distribution part 3001 distributes a file manipulation request fed from an application 302 through an API 312 between the remote file system 3201 and the real-time remote file system 301.

The application 302 specifies which of file manipulation for the file server 3102 and file manipulation for the file server 102 is to be requested. The request distribution part 3001 feeds the file manipulation request to either one of the remote file system 3201 and the real-time remote file system 301 in accordance with the specification.

Processing performed by the remote file system 3201 and processing performed by the real-time remote file system 301 are as described above and hence, the description thereof is not repeated.

Windows NT, for example, is used as an OS 303. In Windows NT, another file system can be further incorporated in addition to a built-in file system. A request distribution function for switching and using a plurality of file systems is previously prepared as one of Windows NT services. Therefore, the file system as shown in FIG. 30 can be easily realized.

While the invention has been described in detail, the foregoing description is in all aspects illustrative and not restrictive. It is understood that numerous other modifications and variations can be devised without departing from the scope of the invention.

What is claimed is:

1. A file system for performing file reading and/or file writing out of and/or into a data storage part storing a file upon receipt of a file reading request and/or a file writing request issued by an application, wherein said application further issues a bandwidth setting request, the file system comprising:

a file reading part for performing file reading out of said data storage part in response to the file reading request from said application;

a file writing part for performing file writing into said data storage part in response to the file writing request from said application;

a first transmission bandwidth control part for controlling a transmission bandwidth used for data transmission from said file writing part to said data storage part in the case of the file writing;

a second transmission bandwidth control part for controlling the transmission bandwidth used for data transmission from said data storage part to said file reading part in the case of the file reading; and a bandwidth setting part for performing bandwidth setting for said first transmission bandwidth control part and/or said second transmission bandwidth control part in response to the bandwidth setting request from said application.

2. The file system according to claim 1, characterized in that said bandwidth setting part sets a standard bandwidth and the type of bandwidth assurance when the bandwidth setting is performed, said type of bandwidth assurance includes maximum bandwidth assurance for assuring said standard bandwidth as the maximum bandwidth, and said first transmission bandwidth control part and/or said second transmission bandwidth control part carry out, when said maximum bandwidth assurance is set, such transmission bandwidth control that even if there is a vacant bandwidth, data is transmitted using only said assured standard bandwidth.

3. The file system according to claim 2, characterized in that said type of bandwidth assurance further includes minimum bandwidth assurance for assuring said standard bandwidth as the minimum bandwidth, and said first transmission bandwidth control part and/or said second transmission bandwidth control part carry out, when said minimum bandwidth assurance is set, such transmission bandwidth control that if there is a vacant bandwidth, data is transmitted using not only said assured standard bandwidth but also the vacant bandwidth.

4. The file system according to claim 3, characterized in that said type of bandwidth assurance further includes such bandwidth unassurance that no bandwidth is assured, and said first transmission bandwidth control part and/or said second transmission bandwidth control part carry out, when said bandwidth unassurance is set, such transmission bandwidth control that if there is a vacant bandwidth, data is transmitted using the vacant bandwidth.

5. The file system according to claim 3, characterized in that said first transmission bandwidth control part and/or said second transmission bandwidth control part distribute, when said transmission bandwidth control is carried out, the vacant bandwidth among transmission data corresponding to the minimum bandwidth assurance depending on the standard bandwidth.

6. The file system according to claim 4, characterized in that said first transmission bandwidth control part and/or said second transmission bandwidth control part uniformly distribute, when said transmission bandwidth control is carried out, the vacant bandwidth among the transmission data.

7. The file system according to claim 4, characterized in that said first transmission bandwidth control part and/or said second transmission bandwidth control part distribute, when said transmission bandwidth control is carried out, the vacant bandwidth among transmission data corresponding to the minimum bandwidth assurance in preference to transmission data corresponding to the bandwidth unassurance.

8. The file system according to claim 4, characterized in that said first transmission bandwidth control part and/or said second transmission bandwidth control part carry out, when said transmission bandwidth control is carried out, the control also in consideration of the state of a transmission buffer.

9. The file system according to claim 4, characterized in that said first transmission bandwidth control part and/or said second transmission bandwidth control part carry out, when said transmission bandwidth control is carried out, the control also in consideration of the state of a receiving buffer at a destination of transmission.

10. The file system according to claim 1, characterized in that
said bandwidth setting part further performs the bandwidth setting also for said file reading part, and
said file reading part comprises
a prefetching control part for prefetching a predetermined amount of data which is not requested by said application when the file reading is performed; and
a prefetching buffer management part for managing a prefetching buffer in which prefetched data is temporarily stored, and
said prefetching control part determines the amount of data to be prefetched on the basis of the bandwidth set by said bandwidth setting part.

11. The file system according to claim 3, characterized in that
said bandwidth setting part further performs the bandwidth setting also for said file reading part,
said file reading part comprises
a prefetching control part for prefetching a predetermined amount of data which is not requested by said application when the file reading is performed; and
a prefetching buffer management part for managing a prefetching buffer in which prefetched data is temporarily stored, and
said prefetching control part determines the amount of data to be prefetched on the basis of the product of the standard bandwidth set by said bandwidth setting part and maximum delay time previously calculated.

12. The file system according to claim 11, characterized in that said maximum delay time is time calculated such that the probability that reading delay above the time occurs is considerably reduced.

13. The file system according to claim 11, characterized in that
said file reading part further comprises a prefetching amount control part for controlling the amount of data to be prefetched, and
said prefetching amount control part carries out, when said minimum bandwidth assurance is set, control such that the amount of data to be prefetched is not less than an amount determined by said prefetching control part when the transmission bandwidth corresponding to the reading request from said application exceeds said standard bandwidth as a result of control carried out by said first transmission bandwidth control part.

14. The file system according to claim 13, characterized in that said prefetching buffer management part carries out prefetching amount control on the basis of situations where the prefetching buffer managed by said buffer management part is employed.

15. The file system according to claim 13, characterized in that
said prefetching buffer management part monitors the amount of data to be prefetched which is stored in the prefetching buffer, and reports the result of the monitoring to said prefetching amount control part as the amount of use of the prefetching buffer, and
said prefetching amount control part carries out the prefetching amount control on the basis of the reported amount of use of the prefetching buffer.

16. The file system according to claim 15, characterized in that said prefetching amount control part compares the reported amount of use of the prefetching buffer with a previously determined threshold, and increases or decreases the amount of data to be prefetched in relation to the result of the comparison.

17. The file system according to claim 13, characterized in that said buffer management part manages the prefetching buffer upon dividing the prefetching buffer into a basic area corresponding to said standard bandwidth and a shared area corresponding to a vacant area other than the standard bandwidth.

18. The file system according to claim 17, characterized in that the size of said shared area is not less than the size of said basic area.

19. The file system according to claim 17, characterized in that the size of said shared area is not less than N (N is an arbitrary integer of two or more) times the size of said basic area.

20. The file system according to claim 10, characterized in that said prefetching control part changes, when reading is started at a position different from the head of a file, the position where prefetching is performed into a position, where prefetching has not been performed yet, ahead of a position designated by the application, and starts the prefetching at the position.

21. The file system according to claim 10, characterized in that
when high-speed reproduction for intermittently reading out data in the file is performed, said prefetching control part
determines the position where prefetching is performed on the basis of a request from the application, the size of a data area in the file and the direction of reading, and
intermittently performs prefetching, starting at the determined position.

22. The file system according to claim 10, characterized in that
when backward reproduction is performed upon switching the direction of reproduction from a forward direction to a backward direction, said prefetching control part
detects that the direction of reproduction is changed from the forward direction to the backward direction on the basis of the positional relationship in the file between data which has been requested to read out this time and data which was requested to read out last time, and
switches, when it detects that the direction of reproduction is changed from the forward direction to the backward direction, the direction in which prefetching is performed from the forward direction to the backward direction, and changes the position where prefetching is performed into a position, where prefetching has not been performed yet, in a direction opposite to the position, and starts the prefetching in the opposite direction at the position.

23. The file system according to claim 22, characterized in that said prefetching control part holds data in the opposite direction, whose amount is the same as the amount of said data to be prefetched, in preparation for a case where backward reproduction is performed upon switching the direction of reproduction from the forward direction to the backward direction.

24. The file system according to claim 4, characterized in that said first transmission bandwidth control part and/or said second transmission bandwidth control part calculate, when the minimum unit of data requested by said application and the minimum unit of data handled by said data storage part differ from each other, a real bandwidth actually required on the basis of the two minimum units, and carry out transmission bandwidth control using the real bandwidth in place of said standard bandwidth.

25. The file system according to claim 1, further comprising:
   a first API (Application Program Interface; the same is true for the following) for converting the file reading request and/or the file writing request from said application into a format suitable for said file reading part; and
   a second API for converting the bandwidth setting request from said application into a format corresponding to said bandwidth setting part.

26. The file system according to claim 1, further comprising:
   a file management part for managing the file stored in said data storage part on the basis of attribute information representing the attribute of the file; and
   an attribute information management part for managing said attribute information.

27. The file system according to claim 26, characterized in that said attribute information includes initialization information relating to the bandwidth setting performed by said bandwidth setting part.

28. The file system according to claim 13, characterized in that
   said data storage part is realized by a file server connected to a network,
   said file reading part performs the file reading out of said file server through said network, and
   said file writing part performs the file writing into said file server through said network.

29. The file system according to claim 28, characterized in that said bandwidth setting part further sets a bandwidth for said network.

30. The file system according to claim 28, characterized in that said bandwidth setting part performs bandwidth setting for said network such that one connection in the network is assigned to one file.

31. The file system according to claim 28, characterized in that said bandwidth setting part performs the bandwidth setting for said network such that one connection in the network is assigned to a plurality of files.

32. The file system according to claim 1, characterized in that said bandwidth setting part performs the bandwidth setting for each file.

33. The file system according to claim 26, characterized in that said bandwidth setting part performs the bandwidth setting for each attribute of the file.

34. The file system according to claim 28, characterized in that
   clients transmitting and receiving data to and from said file server through the network are connected to said network, and
   said bandwidth setting part performs the bandwidth setting for each of said clients.

* * * * *